United States Patent
Saito et al.

(10) Patent No.: US 7,746,873 B2
(45) Date of Patent: Jun. 29, 2010

(54) COMMUNICATION PROCESSING SYSTEM, COMMUNICATION PROCESSING METHOD, COMMUNICATION TERMINAL, DATA TRANSFER CONTROLLER, AND PROGRAM

(75) Inventors: Shin Saito, Kanagawa (JP); Fumio Teraoka, Kanagawa (JP); Kuniaki Kurihara, Tokyo (JP); Kazuhiro Shitama, Chiba (JP)

(73) Assignee: Sony Corporation, Tokyo (JP)

( * ) Notice: Subject to any disclaimer, the term of this patent is extended or adjusted under 35 U.S.C. 154(b) by 2221 days.

(21) Appl. No.: 10/094,295

(22) Filed: Mar. 8, 2002

(65) Prior Publication Data

US 2002/0172207 A1  Nov. 21, 2002

(30) Foreign Application Priority Data

Mar. 13, 2001  (JP) .................... P2001-070073

(51) Int. Cl.
*H04L 12/28* (2006.01)
*H04Q 7/24* (2006.01)
*G06F 15/16* (2006.01)

(52) U.S. Cl. .................. 370/400; 370/338; 370/389; 709/219

(58) Field of Classification Search ......... 370/338–352, 370/389–392, 400–401; 709/219–231, 238–249
See application file for complete search history.

(56) References Cited

U.S. PATENT DOCUMENTS

| | | | |
|---|---|---|---|
| 6,711,147 B1 * | 3/2004 | Barnes et al. ............... | 370/338 |
| 6,771,700 B1 * | 8/2004 | Razoumov et al. .......... | 375/227 |
| 6,882,647 B2 * | 4/2005 | McAllister et al. .......... | 370/392 |
| 6,973,506 B2 * | 12/2005 | Ishiyama et al. ............ | 709/245 |
| 2001/0014917 A1 * | 8/2001 | Ishiyama et al. ............ | 709/227 |
| 2002/0126642 A1 * | 9/2002 | Shitama ....................... | 370/338 |
| 2003/0039267 A1 * | 2/2003 | Koo et al. .................... | 370/465 |
| 2003/0142673 A1 * | 7/2003 | Patil et al. ................... | 370/392 |

FOREIGN PATENT DOCUMENTS

| | | |
|---|---|---|
| JP | 2001-268129 | 9/2001 |
| JP | 2002-217950 | 8/2002 |
| JP | 2002-261806 | 9/2002 |

OTHER PUBLICATIONS

Yasuhiro Mizukoshi and Uasuharu Moriya; Automobile Tracking System by using DSRC IPv6 network; 2000.
Hidetoshi Yokota et al.; A Study on Applying Mobile IP to Mobile Backbone Network; 2000.
Japanese Office Action dated Jan. 19, 2010, issued in connection with counterpart Japanese Patent Application No. 2001-070073.

* cited by examiner

*Primary Examiner*—Man Phan
(74) *Attorney, Agent, or Firm*—Sonnenschein Nath & Rosenthal LLP

(57) ABSTRACT

A virtual network prefix is provided as a dedicated prefix for a mobile node in a domain having a plurality of subnets. The domain includes a layered network that has a quasi-micro mobility network (QMMN) and a pure-micro mobility network (PMMN). The quasi-micro mobility network (QMMN) performs prefix-based routing, and the pure-micro mobility network (PMMN) performs routing using two different routing protocols, that is, prefix-based routing and host-based routing. In each network, processing for changing a route, such as changing cache data or the like, is performed depending on how a terminal moves.

68 Claims, 20 Drawing Sheets

| Host Name | Home Address |
|-----------|--------------|
| aaaa | XXXX |
| bbbb | YYYY |
| cccc | ZZZZ |

FIG. 22

| Type | Code | Reserved |
|---|---|---|
| 0 | 7 | 15   31 |

| Routing Update Interval Time Min. |
|---|
| Routing Update Interval Time Max. |
| Paging Update Interval Time Min. |
| Paging Update Interval Time Max. |
| Mapping Cache Hold Time Min. |
| Mapping Cache Hold Time Max. |
| Virtual Network Prefix |

FIG. 23

| Type | Code | Reserved |
|---|---|---|
| 0 | 7 | 15   31 |

| Current MN IPv6 Address |
|---|
| Sequence Number |
| Paging Update Interval Time |
| Mapping Cache Hold Time |
| Old PNP |
| Old MN IPv6 Address |

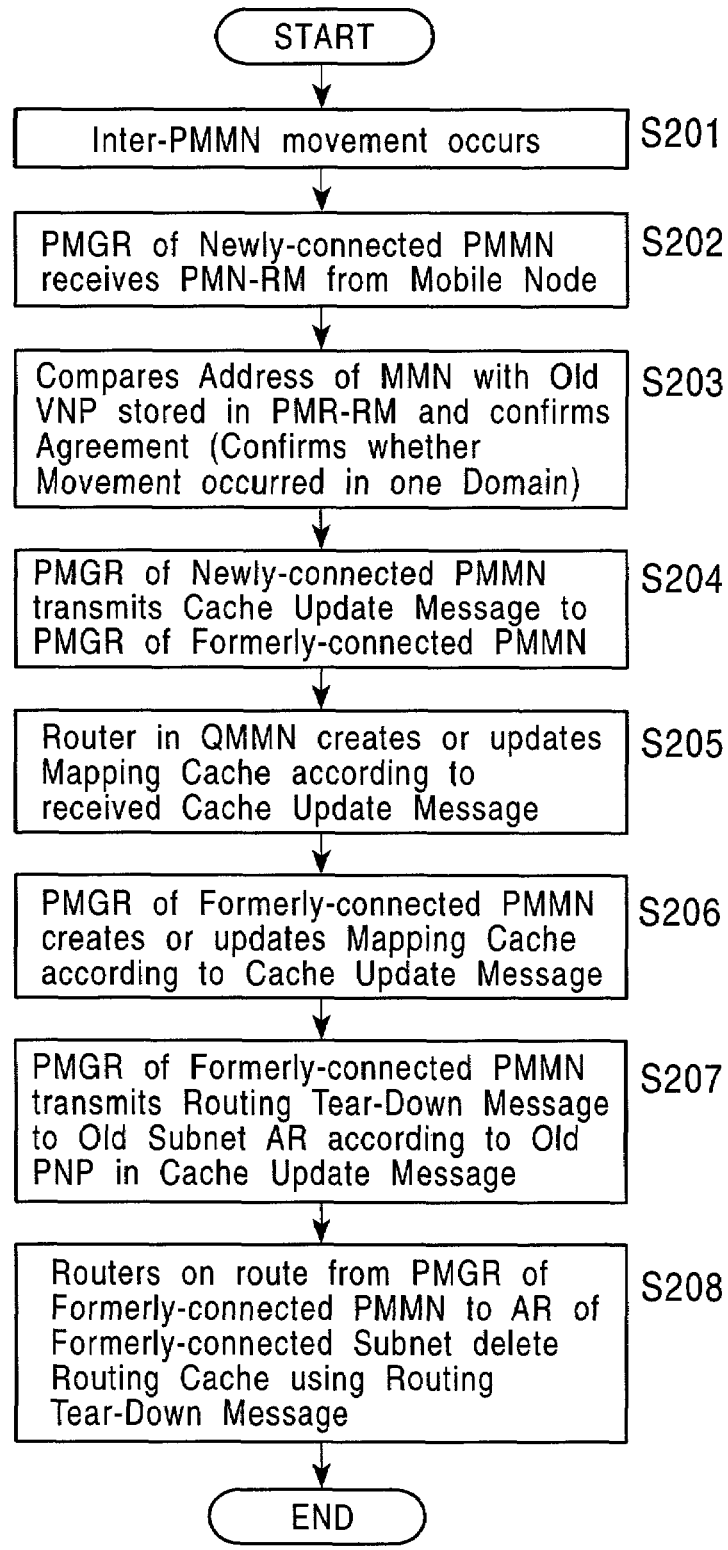

COMMUNICATION PROCESSING SYSTEM, COMMUNICATION PROCESSING METHOD, COMMUNICATION TERMINAL, DATA TRANSFER CONTROLLER, AND PROGRAM

RELATED APPLICATION DATA

The present application claims priority to Japanese Application(s) No(s). P2001-070073 filed Mar. 13, 2001, which application(s) is/are incorporated herein by reference to the extent permitted by law.

BACKGROUND OF THE INVENTION

1. Field of the Invention

The present invention relates to communication processing systems, communication processing methods, communication terminals, data transfer controllers, and programs. More specifically, the present invention relates to a communication processing system, communication processing method, communication terminal, data transfer controller, and program which provide improved address setting and communication processing for a mobile communication device.

2. Description of the Related Art

In recent years, portable personal computers, portable telephones, and the like have become widely used, and many users carry compact devices having such communication features and information processing features and connect them to networks to perform communication over the networks while outdoors or while away from home.

In such so-called mobile computing environments, nodes which serve as devices (e.g., personal computers) for receiving services through the connection to the networks are configured on the premise that the nodes move. Such nodes need to maintain their state in which they can continuously perform communication even when the locations thereof vary.

The Internet uses IP (Internet protocol) as the communication protocol. The IP currently in widespread use is IPv4 (Internet protocol version 4) which employs IP addresses of 32 bits as the source/destination. Internet communication adopts global IP addresses, so that a unique 32-bit IP address is assigned to each source/destination, and an individual source/destination is determined in accordance with an IP address. The world of the Internet, however, has been expanding so rapidly that there is a problem of limited space for IPv4 addresses, that is, global addresses can be exhausted. To solve this problem, the IETF (Internet Engineering Task Force) has proposed a new IPv6 protocol (Internet protocol version 6), which expands the IP address space from 32 bits to 128 bits, as next generation IP addresses.

Other communication methods for nodes in a mobile computing environment include mobile IPv6 proposed by the IETF (Internet Engineering Task Force) and LIN6 (location independent networking for IPv6) proposed by the applicant of the present invention.

In mobile IPv6, each node has two IP addresses, that is, a home address and a care-of-address. The care-of-address varies depending on a connected sub-network as the node moves, while the home address remains the same regardless of the movement of the node. A correspondent node can communicate with the mobile node by designating the home address of the mobile node, regardless of the location of the mobile node, that is, the location of the connected sub-network.

A home agent executes processing that allows communication with the mobile node in mobile IPv6. The home agent is a node that is connected to a sub-network associated with the home address of the node. When a communication node has moved, the home agent receives a binding update packet including a new care-of-address from the node that has moved and updates a binding cache storing the association of the home-address (constant) and the care-of-address (variable). Furthermore, the home agent announces routing information corresponding to the home address of the mobile node to the network.

FIG. 1 is a view illustrating a procedure for registering a care-of-address. When a terminal device 301, which is a node, has moved, the terminal device 301 obtains a care-of-address from the sub-network covering the location into which the terminal device 301 has moved. The terminal device (mobile node) 301 generates a binding update packet including a home address, care-of-address, and authentication data for the terminal device 301, and transmits the packet to a home agent 302.

FIG. 2 is a view illustrating the format of the IPv6 header of an IPv6 packet. As shown in FIG. 2, the IPv6 header includes a 4-bit protocol version, an 8-bit traffic class for recognizing and differentiating priorities, a 20-bit flow label with which a router, which is a communication device, identifies a packet requesting for execution of a special operation. The IPv6 header further includes a source address, which is an address of the node that transmits a packet, a destination address, which is an address that receives the packet, and an optional header extension.

FIG. 3 is a view illustrating the format of the IPv6 address. The upper 64 bits of the IPv6 address is routing information, and the lower 64 bits thereof is an interface identifier for identifying a network interface of the node in the sub-network to which the node is connected. The interface identifier is unique in the sub-network, and a MAC address or the like is used as the interface identifier.

FIG. 4 is a view illustrating a binding update packet of the related art, that is, a packet for transmitting node movement information to the home agent from the mobile node. The source address of the IPv6 header contains the care-of-address of the terminal device 301, and the destination address thereof contains the address of the home agent 302.

The header extension stores the home address of the terminal device 301 as the destination header, data indicating that the packet requests update processing, and an authentication header.

FIG. 5 is a view illustrating the authentication header. The authentication header includes an SPI (security parameters index), a sequence number, and authentication data. The home agent 302 determines an SA (security association) based on the address of the destination and the SPI of the authentication header, as shown in FIG. 6, to determine a key for authentication, an encryption method, or the like.

Upon receipt of the binding update packet, the home agent 302 check whether the authentication data is valid or not, and if it determines that the data is valid, it registers the care-of-address, included in the received binding update packet, in the binding cache within the home agent 302. The home agent 302 updates the binding cache therein and transmits a response packet to the terminal device 301.

Next, a procedure in which a terminal device 303 of the related art transmits a packet to the mobile terminal device 301 will be described with reference to FIG. 7. The terminal device 303 transmits an inquiry to a domain name server 304 about the home address of the terminal device 301 by indicating the host name of the terminal device 301. As shown in FIG. 8, since the domain name server 304 stores the association of the host name and the home address, it retrieves the home address of the terminal device 301 based on the host name and transmits a response to the terminal device 303. The terminal device 303 generates a packet, as shown in FIG. 9, containing the home address of the terminal device 301 as the destination address and transmits the packet.

The packet transmitted by the terminal device 303 arrives at the home agent 302 in accordance with routing information announced by the home agent 302 to the network. As shown in FIG. 10, the home agent 302 further adds (encapsulates) an IPv6 header, containing the care-of-address of the terminal device 301 as the destination address, to the received packet. This packet arrives at the terminal device 301 in accordance with standard routing. The terminal device 301 removes the IPv6 header added by the home agent 302 from the received packet to obtain the original packet.

The terminal device 301 generates a binding update packet that includes an authentication header and the care-of-address of the terminal device 301, and transmits the binding update packet to the terminal device 303 to notify the care-of-address of the terminal device 301. Upon receipt of the binding update packet, the terminal device 303 checks the authentication data, and if it determines that the data is valid, it registers the care-of-address of the terminal device 301 in the binding cache. After the registration, the terminal device 303 transmits an acknowledgement response packet to the terminal device 301.

As shown in FIG. 11, the packet transmitted from the terminal 301 to the terminal device 303 contains the care-of-address of the terminal device 301 as the source address, and the home address is stored in a destination options header. This packet goes through the optimal route and arrives at the terminal device 303.

After receiving the binding update packet, as shown in FIG. 12, the terminal device 303 adds a routing header to the packet to be transmitted to the terminal device 301, and the resulting packet arrives at the terminal device 301 by way of an optimal route.

At this point, when the terminal device 301 moves, the terminal device 301 transmits a new care-of-address to the terminal device 303 and the home agent 302. The terminal device 303, after receiving the new care-of-address, holds the association of the home address and the care-of-address of the terminal device 301 as a binding cache in the same manner as the home agent 302. The terminal device 301 periodically transmits binding update packets to the home agent 302 and the terminal device 303 so that the terminal device 303 can execute update processing of the binding cache.

The operation when the terminal device has moved will now be described with reference to FIG. 13. The terminal device 301 obtains the care-of-address from the sub-network covering the location into which the terminal device 301 has moved. The terminal device 301 generates a binding update packet, shown in FIG. 14, including the home address and the like of the terminal device 301 and transmits the binding update packet to the terminal device 303. Upon receipt of the binding update packet, the terminal device 303 determines whether authentication data stored in the binding update packet is valid or not, and if it determines that the data is valid, then it registers the care-of-address of the terminal device 301 which is stored in the binding update packet into the binding cache. After the registration, the terminal device 303 transmits an acknowledgement response packet to the terminal device 301.

The terminal device 301 generates a binding update packet including the home address and the like of the terminal device 301, as shown in FIG. 15, and transmits the binding update packet to the home agent 302. Upon receipt of the binding update packet, the home agent 302 determines whether authentication data stored in the binding update packet is valid or not, and if it determines that the data is valid, then it registers the care-of-address of the terminal device 301, which is stored in the binding update packet, into the binding cache. After the registration, the home agent 302 transmits an acknowledgement response packet to the terminal device 301.

Japanese Patent Application No. 2000-5560, filed by the applicant of the present invention, proposes an approach (LIN6) different from mobile IPv6. In the approach according to an embodiment disclosed therein, the address of a mapping agent of a mobile node and a node identifier are registered and contained in a domain server. The mapping agent receives information concerning movement of a mobile node and updates a current location indicator corresponding to the node identifier of the mobile node. The current location indicator is a location indicator that is updated in response to movement of the mobile node.

A terminal device attempting to communicate with the mobile node transmits a query based on the host name of the mobile node to the domain name server, and the domain name server transmits to the terminal device the address of the mapping agent of the mobile node and the node identifier. The terminal device queries the mapping agent about the node identifier to obtain the current location indicator of the node, and configures an IPv6 address based on the obtained current location indicator and the node identifier of the mobile node.

However, either approach, that is, the mobile IPv6 of the related art or Japanese Patent Application No. 2000-5560 described above, requires that a mobile node periodically transmits movement information of the node or transmits the information when moving between sub-networks to, at least, a home agent.

In addition, both of those approaches support movement of a terminal in an IP layer, based on the network prefix (the upper 64 bits of an IPv6 address); however, when the terminal moves frequently, they cannot achieve hand-off of a data packet in a short time to the location into which the terminal has moved.

It has also been proposed to achieve more fast-speed hand-off to the location to which the mobile node has moved by host-based support for the movement in an IP layer. Such a configuration, however, requires all routers associated with routes for each terminal to hold host-based information, that is, a routing table. Thus, as the number of the connected terminals increases, the amount of information increases and the scalability becomes poor, which impairs the function of the fast movement support.

SUMMARY OF THE INVENTION

Accordingly, the present invention is made in view of the foregoing, and realizes a configuration for reporting a location change each time a node moves between subnets, in which the load on a network is alleviated by reducing the processing required in the mobile IPv6 or the like.

An object of the present invention is to provide an improved communication processing system, communication processing method, communication terminal, data transfer controller, and program which achieve scalability and high-speed hand-off by dividing a network area into two layers using two different protocols, that is, a prefix-based routing protocol and host-based routing protocol, in an environment in which a terminal moves frequently between subnets or nodes, and in a network (e.g., radio access network) configuration in which a terminal is desired to move in the IP layer.

In accordance with a first aspect of the present invention, a communication processing system comprises (1) at least two sub-networks to which a mobile node as a mobile communication terminal is connectable, (2) a pure-micro mobility network for performing host-based routing of a packet addressed to the mobile node and also for performing prefix-based routing, and (3) a quasi-micro mobility network for performing the prefix-based routing, wherein a virtual network prefix for the mobile node is set in the domain, the virtual network prefix serving as a network prefix which is different from a physical network prefix associated with a corresponding sub-network and serving as a prefix constituting an address of the mobile node, and the quasi-micro mobility network and the pure-micro mobility network are configured as an upper layer and a lower layer of the layered network, respectively.

In the communication processing system according to the first aspect of the present invention, a plurality of the pure-micro mobility networks, each for performing host-based routing for a packet addressed to the mobile node, is configured in the single domain, and each pure-micro mobility network in the single domain is associated with a different virtual network prefix.

In the communication processing system according to the first aspect of the present invention, (1) the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, and (2) the access router directly transfers the received pure-micro registration request message to a pure-micro gateway router located at the boundary between the quasi-micro mobility network and the pure-micro mobility network.

In the communication processing system according to the first aspect of the present invention, a pure-micro gateway router located at the boundary between the quasi-micro mobility network and the pure-micro mobility network creates, updates, or confirms a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network.

In the communication processing system according to the first aspect of the present invention, a pure-micro gateway router, located at the boundary between a quasi-micro mobility network for performing prefix-based routing and a pure-micro mobility network for performing host-based routing of a packet addressed to a mobile node and also for performing the prefix-based routing, transmits a cache update message including a current address of the mobile node, the current address being created by the mobile node, an old address thereof set in a previous sub-network, and an old physical network prefix corresponding to the previous sub-network when the pure-micro gateway router determines that the mobile node moves from one pure-micro mobility network to another in the same domain, each pure-micro mobility network having a different virtual network prefix upon receipt of a pure-micro registration request message including the current address, the old address, and the old physical network prefix.

In the communication processing system according to the first aspect of the present invention, a router in the quasi-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address with the new address stored in the mapping cache and transfers the data packet when the destination address in the data packet agrees with the old address in the mapping cache.

In the communication processing system according to the first aspect of the present invention, a router in the quasi-micro mobility network (i) has a mapping cache associating an old address of the mobile node with a new address thereof and storing information for forwarding a data packet, which was transmitted to the old address, to the new address when the mobile node moves from one pure-micro mobility network to another in the same domain, and (ii) creates or updates the mapping cache upon receipt of a cache update message including the new address of the mobile node, the old address thereof set in a previous sub-network, and an old physical network prefix corresponding to the previous sub-network.

In the communication processing system according to the first aspect of the present invention, a pure-micro gateway router located at the boundary between the quasi-micro mobility network and the corresponding pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address in the data packet with the new address stored in the mapping cache and transfers the data packet when the destination address agrees with the old address in the mapping cache.

In the communication processing system according to the first aspect of the present invention, a pure-micro gateway router located at the boundary between the quasi-micro mobility network and the pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) creates or updates the mapping cache upon receipt of a cache update message including a current address of the mobile node, the old address set in a previous sub-network, and an old physical network prefix corresponding to the previous sub-network.

In the communication processing system according to the first aspect of the present invention, (1) a pure-micro gateway router located at the boundary between the quasi-micro mobility network and the pure-micro mobility network (i) deletes a routing cache of the mobile node held by the pure-micro gateway router and (ii) transmits a routing tear-down message to a next-hop router given in accordance with on old physical network prefix upon receipt of a cache update message including a current address of the mobile node, an old address thereof set in a previous sub-network, and the old physical network prefix corresponding to the previous sub-network, and (2) a router in the pure-micro mobility network which receives the routing tear-down message (i) deletes the routing cache storing routing information of the mobile node in the previous sub-network, (ii) transmits the routing tear-down message to the next-hop router given in accordance with the old physical network prefix, and (iii) repeats transmitting the routing tear-down message and deleting the routing cache storing the routing information of the mobile node in the previous sub-network, the routing cache being in the router which receives the routing tear-down message, down to an access router connected to the previous sub-network corresponding to the old physical network prefix.

In the communication processing system according to the first aspect of the present invention, a pure-micro gateway router located at the boundary between the quasi-micro mobility network and the pure-micro mobility network (i) has a paging cache storing an address of the mobile node as a cache for storing an idle mobile node connected to the pure-micro mobility network, and (ii) creates or updates the paging cache upon receipt of a paging update message including a current address of the mobile node, the current address being created by the mobile node.

In the communication processing system according to the first aspect of the present invention, (1) a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and (2) a router in the pure-micro mobility network and the pure-micro gateway router in the pure-micro mobility network create or update the routing cache upon receipt of a routing update message including a current address of the mobile node, the current address being created by the mobile node.

In the communication processing system according to the first aspect of the present invention, a router in the pure-micro mobility network (i) has a routing cache associating an address of the mobile node with an address of a next-hop router for host-routing to an active mobile node connected to the pure-micro mobility network, (ii) deletes the routing cache upon receipt of a routing tear-down message including an address of the mobile node, which is transmitted from an upper-level router, and an old physical network prefix set in a previous sub-network, (iii) transfers the routing tear-down message to the next-hop router given in accordance with the old physical network prefix, and (ix) repeats transferring the routing tear-down message and deleting the routing cache storing routing information of the mobile node in the previous sub-network, the routing cache being in the router which receives the routing tear-down message, down to an access router connected to the previous sub-network corresponding to the old physical network prefix.

In the communication processing system according to the first aspect of the present invention, a crossover router, as a branch point for routing two sub-networks to two respective access routers, creates and transmits a routing tear-down message.

In the communication processing system according to the first aspect of the present invention, an identifier of the mobile node is unique in the pure-micro mobility network for identifying the mobile node.

In the communication processing system according to the first aspect of the present invention, an identifier of the mobile node is a unique interface ID in the pure-micro mobility network for identifying the mobile node.

In the communication processing system according to the first aspect of the present invention, an access router, connected to a current sub-network to which the mobile node is connected, in the pure-micro mobility network transmits a router advertisement which serves as an information report of the router and which includes information on the physical network prefix and another information on the virtual network prefix therein.

In the communication processing system according to the first aspect of the present invention, the mobile node moving from one sub-network to another in the same pure-micro mobility network or in different pure-micro mobility networks (i) compares a value of the virtual network prefix, included in a router advertisement which the mobile node receives from an access router of a new sub-network to which the mobile node is connected and which serves as an information report of the access router, to a value of the virtual or physical network prefix included in an old address of the mobile node in a previous sub-network, and (ii) creates an address thereof based on the virtual network prefix included in the received router advertisement only when the two network prefix values are different from each other.

In the communication processing system according to the first aspect of the present invention, the mobile node moving from one sub-network to another in the same pure-micro mobility network or in different pure-micro mobility networks creates an address of the mobile node based on the physical network prefix included in a router advertisement which the mobile node receives from an access router of a new sub-network to which the mobile node is connected and which serves as an information report of the access router when the router advertisement includes a value of the physical network prefix but does not include a value of the virtual network prefix.

In the communication processing system according to the first aspect of the present invention, (1) an access router in the pure-micro mobility network, connected to a current sub-network to which the mobile node is connected, stores data of acceptable hold time ranges of a paging cache, a routing cache, and a mapping cache, for routing to the mobile node, in a router advertisement serving as an information report of the access router, and (2) the mobile node sets lifetimes of the respective caches based on the data of the hold time ranges in the received router advertisement.

In the communication processing system according to the first aspect of the present invention, (1) the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, (2) the access router transfers the received pure-micro registration request message to a pure-micro gateway router located at the boundary between the quasi-micro mobility network and the pure-micro mobility network, (3) the pure-micro gateway router performs a duplication check for the current address of the mobile node and transmits a pure-micro registration acknowledgement message including the check result to the mobile node through the access router, and (4) the mobile node which receives the pure-micro registration acknowledgement message creates a pure-micro registration request message for setting a new address of the mobile node based on a new interface ID again and retransmits the reset pure-micro registration request message to the access router when the duplication check result for a current address of the mobile node is affirmative.

In the communication processing system according to the first aspect of the present invention, an access router connected to a current sub-network to which the mobile node is connected in the pure-micro mobility network creates a router advertisement which serves as an information report of the router and which stores data of acceptable hold time ranges of a paging cache, a routing cache, and a mapping cache for performing the routing, and transmits the created a router advertisement to the mobile node.

In the communication processing system according to the first aspect of the present invention, (1) a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and (2) a router in the pure-micro mobility network and the pure-micro gateway router set a lifetime of the routing cache for each mobile node in accordance with a routing update interval time included in a routing update message upon receipt of the routing update message including a current address of the mobile node, the current address being created by the mobile node.

In the communication processing system according to the first aspect of the present invention, (1) a pure-micro gateway router located at the boundary between the quasi-micro mobility network and the pure-micro mobility network (i) refers to a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network, (ii) determines if a current address of the mobile node, the current address being created by the mobile node, in the pure-micro registration request message are registered in the pure-micro mobility network or not, and (iii) transmits a pure-micro registration acknowledgement message including the determination result to an access router of a current sub-network to which the mobile node is connected, and (2) the access router transmits the received pure-micro registration acknowledgement message to the mobile node connected to the access router.

In the communication processing system according to the first aspect of the present invention, a pure-micro gateway router located at the boundary between the quasi-micro mobility network and the pure-micro mobility network (i) has a paging cache which stores an address of the mobile node and which serves as a cache for storing an idle mobile node connected to the pure-micro mobility network, and (ii) sets a lifetime of the paging cache for each mobile node based on a paging update interval time included in a pure-micro registration request message including a current address of the mobile node, the current address being created by the mobile node, an old address thereof set in a previous sub-network, and an old physical network prefix corresponding to the previous sub-network or a page update message including the current address upon receipt of the pure-micro registration request message or upon receipt of the page update message.

In the communication processing system according to the first aspect of the present invention, (1) a pure-micro gateway router located at the boundary between the quasi-micro mobility network and the pure-micro mobility network has a mapping cache associating an old address of the mobile node with a new address thereof and storing information for transferring a data packet, which was transmitted to the old address, to the new address when the mobile node moves from one pure-micro mobility network to another in the same domain, and (2) a router in the quasi-micro mobility network and the pure-micro gateway router set a lifetime of the mapping cache for each mobile node based on a mapping cache lifetime of the mapping cache included in a cache update message including an old address of the mobile node set in a previous sub-network, and an old physical network prefix corresponding to the previous sub-network upon receipt of the cache update message.

In the communication processing system according to the first aspect of the present invention, (1) a pure-micro gateway router located at the boundary between the quasi-micro mobility network and the pure-micro mobility network broadcasts a paging request message including an address of the mobile node to a downstream sub-network, when a route of a destination address for transferring a data packet to the mobile node is not included in a routing cache for host-routing to an active mobile node connected to the pure-micro mobility network but is included in a paging cache storing an idle mobile node connected to the pure-micro mobility network, (2) a router in the pure-micro mobility network receiving the paging request message broadcasts the received paging request message to the downstream sub-network, (3) the mobile node receiving the paging request message creates a routing update message including a current address of the mobile node and transmits the routing update message to an access router in the pure-micro mobility network, and (4) the router in the pure-micro mobility network and the pure-micro gateway router create the routing cache upon receipt of the routing update message.

In accordance with a second aspect of the present invention, a communication processing method comprises the steps of (1) setting a virtual network prefix for a mobile node, as a mobile communication terminal, in a domain including at least two sub-networks to which the mobile node is connectable, the virtual network prefix serving as a network prefix which is different from a physical network prefix associated with a corresponding sub-network and serving as a prefix constituting an address, and (2) performing prefix-based routing and host-based routing through a layered network configured such that, in the domain, a quasi-micro mobility network for performing the prefix-based routing is configured in an upper layer of the layered network, and at least one pure-micro mobility network for performing the host-based routing of a packet addressed to the mobile node and also for performing the prefix-based routing is configured in a lower layer of the layered network.

In the communication processing method according to the second aspect of the present invention, a plurality of the pure-micro mobility networks, each for performing host-based routing for a packet addressed to the mobile node, is configured in the single domain, and each pure-micro mobility network in the single domain is associated with a different virtual network prefix.

In the communication processing method according to the second aspect of the present invention, (1) the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, and (2) the access router directly transfers the received pure-micro registration request message to a pure-micro gateway router located at the boundary between the quasi-micro mobility network and the pure-micro mobility network.

In the communication processing method according to the second aspect of the present invention, a pure-micro gateway router located at the boundary between the quasi-micro mobility network and the pure-micro mobility network creates, updates, or confirms a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network.

In the communication processing method according to the second aspect of the present invention, a pure-micro gateway router, located at the boundary between a quasi-micro mobility network for performing prefix-based routing and a pure-micro mobility network for performing host-based routing of a packet addressed to a mobile node and also for performing the prefix-based routing, transmits a cache update message including a current address of the mobile node, the current address being created by the mobile node, an old address thereof set in a previous sub-network, and an old physical network prefix corresponding to the previous sub-network when the pure-micro gateway router determines that the mobile node moves from one pure-micro mobility network to another in the same domain, each pure-micro mobility network having a different virtual network prefix upon receipt of a pure-micro registration request message including the current address, the old address, and the old physical network prefix.

In the communication processing method according to the second aspect of the present invention, a router in the quasi-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address with the new address stored in the mapping cache and transfers the data packet when the destination address in the data packet agrees with the old address in the mapping cache.

In the communication processing method according to the second aspect of the present invention, a router in the quasi-micro mobility network (i) has a mapping cache associating an old address of the mobile node with a new address thereof and storing information for forwarding a data packet, which was transmitted to the old address, to the new address when the mobile node moves from one pure-micro mobility network to another in the same domain, and (ii) creates or updates the mapping cache upon receipt of a cache update message including the new address of the mobile node, the old address thereof set in a previous sub-network, and an old physical network prefix corresponding to the previous sub-network.

In the communication processing method according to the second aspect of the present invention, a pure-micro gateway router located at the boundary between the quasi-micro mobility network and the corresponding pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address in the data packet with the new address stored in the mapping cache and transfers the data packet when the destination address agrees with the old address in the mapping cache.

In the communication processing method according to the second aspect of the present invention, a pure-micro gateway router located at the boundary between the quasi-micro mobility network and the pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) creates or updates the mapping cache upon receipt of a cache update message including a current address of the mobile node, the old address set in a previous sub-network, and an old physical network prefix corresponding to the previous sub-network.

In the communication processing method according to the second aspect of the present invention, (1) a pure-micro gateway router located at the boundary between the quasi-micro mobility network and the pure-micro mobility network (i) deletes a routing cache of the mobile node held by the pure-micro gateway router and (ii) transmits a routing tear-down message to a next-hop router given in accordance with on old physical network prefix upon receipt of a cache update message including a current address of the mobile node, an old address thereof set in a previous sub-network, and the old physical network prefix corresponding to the previous sub-network, and (2) a router in the pure-micro mobility network which receives the routing tear-down message (i) deletes the routing cache storing routing information of the mobile node in the previous sub-network, (ii) transmits the routing tear-down message to the next-hop router given in accordance with the old physical network prefix, and (iii) repeats transmitting the routing tear-down message and deleting the routing cache storing the routing information of the mobile node in the previous sub-network, the routing cache being in the router which receives the routing tear-down message, down to an access router connected to the previous sub-network corresponding to the old physical network prefix.

In the communication processing method according to the second aspect of the present invention, a pure-micro gateway router located at the boundary between the quasi-micro mobility network and the pure-micro mobility network (i) has a paging cache storing an address of the mobile node as a cache for storing an idle mobile node connected to the pure-micro mobility network, and (ii) creates or updates the paging cache upon receipt of a paging update message including a current address of the mobile node, the current address being created by the mobile node.

In the communication processing method according to the second aspect of the present invention, (1) a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and (2) a router in the pure-micro mobility network and the pure-micro gateway router in the pure-micro mobility network create or update the routing cache upon receipt of a routing update message including a current address of the mobile node, the current address being created by the mobile node.

In the communication processing method according to the second aspect of the present invention, a router in the pure-micro mobility network (i) has a routing cache associating an address of the mobile node with an address of a next-hop router for host-routing to an active mobile node connected to the pure-micro mobility network, (ii) deletes the routing cache upon receipt of a routing tear-down message including an address of the mobile node, which is transmitted from an upper-level router, and an old physical network prefix set in a previous sub-network, (iii) transfers the routing tear-down message to the next-hop router given in accordance with the old physical network prefix, and (ix) repeats transferring the routing tear-down message and deleting the routing cache storing routing information of the mobile node in the previous sub-network, the routing cache being in the router which receives the routing tear-down message, down to an access router connected to the previous sub-network corresponding to the old physical network prefix.

In the communication processing method according to the second aspect of the present invention, a crossover router, as a branch point for routing two sub-networks to two respective access routers, creates and transmits a routing tear-down message.

In the communication processing method according to the second aspect of the present invention may further comprise the steps of an identifier of the mobile node is unique in the pure-micro mobility network for identifying the mobile node.

In the communication processing method according to the second aspect of the present invention, an identifier of the mobile node is a unique interface ID in the pure-micro mobility network for identifying the mobile node.

In the communication processing method according to the second aspect of the present invention, an access router, connected to a current sub-network to which the mobile node is connected, in the pure-micro mobility network transmits a router advertisement which serves as an information report of the router and which includes information on the physical network prefix and another information on the virtual network prefix therein.

In the communication processing method according to the second aspect of the present invention, the mobile node moving from one sub-network to another in the same pure-micro mobility network or in different pure-micro mobility networks (i) compares a value of the virtual network prefix, included in a router advertisement which the mobile node receives from an access router of a new sub-network to which the mobile node is connected and which serves as an information report of the access router, to a value of the virtual or physical network prefix included in an old address of the mobile node in a previous sub-network, and (ii) creates an address thereof based on the virtual network prefix included in the received router advertisement only when the two network prefix values are different from each other.

In the communication processing method according to the second aspect of the present invention, the mobile node moving from one sub-network to another in the same pure-micro mobility network or in different pure-micro mobility networks creates an address of the mobile node based on the physical network prefix included in a router advertisement which the mobile node receives from an access router of a new sub-network to which the mobile node is connected and which serves as an information report of the access router when the router advertisement includes a value of the physical network prefix but does not include a value of the virtual network prefix.

In the communication processing method according to the second aspect of the present invention, (1) an access router in the pure-micro mobility network, connected to a current sub-network to which the mobile node is connected, stores data of acceptable hold time ranges of a paging cache, a routing cache, and a mapping cache, for routing to the mobile node, in a router advertisement serving as an information report of the access router, and (2) the mobile node sets lifetimes of the respective caches based on the data of the hold time ranges in the received router advertisement.

In the communication processing method according to the second aspect of the present invention, (1) the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, (2) the access router transfers the received pure-micro registration request message to a pure-micro gateway router located at the boundary between the quasi-micro mobility network and the pure-micro mobility network, (3) the pure-micro gateway router performs a duplication check for the current address of the mobile node and transmits a pure-micro registration acknowledgement message including the check result to the mobile node through the access router, and (4) the mobile node which receives the pure-micro registration acknowledgement message creates a pure-micro registration request message for setting a new address of the mobile node based on a new interface ID again and retransmits the reset pure-micro registration request message to the access router when the duplication check result for a current address of the mobile node is affirmative.

In the communication processing method according to the second aspect of the present invention, (1) an access router connected to a current sub-network to which the mobile node is connected in the pure-micro mobility network creates a router advertisement which serves as an information report of the router and which stores data of acceptable hold time ranges of a paging cache, a routing cache, and a mapping cache for performing the routing, and transmits the created a router advertisement to the mobile node.

In the communication processing method according to the second aspect of the present invention, (1) a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and (2) a router in the pure-micro mobility network and the pure-micro gateway router set a lifetime of the routing cache for each mobile node in accordance with a routing update interval time included in a routing update message upon receipt of the routing update message including a current address of the mobile node, the current address being created by the mobile node.

In the communication processing method according to the second aspect of the present invention, (1) a pure-micro gateway router located at the boundary between the quasi-micro mobility network and the pure-micro mobility network (i) refers to a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network, (ii) determines if a current address of the mobile node, the current address being created by the mobile node, in the pure-micro registration request message are registered in the pure-micro mobility network or not, and (iii) transmits a pure-micro registration acknowledgement message including the determination result to an access router of a current sub-network to which the mobile node is connected, and (2) the access router transmits the received pure-micro registration acknowledgement message to the mobile node connected to the access router.

In the communication processing method according to the second aspect of the present invention, a pure-micro gateway router located at the boundary between the quasi-micro mobility network and the pure-micro mobility network (i) has a paging cache which stores an address of the mobile node and which serves as a cache for storing an idle mobile node connected to the pure-micro mobility network, and (ii) sets a lifetime of the paging cache for each mobile node based on a paging update interval time included in a pure-micro registration request message including a current address of the mobile node, the current address being created by the mobile node, an old address thereof set in a previous sub-network, and an old physical network prefix corresponding to the previous sub-network or a page update message including the current address upon receipt of the pure-micro registration request message or upon receipt of the page update message.

In the communication processing method according to the second aspect of the present invention, (1) a pure-micro gateway router located at the boundary between the quasi-micro mobility network and the pure-micro mobility network has a mapping cache associating an old address of the mobile node with a new address thereof and storing information for transferring a data packet, which was transmitted to the old address, to the new address when the mobile node moves from one pure-micro mobility network to another in the same domain, and (2) a router in the quasi-micro mobility network and the pure-micro gateway router set a lifetime of the mapping cache for each mobile node based on a mapping cache lifetime of the mapping cache included in a cache update message including an old address of the mobile node set in a previous sub-network, and an old physical network prefix corresponding to the previous sub-network upon receipt of the cache update message.

In the communication processing method according to the second aspect of the present invention, (1) a pure-micro gateway router located at the boundary between the quasi-micro mobility network and the pure-micro mobility network broadcasts a paging request message including an address of the mobile node to a downstream sub-network, when a route of a destination address for transferring a data packet to the mobile node is not included in a routing cache for host-routing to an active mobile node connected to the pure-micro mobility network but is included in a paging cache storing an idle mobile node connected to the pure-micro mobility network, (2) a router in the pure-micro mobility network receiving the paging request message broadcasts the received paging request message to the downstream sub-network, (3) the mobile node receiving the paging request message creates a routing update message including a current address of the mobile node and transmits the routing update message to an access router in the pure-micro mobility network, and (4) the router in the pure-micro mobility network and the pure-micro gateway router create the routing cache upon receipt of the routing update message.

In accordance with a third aspect of the present invention, a communication terminal comprises (1) first means for receiving a physical network prefix associated with a corresponding sub-network in a domain having at least two sub-networks and a router advertisement which serves as an information report from an access router and which includes a virtual network prefix for the communication terminal, (2) second means for setting an address of the communication terminal based on the virtual network prefix obtained from the received router advertisement and also based on an identifier of the communication terminal, and (3) third means for creating a pure-micro registration request message including a current address of the communication terminal, an old address thereof set in a previous sub-network, and an old physical network prefix corresponding to the previous sub-network, and for transmitting the pure-micro registration request message to the access router of a current sub-network to which the communication terminal is connected.

The communication terminal according to the third aspect of the present invention may further comprise (1) fourth means for comparing a value of the virtual network prefix included in the router advertisement received from the access router to a value of the virtual network prefix or physical network prefix used in the previous sub-network included in the old address of the mobile node when the mobile node moves from one sub-network to another in the same domain or in different domains, and (2) fifth means for creating an address of the mobile node based on the virtual network prefix included in the received router advertisement only when the two network prefix values are different from each other.

The communication terminal according to the third aspect of the present invention may further comprise (1) fourth means for determining if the router advertisement includes a value of the physical network prefix and does not include a value of the virtual network prefix or not, and (2) fifth means for creating an address of the mobile node based on the physical network prefix included in the received router advertisement when the determination is affirmative.

The communication terminal according to the third aspect of the present invention may further comprise (1) fourth means for receiving a pure-micro registration acknowledgement message including a check result of address duplication with respect to the current address of the mobile node, and (2) fifth means for creating the pure-micro registration request message which resets a new address, based on a new interface ID, as the current address of the mobile node, and for transmitting the pure-micro registration request message to the access router when the pure-micro registration acknowledgement message includes an affirmative check result.

The communication terminal according to the third aspect of the present invention may further comprise (1) fourth means for receiving the router advertisement which serves as an information report of the router and which stores data of acceptable hold time ranges of a paging cache, a routing cache, and a mapping cache for routing to the communication terminal, and (2) fifth means for setting lifetimes of the respective caches based on the data of the acceptable hold time ranges of the respective caches in the received router advertisement, and for storing the set lifetimes (i) in a routing update message, (ii) in the pure-micro registration request message, and (iii) in a paging update message including an address, a sequence number, and a paging update interval time of the communication terminal in a current sub-network corresponding to the routing cache, the mapping cache, and the paging cache, respectively.

The communication terminal according to the third aspect of the present invention may further comprise (1) fourth means for receiving a paging request message for an idle communication terminal, and (2) fifth means for creating a routing update message including a current address of the communication terminal, and for transmitting the routing update message to the access router of the sub-network when the received paging request message includes an address of the communication terminal.

The communication terminal according to the third aspect of the present invention may further comprise fourth means for creating a paging update message including an address, a sequence number, and a paging update interval time of the communication terminal in a current sub-network, and for transmitting the paging update message to the access router of the sub-network to which the communication terminal is connected, during a transition period from a communication mode to a stand-by mode.

In accordance with a fourth aspect of the present invention, a data transfer controller for controlling data transfer through a network comprises first means for performing a router advertisement, as an information report from an access router, to a mobile node which performs address-setting, wherein the router stores a physical network prefix associated with a sub-network to which the mobile node is connected and a virtual network prefix for the mobile node as a network prefix which is different from the physical network prefix.

The data transfer controller according to the fourth aspect of the present invention may further comprise second means for creating or updating a routing cache storing routing-data for the mobile node upon receipt of a routing update message including a current address of the mobile node, the current address being created by the mobile node.

The data transfer controller according to the fourth aspect of the present invention may further comprise second means for deleting a routing cache storing old routing information of the mobile node in a previous sub-network, upon receipt of a routing tear-down message which is transmitted from an upper-level data transfer controller and which includes a current address of the mobile node and an old physical network prefix which was set in the mobile node in the previous sub-network and which corresponds to the previous sub-network.

The data transfer controller according to the fourth aspect of the present invention may further comprise second means for receiving a pure-micro registration request message from the mobile node, the pure-micro registration request message including a current address of the mobile node, an old address thereof in a previous sub-network, and an old physical network prefix corresponding to the previous sub-network, and third means for directly transferring the pure-micro registration request message to a pure-micro gateway router located at the boundary between a quasi-micro mobility network for performing prefix-based routing and a pure-micro mobility network for performing host-based routing of a packet addressed to the mobile node and also for performing the prefix-based routing.

The data transfer controller according to the fourth aspect of the present invention may further comprise second means for transferring a pure-micro registration acknowledgement message to the mobile node upon receipt of the pure-micro registration acknowledgement message which is created by the pure-micro gateway router and which includes a check result of a determination as to whether overlapped current addresses of the mobile node are registered.

The data transfer controller according to the fourth aspect of the present invention may further comprise second means for creating the router advertisement which serves as an information report of the router and which stores data of acceptable hold time ranges of a paging cache, a routing cache, and a mapping cache for routing, and third means for transmitting the router advertisement to the mobile node.

The data transfer controller according to the fourth aspect of the present invention may further comprise second means for receiving a paging update message including a current address, a sequence number, and a paging update interval time of the mobile node in a current sub-network from the mobile node, and third means for directly transferring the received paging update message to a pure-micro gateway router located at the boundary between a quasi-micro mobility network for performing prefix-based routing and a pure-micro mobility network for performing host-based routing of a packet addressed to the mobile node and also for performing the prefix-based routing.

The data transfer controller according to the fourth aspect of the present invention may further comprise second means for receiving a paging request message for an idle mobile node, and third means for broadcasting the received paging request message to a downstream sub-network.

In accordance with a fifth aspect of the present invention, a data transfer controller for controlling data transfer through a network comprises means for creating, updating, or confirming a paging cache, a routing cache, and a mapping cache, for routing to a mobile node upon receipt of a pure-micro registration request message including a current address of the mobile node, the current address being created by the mobile node, an old address thereof set in a previous sub-network, and an old physical network prefix corresponding to the previous sub-network.

In accordance with a sixth aspect of the present invention, a data transfer controller for controlling data transfer through a network comprises (1) a mapping cache associating an old address of a mobile node with a new address thereof and storing information for transferring a data packet, which was transmitted to the old address of the mobile node in a previous sub-network, to the new address thereof in a current sub-network, and (2) means for overwriting a destination address in the data packet with the new address stored in the mapping cache when the destination address in the data packet is as same as the old address in the mapping cache, and for transferring the data packet.

In accordance with a seventh aspect of the present invention, a data transfer controller for controlling data transfer through a network comprises (1) a mapping cache associating an old address of a mobile node with a new address thereof and storing information for transferring a data packet, which was transmitted to the old address of the mobile node in a previous sub-network, to the new address thereof in a current sub-network, and (2) means for creating or updating the mapping cache upon receipt of a cache update message including a current address of the mobile node, an old address thereof set in a previous sub-network, and an old physical network prefix corresponding to the previous sub-network.

In accordance with a eighth aspect of the present invention, a data transfer controller for controlling data transfer through a network comprises means for transmitting a routing tear-down message requesting deletion of a routing cache storing routing information of a mobile node in a previous sub-network to a next-hop router given in accordance with an old physical network prefix upon receipt of a routing update message including a current address of the mobile node, an old address thereof set in the previous sub-network, and an old physical network prefix corresponding to the previous sub-network.

In accordance with a ninth aspect of the present invention, a data transfer controller for controlling data transfer through a network comprises (1) a paging cache which stores an address of a mobile node and which serves as a cache for storing an idle mobile node connected to the network, and (2) means for creating or updating the paging cache upon receipt of a paging update message including a current address of the mobile node, the current address being created by the mobile node.

In accordance with a tenth aspect of the present invention, a data transfer controller for controlling data transfer through a network is located at the boundary between a quasi-micro mobility network for performing prefix-based routing and a pure-micro mobility network for performing host-based routing of a packet addressed to a mobile node and also for performing the prefix-based routing. The data transfer controller comprises means for transmitting a cache update message including a current address of the mobile node, the current address being created by the mobile node, an old address thereof set in a previous sub-network, and an old physical network prefix corresponding to the previous sub-network when the data transfer controller determines that the mobile node moves from one pure-micro mobility network to another, each pure-micro mobility network having a different virtual network prefix, upon receipt of a pure-micro registration request message including the current address, the old address, and the old physical network prefix.

In accordance with an eleventh aspect of the present invention, a data transfer controller for controlling data transfer through a network comprises means for performing a duplication check for a current address of a mobile node, and for transmitting a pure-micro registration acknowledgement message including the check result to an access router to which the mobile node is connected.

In accordance with a twelfth aspect of the present invention, a data transfer controller for controlling data transfer through a network comprises means for setting lifetimes of a paging cache, a routing cache, and a mapping cache for routing, based on values created by a mobile node included in a paging update message, a routing update message, and a cache update message, respectively.

In accordance with a thirteenth aspect of the present invention, a data transfer controller for controlling data transfer through a network comprises (1) first means for receiving a paging update message including an address, a sequence number, and a paging update interval time of a mobile node, and (2) second means for creating a paging cache based on the paging update message when the paging cache for storing an idle mobile node connected to the network does not exist, for determining whether to update the created paging cache according to the sequence number when the paging cache has been created, and for updating the paging cache when the determination is affirmative.

In accordance with a fourteenth aspect of the present invention, a data transfer controller for controlling data transfer through a network comprises (1) first means for receiving a paging update message including a current address of a mobile node, the current address being created by the mobile node, and (2) second means for deleting a routing cache when the routing cache for routing to an active mobile node exists as a cache for storing a route to an address corresponding to a value of a current address field of the mobile node in the received paging update message.

In accordance with a fifteenth aspect of the present invention, a data transfer controller for controlling data transfer through a network comprises (1) first means for receiving a data packet, and (2) second means for transferring the received data packet according to routing information on a destination address in the data packet when the routing information is included in a routing table or in a routing cache for routing to an active mobile node, and for broadcasting a page request message to a downstream sub-network when the routing information on the destination address is not included in the routing table nor in the routing cache but is stored in a paging cache for storing an idle mobile node.

In accordance with a sixteenth aspect of the present invention, a data transfer controller for controlling data transfer through a network comprises (1) first means for receiving a data packet, and (2) second means for checking if an old address of the mobile node having the same value as a destination address in the data packet exists in a mapping cache associating the old address with a new address thereof, when routing information on the destination address in the data packet is not included in a routing table or in a routing cache for routing to an active mobile node, nor in a paging cache for storing an idle mobile node, for rewriting a value of a destination address field in the data packet with another value of a new address field of the mobile node in the mapping cache, for transferring the data packet according to the overwritten destination address when the old address of the mobile node exists in a mapping cache, and for abandoning the data packet when the old address of the mobile node does not exist in a mapping cache.

In accordance with a seventeenth aspect of the present invention, a program for executing communication processing through a network on a computer system comprises the steps of (1) receiving a physical network prefix associated with a corresponding sub-network in a domain having at least two sub-networks and a router advertisement which serves as an information report from an access router and which includes a virtual network prefix for a mobile node, (2) setting an address of the mobile node based on the virtual network prefix obtained from the received router advertisement and also based on an identifier of the communication terminal, and (3) creating a pure-micro registration request message including a current address of the mobile node, an old address thereof set in a previous sub-network, and an old physical network prefix corresponding to the previous sub-network, and transmitting the pure-micro registration request message to an access router of a current sub-network to which the mobile node is connected.

In accordance with a eighteenth aspect of the present invention, a program for executing communication processing through a network on a computer system comprises the steps of (1) comparing a value of a virtual network prefix, as data constituting an address of a mobile node, included in a router advertisement received from a router to a value of the virtual network prefix included in an old address of the mobile node used in a previous sub-network or a value of a physical network prefix as data constituting an address associated with the previous sub-network when the mobile node moves from one sub-network to another, and (2) creating an address of the mobile node based on the virtual network prefix included in the received router advertisement only when the compared two prefixes are different from each other.

In accordance with a nineteenth aspect of the present invention, a program for executing communication processing through a network on a computer system comprises the steps of (1) determining if a router advertisement received from an access router includes a value of a virtual network prefix as data constituting an address of a mobile node when the mobile node moves from one sub-network to another, and (2) creating an address of the mobile node based on a physical network prefix included in the received router advertisement when the router advertisement includes a value of a physical network prefix and does not include the value of the virtual network prefix.

In accordance with a twentieth aspect of the present invention, a program for executing communication processing through a network on a computer system comprises the steps of (1) receiving a message including a determination as to whether a current address of a mobile node is duplicated, and (2) creating a new interface ID again, and transmitting a pure-micro registration request message, as an address setting request message which sets the current address of the mobile node based on the new interface ID, to an access router when the determination is affirmative.

In accordance with a twenty-first aspect of the present invention, a program for executing communication processing through a network on a computer system comprises the steps of (1) receiving the router advertisement which serves as an information report of the router and which stores data of acceptable hold time ranges of a paging cache, a routing cache, and a mapping cache for routing to the mobile node, and (2) setting lifetimes of the respective caches based on the data of the acceptable hold time ranges of the respective caches in the received router advertisement, and storing the set lifetimes (i) in a routing update message, (ii) in the pure-micro registration request message including a current address of the mobile node, an old address thereof set in a previous sub-network, and (iii) in a paging update message including the current address, a sequence number, and a paging update interval time of the mobile node in a current sub-network corresponding to the routing cache, the mapping cache, and the paging cache, respectively.

In accordance with a twenty-second aspect of the present invention, a program for executing communication processing through a network on a computer system comprises the steps of (1) receiving a paging request message for an idle mobile node, and (2) creating a routing update message including a current address of the mobile node, and for transmitting the routing update message to the access router of the sub-network when the received paging request message includes an address of the mobile node.

In accordance with a twenty-third aspect of the present invention, a program for executing communication processing through a network on a computer system comprises the steps of creating a paging update message including an address, a sequence number, and a paging update interval time of the mobile node in a current sub-network, and transmitting the paging update message to the access router of the sub-network to which the mobile node is connected, during a transition period from a communication mode to a stand-by mode.

In accordance with a twenty-fourth aspect of the present invention, a program for executing communication processing through a network on a computer system in a data transfer controller of a sub-network to which a mobile node is connectable comprises the step of creating a router advertisement, as an information report from an access router, to the mobile node which performs address-setting. The router stores a physical network prefix associated with the sub-network and a virtual network prefix for the mobile node as a network prefix which is different from the physical network prefix, and transmitting the created router advertisement to the mobile node.

In accordance with a twenty-fifth aspect of the present invention, a program for executing communication processing through a network on a computer system in a data transfer controller in a domain including at least two sub-networks to which a mobile node is connectable comprises the steps of (1) creating or updating a routing cache as a cache associating an address corresponding to the mobile node for host-routing to the mobile node with an address of a next-hop router upon receipt of a routing update message including a current address of the mobile node, the current address being created by the mobile node, and (2) deleting a routing cache storing old routing information of the mobile node in a previous sub-network upon receipt of a routing tear-down message which include a current address of the mobile node and which is transmitted from an upper-level data transfer controller, and an old physical network prefix which is set in the mobile node in the previous sub-network and which corresponds to the previous sub-network.

In accordance with a twenty-sixth aspect of the present invention, a program for executing communication processing through a network on a computer system in a data transfer controller in a domain including at least two sub-networks to which a mobile node is connectable comprises the steps of (1) receiving a pure-micro registration request message from the mobile node, the pure-micro registration request message including a current address of the mobile node, an old address thereof in a previous sub-network, and an old physical network prefix corresponding to the previous sub-network, (2) transferring the pure-micro registration request message to a pure-micro gateway router located at the boundary between a quasi-micro mobility network for performing prefix-based routing and a pure-micro mobility network for performing host-based routing of a packet addressed to the mobile node and also for performing the prefix-based routing, (3) receiving a pure-micro registration acknowledgement message which is created by the pure-micro gateway router and which includes a check result of a determination as to whether a current address of the mobile node is registered in the pure-micro mobility network or not, and (4) transferring the pure-micro registration acknowledgement message to the mobile node.

In accordance with a twenty-seventh aspect of the present invention, a program for executing communication processing through a network on a computer system in a data transfer controller in a domain including at least two sub-networks to which a mobile node is connectable comprises the steps of (1) creating a router advertisement which serves as an information report from an access router and which stores data of acceptable hold time ranges of a paging cache, a routing cache, and a mapping cache for routing and (2) transmitting the router advertisement to the mobile node.

In accordance with a twenty-eighth aspect of the present invention, a program for executing communication processing through a network on a computer system in a data transfer controller in a domain including at least two sub-networks to which a mobile node is connectable comprises the steps of (1) receiving a paging update message including a current address, a sequence number, and a paging update interval time of the mobile node in a current sub-network from the mobile node, and (2) directly transferring the received paging update message to a pure-micro gateway router located at the boundary between a quasi-micro mobility network for performing prefix-based routing and a pure-micro mobility network for performing host-based routing of a packet addressed to the mobile node and also for performing the prefix-based routing.

In accordance with a twenty-ninth aspect of the present invention, a program for executing communication processing through a network on a computer system in a data transfer controller in a domain including at least two sub-networks to which a mobile node is connectable comprises the steps of (1) receiving a paging request message for an idle mobile node, and (2) broadcasting the received paging request message to a downstream sub-network.

In accordance with a thirtieth aspect of the present invention, a program for executing communication processing through a network on a computer system in a data transfer controller in a domain including at least two sub-networks to which a mobile node is connectable comprises the steps of creating, updating, or confirming a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network.

In accordance with a thirty-first aspect of the present invention, a program for executing communication processing through a network on a computer system in a data transfer controller in a domain including at least two sub-networks to which a mobile node is connectable comprises the steps of (1) comparing a destination address in a data packet to be transferred to an old address of the mobile node included in a mapping cache associating the old address with a new address thereof, and (2) overwriting the destination address in the data packet with the new address stored in the mapping cache when the destination address in the data packet is as same as the old address in the mapping cache, and transferring the data packet.

In accordance with a thirty-second aspect of the present invention, a program for executing communication processing through a network on a computer system in a data transfer controller in a domain including at least two sub-networks to which a mobile node is connectable comprises the steps of (1) receiving a cache update message including a current address of the mobile node, an old address thereof set in a previous sub-network, and an old physical network prefix corresponding to the previous sub-network, and (2) creating or updating a mapping cache associating the old address with the current address of the mobile node based on the cache update message.

In accordance with a thirty-third aspect of the present invention, a program for executing communication processing through a network on a computer system in a data transfer controller in a domain including at least two sub-networks to which a mobile node is connectable comprises the steps of (1) receiving a routing update message including a current address of the mobile node, an old address thereof set in a previous sub-network, and an old physical network prefix corresponding to the previous sub-network, and (2) transmitting a routing tear-down message requesting deletion of a routing cache storing routing information of the mobile node in the previous sub-network to a next-hop router given in accordance with the old physical network prefix.

In accordance with a thirty-fourth aspect of the present invention, a program for executing communication processing through a network on a computer system in a data transfer controller in a domain including at least two sub-networks to which a mobile node is connectable comprises the steps of (1) receiving a paging update message including a current address of the mobile node, the current address being created by the mobile node, and (2) creating or updating a paging cache which stores an address corresponding to the mobile node and which serves as a cache for storing an idle mobile node connected to a network upon receipt of the paging update message.

In accordance with a thirty-fifth aspect of the present invention, a program for executing communication processing through a network on a computer system in a data transfer controller in a domain including at least two sub-networks to which a mobile node is connectable comprises the steps of (1) receiving a pure-micro registration request message including a current address of the mobile node, the current address being created by the mobile node, an old address thereof set in a previous sub-network, and an old physical network prefix corresponding to the previous sub-network, and (2) transmitting a cache update message including the current address of the mobile node, the current address being created by the mobile node, the old address thereof set in the previous sub-network, and the old physical network prefix corresponding to the previous sub-network to the data transfer controller, when the program determines that the mobile node moves from one pure-micro mobility network to another, each pure-micro mobility network having a different virtual network prefix upon receipt of the pure-micro registration request message.

In accordance with a thirty-sixth aspect of the present invention, a program for executing communication processing through a network on a computer system in a data transfer controller in a domain including at least two sub-networks to which a mobile node is connectable comprises the steps of performing a duplication check for a current address of the mobile node, and transmitting a pure-micro registration acknowledgement message including the check result to an access router to which the mobile node is connected.

In accordance with a thirty-seventh aspect of the present invention, a program for executing communication processing through a network on a computer system in a data transfer controller in a domain including at least two sub-networks to which a mobile node is connectable comprises the steps of setting lifetimes of a paging cache, a routing cache, and a mapping cache for routing, based on values created by the mobile node included in a paging update message, a routing update message, and a cache update message, respectively.

In accordance with a thirty-eighth aspect of the present invention, a program for executing communication processing through a network on a computer system in a data transfer controller in a domain including at least two sub-networks to which a mobile node is connectable comprises the steps of (1) receiving a paging update message including an address, a sequence number, and a paging update interval time of the mobile node, and (2) creating a paging cache based on the paging update message when the paging cache for storing an idle mobile node connected to a network does not exist, determining whether to update the created paging cache according to the sequence number when the paging cache has been created, and updating the paging cache when the determination is affirmative.

In accordance with a thirty-ninth aspect of the present invention, a program for executing communication processing through a network on a computer system in a data transfer controller in a domain including at least two sub-networks to which a mobile node is connectable comprises the steps of (1) receiving a paging update message including a current address of the mobile node, the current address being created by the mobile node, and (2) deleting a routing cache when the routing cache for routing to an active mobile node exists as a cache for storing a route to an address corresponding to a value of a current address field of the mobile node in the received paging update message.

In accordance with a fortieth aspect of the present invention, a program for executing communication processing through a network on a computer system in a data transfer controller in a domain including at least two sub-networks to which a mobile node is connectable comprises the steps of (1) receiving a data packet, and (2) transferring the received data packet according to routing information on a destination address in the data packet when the routing information is included in a routing table or in a routing cache for routing to an active mobile node, and broadcasting a page request message to a downstream sub-network when the routing information on the destination address is not included in the routing table nor in the routing cache but is stored in a paging cache for storing an idle mobile node.

In accordance with a forty-first aspect of the present invention, a program for executing communication processing through a network on a computer system in a data transfer controller in a domain including at least two sub-networks to which a mobile node is connectable comprises the steps of (1) receiving a data packet, and (2) checking if an old address of the mobile node having the same value as a destination address in the data packet exists in a mapping cache associating the old address with a new address thereof, when routing information on the destination address in the data packet is not included in a routing table or in a routing cache for routing to an active mobile node, nor in a paging cache for storing an idle mobile node, rewriting a value of a destination address field in the data packet with another value of a new address field of the mobile node in the mapping cache, transferring the data packet according to the overwritten destination address when the old address of the mobile node exists in a mapping cache, and abandoning the data packet when the old address of the mobile node does not exist in a mapping cache.

Here, the computer programs according to the present invention are such programs as running on a general-purpose computer for executing a variety of program codes in a computer readable form such as a storage medium and a communication medium.

By providing such programs in a computer readable form, the foregoing steps are processed on the computer system according to the corresponding programs. Installing the computer programs on the computer system allows the programs to achieve a cooperative effect on the computer system, thus achieving the same advantages with those of the other aspects of the present invention.

Objects, features, and advantages of the present invention will be appreciated through the following description of a preferable embodiment of the present invention with reference to the accompanying drawings.

BRIEF DESCRIPTION OF THE DRAWINGS

FIG. 22 is a view of an exemplary format of a virtual network prefix information option (ICMPv6 router advertisement) according to the present invention;

FIG. 23 is a view of an exemplary format of a PMR (pure-micro registration request) message (UDP) according to the present invention;

FIG. 31 is a flow chart illustrating processing when the mobile node moves between different pure-micro mobility networks (PMMN) in the same domain according to the present invention.

DESCRIPTION OF THE PREFERRED EMBODIMENTS

Figure 16:
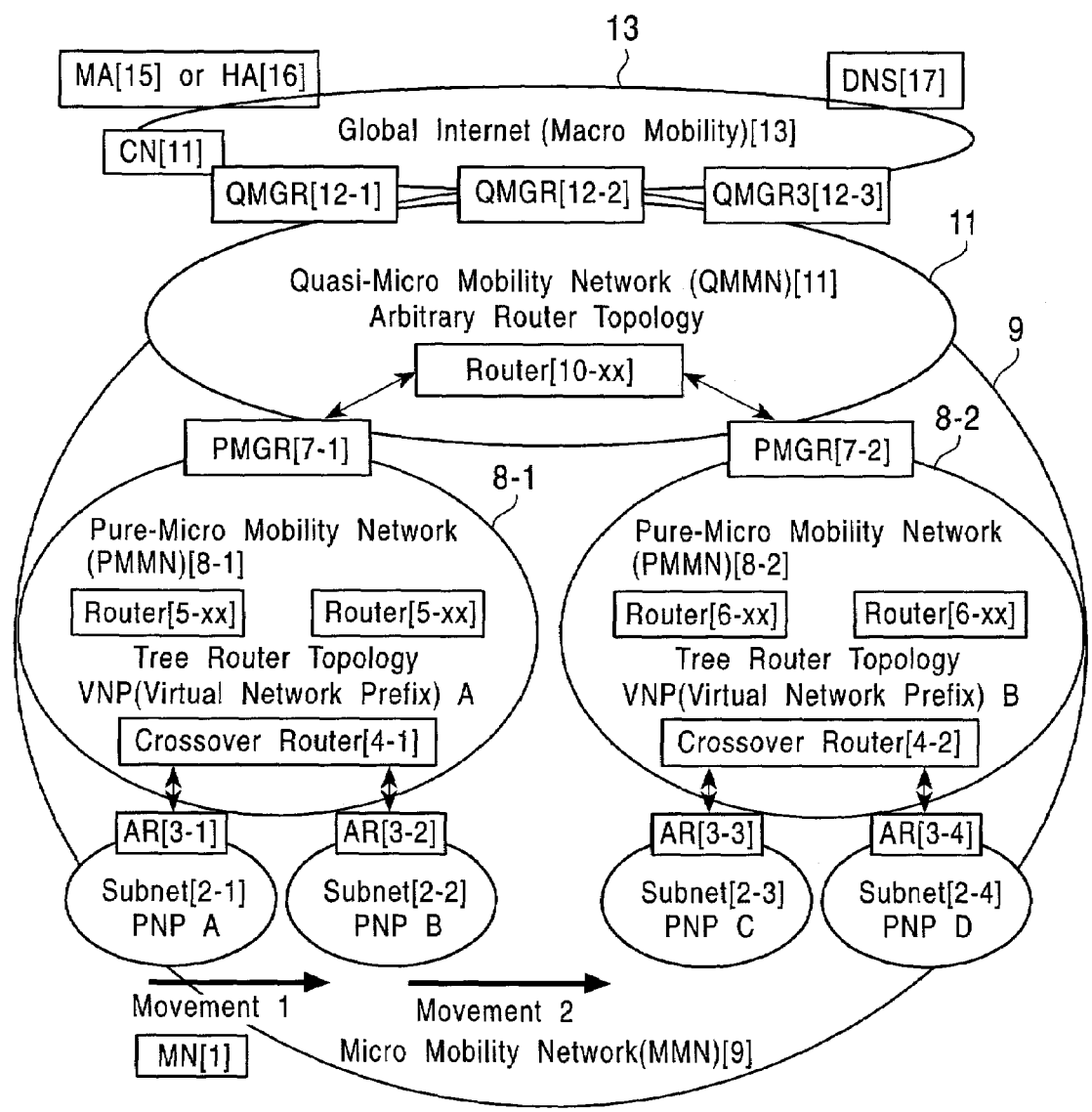
FIG. 16 is a view of the configuration of a network to which the present invention is applied.

FIG. 16 illustrates an exemplary configuration of a network to which the communication processing system and the communication processing method of the present invention are applied. Nodes included in the network perform communication based on IPv6 addresses.

Figure 17:
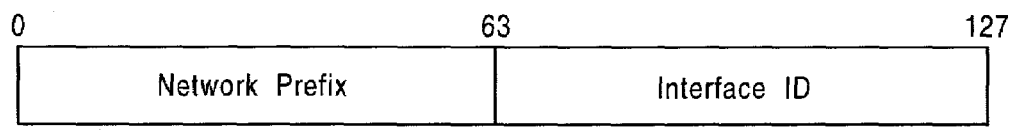
FIG. 17 is a view of the configuration of an IPv6 address to which the present invention is applied.

Each IPv6 address has a 128-bit configuration, as shown in FIG. 17. The lower 64 bits thereof is an interface ID serving as a node identifier for uniquely identifying a node on the Internet or a subnet, and the upper 64 bits is a network prefix serving as a location indicator for indicating a sub-network to which the node is connected. Thus, terminal devices that belong to essentially the same sub-network have the same network prefix that is indicated by the upper 64 bit of each IPv6 address.

In the configuration in FIG. 16, a micro mobility network (MMN) 9 is a domain constituted by a plurality of sub-networks. The domain herein collectively refers to a plurality of sub-networks. First, in the micro mobility network (MMN) 9, a quasi-micro mobility network (QMMN) 11 exists at the top, pure-micro mobility networks (PMMN) 8-1 and 8-2 exist under the quasi-micro mobility network (QMMN) 11, and sub-networks (subnets) 2-1, 2-2, 2-3, and 2-4 exist under the pure-micro mobility network 8-1 and 8-2. A mobile node (MN) 1 is connected to each of the sub-networks (subnets) 2-1, 2-2, 2-3, and 2-4 to communicate with, for example, a correspondent node (CN) 14 that is connected to the global Internet 13 outside the micro mobility network (MMN) 9.

While FIG. 16 illustrates an exemplary configuration in which two pure-micro mobility networks (PMMN) 8-1 and 8-2 and four sub-networks (hereinafter may be referred to as "subnets") exist in the micro mobility network (MMN) 9, the number of these networks is not limited to the number shown in the figure and thus an arbitrary number of networks can be connected.

The quasi-micro mobility network (QMMN) 11 in the micro mobility network (MMN) 9, the pure-micro mobility networks (PMMN) 8-1 and 8-2, and the subnets 2-1, 2-2, 2-3, and 2-4 are intra- or inter-connected with each other by routers.

In the configuration shown in FIG. 16, if a network prefix in the range of, for example, 3ffe:501:100c:0000::/64 to 3ffe:501:100c:ffff::/64 is assigned to the subnets constituting the micro mobility network (MMN) 9, then the micro mobility network (MMN) 9, which includes those subnets, can be defined as a domain to which the address space of, for example, 3ffe:501:100c::/48 is assigned.

In general, a network prefix is assigned for each subnet, and when a node (a host, e.g., the node (MN) 1 in FIG. 16) serving as a terminal device is connected to one subnet, the node (host) uses a network prefix assigned to the subnet to perform stateless auto-configuration (RFC2462) as address setting processing. Thus, the node (host) generates an IPv6 address using an interface identifier, which can be locally generated by itself, and the network prefix that is information notified from a router. As described above, the IPv6 address includes the network prefix and the interface identifier, and the host serving as a node for executing communication sets its own address by the stateless auto-configuration (RFC2462).

Information notified from a router is referred to as a "router advertisement (RFC2461) message" and includes the network prefix as link information, Internet parameters, and the like. The router advertisement is transmitted from a router in response to a router solicitation message from a host or is periodically transmitted from a router.

In the configuration in which such address setting processing is executed, when the node (host) is a mobile node, the network prefix varies each time the node moves between subnets having different network prefixes. This involves processing for changing the IPv6 address of the node accordingly. Typically, a network prefix for each subnet is assigned, from an address space that has been assigned to each organization, by an administrator of an organization (an ISP, corporation, university, or the like) forming the corresponding subnet.

The configuration of the present invention has simplified processing for changing the IPv6 address of a node during movement between the subnets as described above. That is, the concept of a virtual network prefix is incorporated in the domain as a dedicated prefix for a mobile node. The term "virtual network prefix" is a special network prefix for micro mobility, which does not vary even when a mobile node moves between different subnets.

For example, in FIG. 16, it is assumed that the address space of 3ffe:501:100c::/48 is assigned to the micro mobility network (MMN) 9, and further the address space of 3ffe:501:100c:a000::/52 to 3ffe:501:100c:b000::/52 is assigned to each of the pure micro mobility network (PMMN) 8-1 and 8-2 in the micro mobility network (MMN) 9.

In this case, the pure-micro mobility network (PMMN) 8-1 uses 3ffe:501:100c:a000::/64 to 3ffe:501:100c:affe::/64 as the physical network prefix and uses 3ffe:501:100c:afff::/64 as the virtual network prefix. Similarly, the pure-micro mobility network (PMMN) 8-2 uses 3ffe:501:100c:b000::/64 to 3ffe:501:100c:bffe::/64 as the physical network prefix and uses 3ffe:501:100c:bfff::/64 as the virtual network prefix. The physical network prefix (PNP) is a network prefix that is set so as to correspond to a subnet that exists in the domain, whereas the virtual network prefix (VNP) is defined as a network prefix for micro mobility rather than a network prefix that is set so as to correspond to a subnet that exists in the domain.

The assignment policy/operation policy of the virtual network prefix (VNP) is determined by the administrator of each domain. Essentially, a network prefix that is not assigned to a subnet in the domain is assigned for micro mobility, so that a router that executes routing in the domain can identify a network prefix as a network prefix for micro mobility.

A node connected to a subnet in the domain that supports a virtual network prefix performs stateless automatic configuration using the virtual network prefix, so that the node does not need to change an IPv6 address including the virtual network prefix and an interface ID, when the node moves between sub-networks in an area (PMMN) having a common virtual network prefix in the domain. This is because the virtual network prefix can be used among all subnets within each pure-micro mobility network (PMMN).

Thus, the mobile node can freely move between different subnets within the pure-micro mobility network (PMMN) without executing address update processing, so that support for micro mobility is provided. Routing within a pure-micro mobility network (PMMN) to a node having an IPv6 address that is set using the virtual network prefix employs host routing, which is routing processing based on the lower 64-bit interface ID of the IPv6 address. The routing processing will be described later in detail.

In addition, a node connected to a subnet within the domain supporting the virtual network prefix can change routing by special processing in the quasi-micro mobility network (QMMN), which is an upper-layer network within the domain, even when the node moves between pure-micro mobility networks (PMMN) having different virtual network prefixes in the domain. This can eliminate the need for transmitting a binding update packet to a home agent or a mapping agent. The processing will be more specifically described later.

The network configuration shown in FIG. 16 will now be described. The subnets 2-1, 2-2, 2-3, and 2-4 are configured over a communication medium such as a wired/wireless medium or a common medium/point-to-point medium. Additionally, the subnets 2-1, 2-2, 2-3, and 2-4 have a configuration in which a plurality of terminal devices (mobile nodes), including the node (MN) 1, can be connected thereto. Physical network prefixes (PNP) A, B, C, and D are assigned to the subnets 2-1, 2-2, 2-3, and 2-4, respectively.

A plurality of routers 5-xx and 6-xx are networked in the pure-micro mobility networks (PMMN) 8-1 and 8-2. The pure-micro mobility networks (PMMN) 8-1 and 8-2 are connected to the higher-level quasi-micro mobility network (QMMN) 11 through pure-micro gateway routers (PMGR) 7-1 and 7-2 serving as network boundary routers, and are also connected to lower-level subnets through access routers 3-1, 3-2, 3-3, and 3-4.

Figure 18:
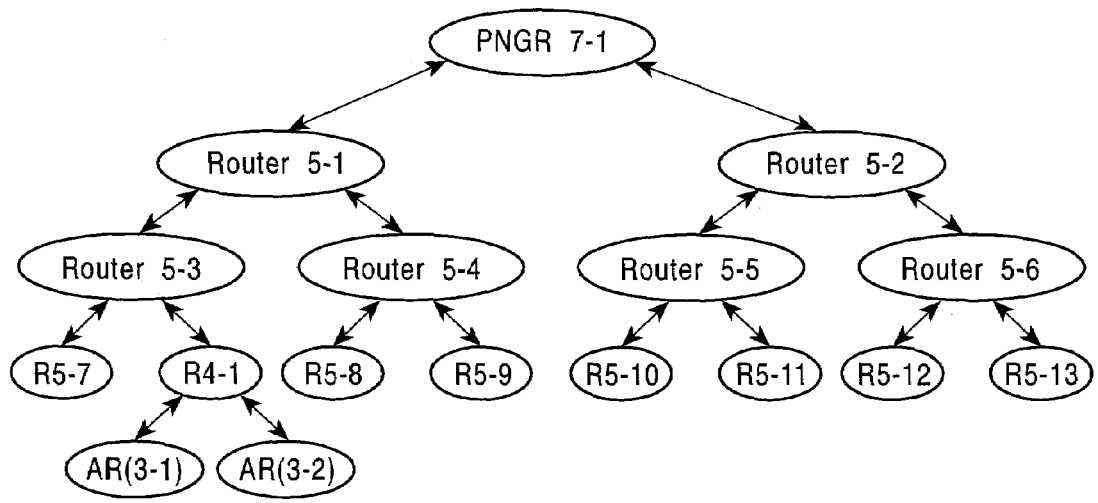
FIG. 18 is a view illustrating an example of a tree router topology in which a plurality of routers is networked in the configuration of the present invention.

The routers 5-xx and 6-xx in the pure-micro mobility network (PMMN) 8-1 and 8-2 have a tree router topology with the pure micro gateway routers (PMGR) 7-1 and 7-2 as roots, respectively. FIG. 18 illustrates an example of the tree router topology in which the plurality of routers 5-xx is included in the pure-micro mobility network (PMMN) 8-1.

Among the routers 5-xx in the pure-micro mobility network (PMMN) 8-1, in particular, the router located at the branch point to the routes for the access router (AR) 3-1 and for the access router (AR) 3-2 will be called a crossover router 4-1. Among the routers 6-xx in the pure-micro mobility network 8-2, in particular, the router located at the branch point to the routes for the access router (AR) 3-3 and for the access router (AR) 3-4 will be called a crossover router 4-2.

Different virtual network prefixes (VNP) A and B are assigned to the pure-micro mobility networks 8-1 and 8-2, respectively. Thus, when the mobile node (MN) 1 is connected to one of the subnets 2-1 and 2-2 connected with the pure-micro mobility network (PMMN) 8-1, the virtual network prefix (VNP) A of the pure-micro mobility network 8-1 can be used as the prefix of the mobile node (MN) 1. Likewise, when the mobile node (MN) 1 is connected to one of the subnets 2-3 and 2-4 connected with the pure-micro mobility network (PMMN) 8-2, the virtual network prefix (VNP) B of the pure-micro mobility network 8-2 can be used as the prefix of the mobile node (MN) 1. The details will be described later.

The quasi-micro mobility network (QMMN) 11 is connected at a higher level than the pure-micro mobility networks 8-1 and 8-2 and is connected to the global Internet 13 outside the micro mobility network (MMN) 9 through quasi-micro gateway routers (QMGR) 12-1, 12-2, and 12-3. The quasi-micro mobility network (QMMN) 11 is also connected to the lower-level pure-micro mobility network (PMMN) 8-1 and 8-2 through the corresponding pure-micro gateway routers 7-1 and 7-2.

Figure 19:
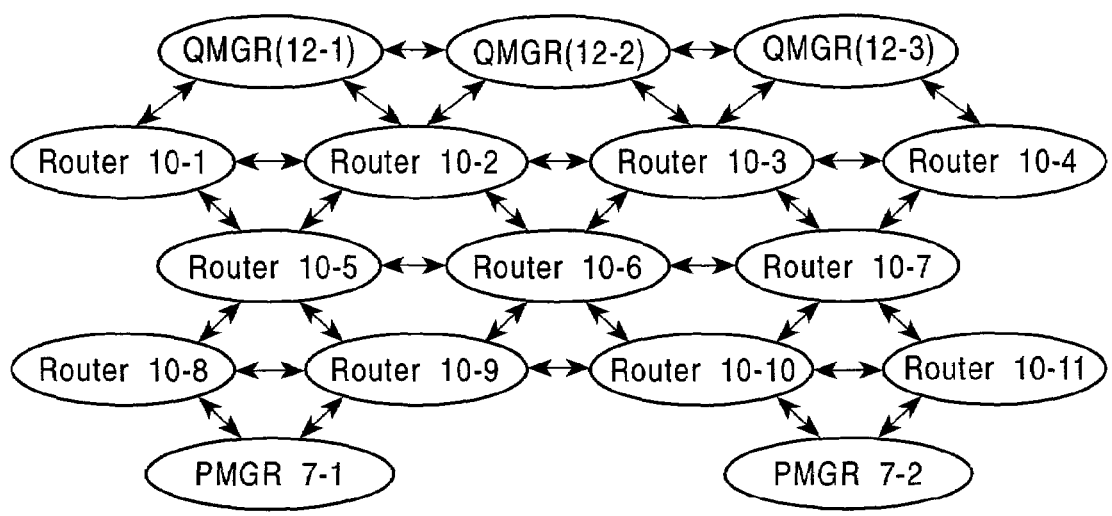
FIG. 19 is a view illustrating an example of an arbitrary topology in which a plurality or routers is networked in the configuration of the present invention.

A plurality of routers 10-xx provides connections within the quasi-micro mobility network (QMMN) 11. The topology of the routers is not limited to a tree router topology and can be any arbitrary topology. FIG. 19 illustrates an example of an arbitrary topology in which the plurality of routers 10-xx is provided in the quasi-micro mobility network (QMMN) 11.

The corespondent node (CN) 14, located outside the domain in which the mobile node (MN) 1 is located, that performs communication with the mobile node (MN) 1 is connected to the global Internet 13. Based on an address obtained by querying the domain name system (DNS) 17, the correspondent node 14 communicates with the mobile node (MN) 1 through the Internet 13, the quasi-micro mobility network (QMMN) 11, one of the pure-micro mobility networks (PMMN) 8-1 and 8-2, and further through one of the subnets 2-1, 2-2, 2-3, and 2-4.

The quasi-micro gateway routers (QMGR) 12-1, 12-2, and 12-3 serving as domain boundary routers and the routers 10-xx (see FIG. 19) within the quasi-micro mobility network (QMMN) 11 route a packet based on the upper 64-bit prefix of an IPv6 address (see FIG. 17).

The routers 5-xx and 6-xx (see FIG. 18) within the pure-micro gateway routers (PMGR) 7-1 and 7-2 and the pure-micro mobility networks (PMMN) 8-1 and 8-2, and the access routers (AR) 3-1, 3-2, 3-3, and 3-4 route a packet based on the lower 64-bit network prefix of the IPv6 address in addition to routing based on the upper 64-bit network prefix of the IPv6 address.

The routing will now be described briefly. For example, routing over the Internet 13 is executed based on the upper 64-bit network prefix of an IPv6 address which is stated in the destination address field in the IPv6 header of a data packet to be transmitted to a mobile node (in the case of FIG. 16, terminal device (MN) 1). This routing is referred to as "prefix-based routing". Similarly, in the quasi-micro mobility network (QMMN) 11 within the micro mobility network (MMN) 9, prefix-based routing, that is, routing based on the upper 64-bit network prefix of an IPv6 address is performed.

When the upper 64-bit network prefix of an IPv6 address stated in the destination address field of the IPv6 header of a data packet is a physical network prefix that corresponds to the subnet within the pure-micro mobility network (PMMN) 8-1 and 8-2, an ordinary physical network prefix-based routing is executed in the pure-micro mobility networks (PMMN) 8-1 and 8-2 and subnets 2-1, 2-2, 2-3, and 2-4. When the upper 64-bit network prefix of an IPv6 address stated in the destination address field of the IPv6 header of a data packet is a virtual network prefix, host routing, that is, routing based on the lower 64-bit interface ID of the IPv6 address is performed to deliver the packet to a mobile node in which the IPv6 address having the virtual network prefix is set.

As described above, the IPv6 address includes a network prefix and an interface ID. A host serving as a node that performs communication sets its own address using stateless auto-configuration (RFC2462). The host uses information that can be locally generated by itself and information that is notified from a router, to generate an IPv6 address as its own address.

The information notified from a router is called a "router advertisement (RFC2461) message", which includes link information, Internet parameters, and the like. The router advertisement is transmitted from a router in response to a router solicitation message sent from a host or is transmitted periodically.

In the system of the present invention, the router advertisement to be notified to a node (host) includes not only the physical network prefix of a subnet to which the node is connected but also the virtual network prefix that is a network prefix for micro mobility.

Possible methods for storing the virtual network prefix in the router advertisement includes a configuration in which a virtual network prefix information option is newly created in a router advertisement for storing the virtual network prefix. FIG. 22 illustrates the format of the virtual network prefix information option.

Information mainly stored in the format of the virtual network prefix information option shown in FIG. 22 includes a type indicating the option number of the option, a code, reserved routing update interval time (min.) to mapping cache hold time (max.), virtual network prefix (VNP) information. These pieces of information are included in the router advertisement and transmitted.

Thus, a node connected to the subnet receives the virtual network prefix information, which is a network prefix for micro mobility, as the router advertisement, in addition to the physical network prefix of the connected subnet. The node which has received the router advertisement selects an interface ID, which is information that can be locally generated by itself, and a physical network prefix or virtual network prefix, which is information notified from a router, and generates an IPv6 address using stateless auto-configuration.

As described above, within the pure-micro mobility network (PMMN) 8-1 and 8-2 and the subnets 2-1, 2-2, 2-3, and 2-4, host routing, that is, routing based on the lower 64-bit interface ID of an IPv6 address is performed to deliver a packet to a mobile node in which the IPv6 address of the virtual network prefix is set, in addition to the ordinary routing based on a physical network prefix.

To perform the host routing, the pure-micro mobility network gateway routers (PMGR) 7-1 and 7-2, the routers 5-xx and 6-xx, and the access routers 3-1, 3-2, 3-3, and 3-4 must hold information for each mobile node, that is, information concerning the next packet destination (next hop) that is set so as to correspond to each host entry, as a routing table.

The mobile node (host) transmits a routing update message to a router when it moves between the subnets. The router, after receiving the routing update message, executes processing in accordance with the message. That is, in the case in which the router is located on the route to the mobile node (host) and when a routing table held by the router does not have the entry of the corresponding host, the router generates a host entry. On the other hand, in the case in which the router is on the route to the mobile node (host) and when there is a host entry, the router executes update processing as required.

In the configuration of the present invention, different processing for notifying each upper-level router is executed based on how the mobile node moves between the subnets, that is, moving between lower-level subnets in the same pure-micro mobility network (PMMN), moving between lower-level subnets in different pure-micro mobility networks (PMMN), or moving between subnets in different domains. The processing will be described later in detail.

When a mobile node implements a macro mobility protocol such as the IPv6 or LIN6, the mobile node stores, as the care-of-address, a virtual network prefix-based IPv6 address generated by the address generation processing based on the virtual network prefix, in a binding update message and transmits it to a home agent (HA) 16 that manages the mobile node. In the case of the LIN6, the mobile node stores the virtual network prefix as a current locator in a mapping update message and transmits it to the mapping agent (MA) 15 that is an agent managing the mobile node.

In the case of the mobile IPv6, the node has two IP addresses, that is, a home address and a care-of-address. The care-of-address is an address that varies so as to correspond to a connected sub-network as the node moves. In this case, the care-of-address is a virtual network prefix-based IPv6 address. The home address remains the same regardless of the movement of the node.

The home agent (HA) 16 in the mobile IPv6 is a node for managing a sub-network associated with the home address of a node. When a communication node has moved, the home agent (HA) 16 receives a new care-of-address, in this case, a binding update packet including a virtual network prefix-based IPv6 address, and updates the binding cache storing the association of the home address and the virtual network prefix-based IPv6 address.

Figure 20:
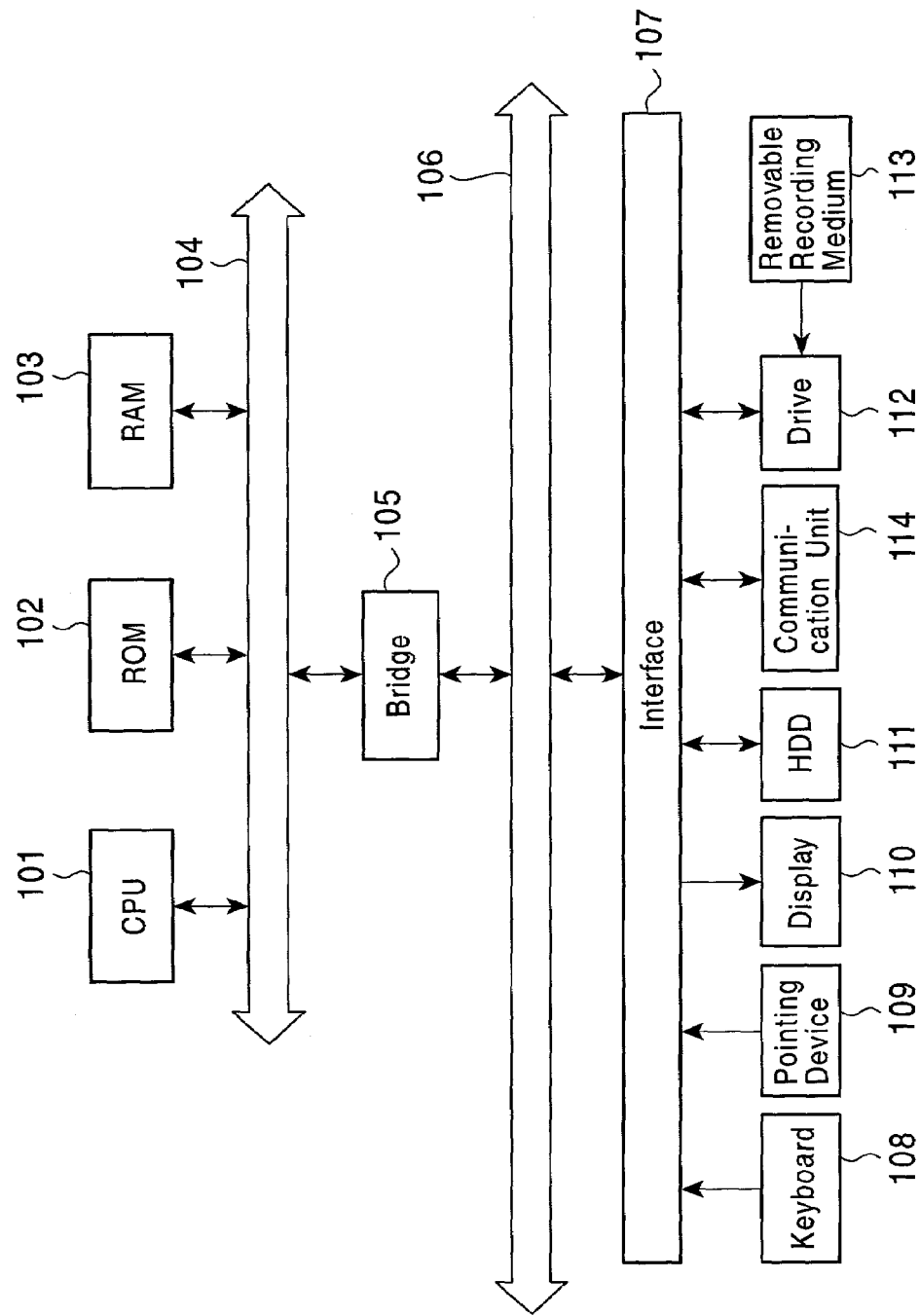
FIG. 20 is a view of the configuration of a node in the configuration of the present invention.

The configuration of the mobile node (MN) 1 shown in FIG. 16 will now be described with reference to FIG. 20. A CPU (central processing unit) 101 executes various application programs and an OS (operating system). A ROM (read only memory) 102 stores programs executed by the CPU 101 or fixed data as operation parameters. A RAM (random access memory) 103 is used as a storage area and work area for parameters that vary accordingly based on a program or the processing of a program executed by the CPU 101.

A host bus 104 is connected to an external bus 106 such as a PCI (peripheral component Internet/interface) bus through a bridge 105.

A keyboard 108 is operated by a user for inputting various commands, and a pointing device 109 is operated by the user to designate a location on a display 110 or to designate a command. The display 110 is, for example, a CRT (cathode ray tube) or LCD (liquid crystal display), and displays various pieces of information as text or images. An HDD (hard disk drive) 111 drives a hard disk, which is an information recording medium, and reads/writes a program or data to/from the hard disk.

A drive 112 records/playbacks a program or data to/from a removable recording medium 113 such as a floppy disk, CD-ROM (compact disk read-only memory), MO (magneto optical) disk, DVD (digital versatile disk), optical disk, or semiconductor memory.

When the CPU 101 executes a program or processes data read from the recording medium, the read program or data is supplied to, for example, the connected RAM 103 through the interface 107, the external bus 106, the bridge 105, and the host bus 104.

The keyboard 108, the pointing device 109, the display 110, the HDD 111, a communication unit 114, and the drive 112 are connected to the interface 107, which is connected to the CPU 101 through the external bus 106, the bridge 105, and the host bus 104.

The communication unit 114 communicates with a router and the like of a subnet to which a node is connected, packetizes data supplied from the CPU 101, the HDD 111, or the like, and transmits the packet or executes processing for receiving a packet through the router. The communication unit 114 is connected to the CPU 101 through the external bus 106, the bridge 105, and the host bus 104.

Figure 21:
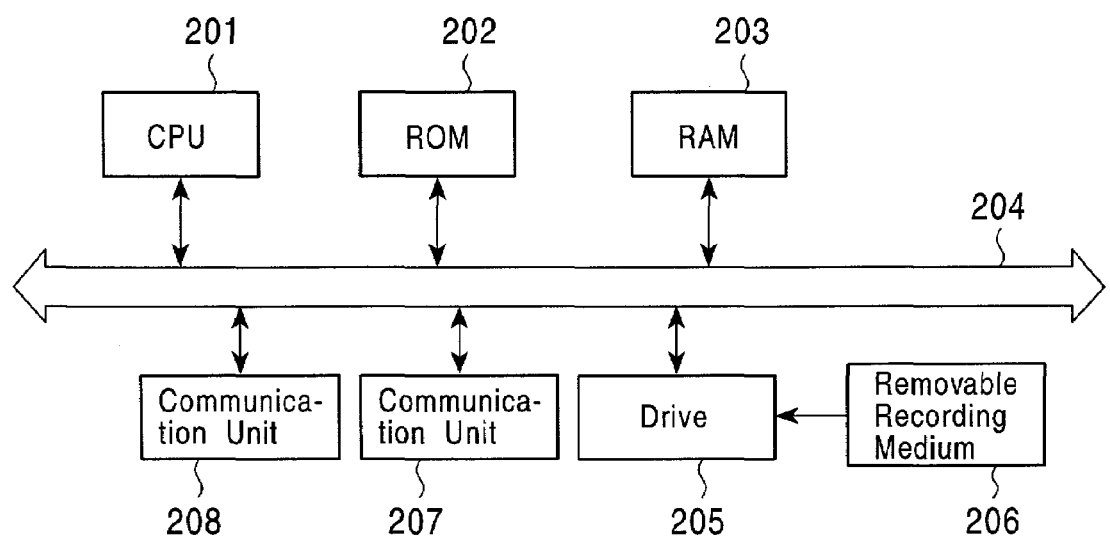
FIG. 21 is a view of the configuration of a router in the configuration of the present invention.

Next, the configuration of routers for executing relay processing of a packet, that is, the quasi-micro gateway routers (QMGR) 12-1, 12-2, and 12-3, the routers 10-xx, 5-xx, and 6-xx, the pure-micro gateway routers (PMGR) 7-1 and 7-2, the crossover routers 4-1 and 4-2, and the access routers (AR) 3-1, 3-2, 3-3, and 3-4 will be described with reference to FIG. 21.

A CPU (central processing unit) 201 executes various application programs and an OS (operating system). A ROM (read only memory) 202 stores programs executed by the CPU 201 or fixed data as operation parameters. A RAM (random access memory) 203 is used as a storage area and work area for parameters that vary accordingly based on a program or the processing of a program executed by the CPU 201.

A drive 205 records/playbacks a program or data to/from a removable recording medium 206 such as a floppy disk, CD-ROM (compact disk read-only memory), MO (magneto optical) disk, DVD (digital versatile disk), optical disk, or semiconductor memory. When the CPU 201 executes or processes a program or data read from the recording medium, the read program or data is supplied to, for example, the RAM 203, a communication unit 207, and a communication unit 208 through a bus 204.

The communication unit 207 is an upper-level router or a communication unit for connecting to the Internet, and transmits a packet generated through data processing by the CPU 201 and receives a packet through the Internet or an upper-level router. The communication unit 207 is connected to a subnet and executes processing for transmitting a packet, received from an upper-level router, to a lower-level router or a node through the subnet.

The CPU 201, the ROM 202, the RAM 203, the drive 205, the communication unit 207, and the communication unit 208 are interconnected through the bus and are configured to enable data transfer.

Each phase of processing executed in the configuration and each device of the present invention will now be described in detail in the following order.

I. Processing Steps Performed in the System of the Present Invention
(A) Registration
(B) Paging
(C) Movement in a single pure-micro mobility network (PMMN)
(D) Movement between different pure-micro mobility networks (PMMN) in the domain.
(E) Flow of cache update message II. Devices in the System of the Present Invention
(a) Mobile node
(b) Access router (AR)
(c) Router in the pure-micro mobility network (PMMN)
(d) Pure-micro gateway router (PMGR)
(e) Router in the quasi-micro mobility network (QMMN)

I. Processing Steps Performed in the System of the Present Invention
    (A) Registration
Processing steps performed when a mobile node (MN) 1 is connected to a subnet 2-1 in a micro mobility network (MMN) 9 shown in FIG. 16 will now be described.

(A-1)

When power is applied to the mobile node (MN) 1, a link is established between the mobile node (MN) 1 and the subnet 2-1 in the micro mobility network (MMN) 9 by a physical layer (wireless or wired)/a MAC layer.

(A-2)

The mobile node (MN) 1 transmits a router solicitation (RS) message to the access router (AR) 3-1 of the subnet 2-1 by using the IP layer, or receives a router advertisement (RA) message including a virtual network prefix information option shown in FIG. 22, which is periodically transmitted from the access router (AR) 3-1. Thus, the mobile node (MN) 1 obtains a virtual network prefix (VNP) A of a pure-micro mobility network (PMMN) 8-1 and a physical network prefix (PNP) A of the subnet 2-1.

That is to say, an IPv6 address comprises a network prefix and an interface ID, and the mobile node (MN) 1 acting as a host for performing communication performs stateless auto-configuration, in accordance with RFC2462, to set its own address. The host generates the IPv6 address as its own address by using the information generated locally by itself and by using the information advertised by the router.

The information advertised by the router is called the router advertisement (RA), in accordance with RFC2461, including link information, Internet parameters and so forth. The router advertisement (RA) is transmitted periodically, or is transmitted by the router in response to the router solicitation (RS) message sent from the host.

In this system, the router advertisement for the mobile node (MN) 1 acting as the host includes not only the physical network prefix (PNP) of the subnet 2-1 to which the mobile node (MN) 1 is connected, but also the virtual network prefix (VNP) that is the network prefix for micro mobility.

For storing the virtual network prefix (VNP) in the router advertisement (RA), the virtual network prefix information option may be provided in the router advertisement (RA). The format of the virtual network prefix information option is shown in FIG. 22.

The type field stores the option number and the code field stores the code thereof. The reserved field is provided for future extension. The routing update interval time Min. to the mapping cache hold time Max. are fields for storing information about the acceptable range of hold times of a routing cache, a paging cache, and a mapping cache. The virtual network prefix field stores the virtual network prefix (VNP). This option is included in the router advertisement (RA) that includes a prefix information option storing the physical network prefix (PNP). The router advertisement (RA) is then transmitted to the mobile node (MN) 1.

That is to say, the mobile node (MN) 1 connected to the subnet 2-1 can receive the router advertisement (RA) including the physical network prefix of the subnet 2-1 and virtual network prefix information that is the network prefix for micro mobility.

(A-3)

The mobile node (MN) 1 generates its own IPv6 address by combining the virtual network prefix (VNP) A with the global unique identifier (ID), or with the interface ID. For example, the IPv6 address can comprise the virtual network prefix (VNP) A of the upper 64 bits and the global unique identifier (ID), or the interface ID of the lower 64 bits.

After receiving the router advertisement (RA), the mobile node (MN) 1 performs stateless auto-configuration by combining the interface ID that is the information locally generated by itself with either the physical network prefix or the virtual network prefix, which are advertised by the router. Accordingly, the IPv6 address is generated.

(A-4)

For performing the registration of the IPv6 address, the mobile node (MN) 1 transmits the pure-micro registration request message (PMR-RM) shown in FIG. 23 to the access router (AR) 3-1. Upon receiving the pure-micro registration request message (PMR-RM) from the mobile node (MN) 1, the access router (AR) 3-1 transfers the pure-micro registration request message (PMR-RM) to the pure-micro gateway router (PMGR) 7-1 via the pure-micro mobility network (PMMN) 8-1.

As shown in FIG. 23, the pure-micro registration request message (PMR-RM) is formed as a packet, e.g., a UDP packet. The packet comprises the current MN IPv6 address that is set for the mobile node (MN) 1 at present and the old MN IPv6 address that was set for the mobile node (MN) 1 in the past, that is, the mobile node (MN) 1 before moving between the subnets. Further, the packet comprises the old physical network prefix (old PNP). However, when the power is applied to the mobile node (MN) 1, the old MN IPv6 address and the old physical network prefix (old PNP) do not exist. Therefore, this information is not stored in the packet.

(A-5)

Upon receiving the pure-micro registration request message (PMR-RM), the pure-micro gateway router (PMGR) 7-1 checks whether the IPv6 address of the mobile node (MN) 1, which is stored in the pure-micro registration request message (PMR-RM) exists in the paging cache and in the routing cache. That is to say, an address duplication test is performed.

The paging cache is the cache which is held and controlled by the pure-micro gateway router (PMGR). The paging cache stores the information about the IPv6 address of the mobile node (MN) in an idle-mode and exists in the pure-micro mobility network (PMMN) managed by the pure-micro gateway router (PMGR). The paging cache stores the following information in an associative manner.

Mobile node (MN) IPv6 address (16 bytes)
Lifetime (4 bytes)
Sequence number (4 bytes)

The routing cache is the cache which is held and controlled by the router in the pure-micro mobility network (PMMN). The routing cache stores the following information in an associative manner for performing host routing for the mobile node in an active mode in the pure-micro mobility network (PMMN).

Mobile node (MN) IPv6 address (16 bytes)
Next-hop router's IPv6 address (16 bytes)
Lifetime (4 bytes)
Sequence number (4 bytes)

(A-6)

After the duplication test is performed by the pure-micro gateway router (PMGR) 7-1, when it is found that the IPv6 address of the mobile node (MN) 1 stored in the pure-micro registration request message (PMR-RM) does not exist in the paging cache or in the routing cache, that is to say, when the IPv6 address is not duplicated, the pure-micro gateway router (PMGR) 7-1 forms a paging cache for the IPv6 address of the mobile node (MN) 1. After forming the paging cache, the pure-micro gateway router (PMGR) 7-1 transmits the pure-micro registration acknowledgement message (PMR-ack message), shown in FIG. 24, to the access router (AR) 3-1 for advertising that the registration is completed. Incidentally, the pure-micro gateway router (PMGR) 7-1 may perform authentication, authorization, and accounting (AAA) as authentication processing before creating the paging cache for the mobile node (MN) 1.

Figure 24:
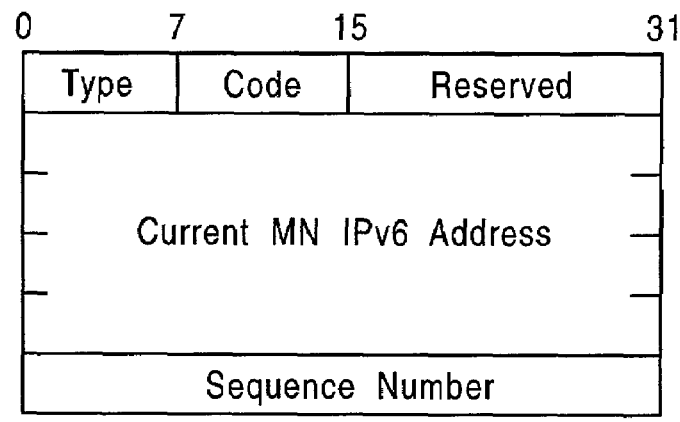
FIG. 24 is a view of an exemplary format of a PMR-Ack (pure-micro registration acknowledgement) message (UDP) according to the present invention.

As shown in FIG. 24, the pure-micro registration acknowledgement message (PMR-ack message) is formed as a packet, such as a UDP packet. The packet comprises the current mobile node (MN) IPv6 address of the pure-micro registration request message (PMR-RM) shown in FIG. 23, the sequence number, and the code showing whether the address is duplicated or not.

(A-7)

After the duplication test, when it is found that the IPv6 address of the mobile node (MN) 1 stored in the pure-micro registration request message (PMR-RM) exists in the paging cache and in the routing cache, that is to say, when it is duplicated in the paging cache and in the routing cache, the pure-micro gateway router (PMGR) 7-1 transmits the pure-micro registration acknowledgement message (PMR-ack message) to the access router (AR) 3-1 to advertise that the registration is not permitted because the address is duplicated. The paging cache for mobile nodes including the mobile node (MN) 1, which are registered with the pure-micro gateway router (PMGR) 7-1, is controlled in soft state. That is to say, unless the pure-micro gateway router (PMGR) 7-1 receives the paging update message shown in FIG. 25 from the mobile nodes including the mobile node (MN) 1, which are registered with the pure-micro gateway router (PMGR) 7-1, the paging cache is deleted after a predetermined time (lifetime).

Figure 25:
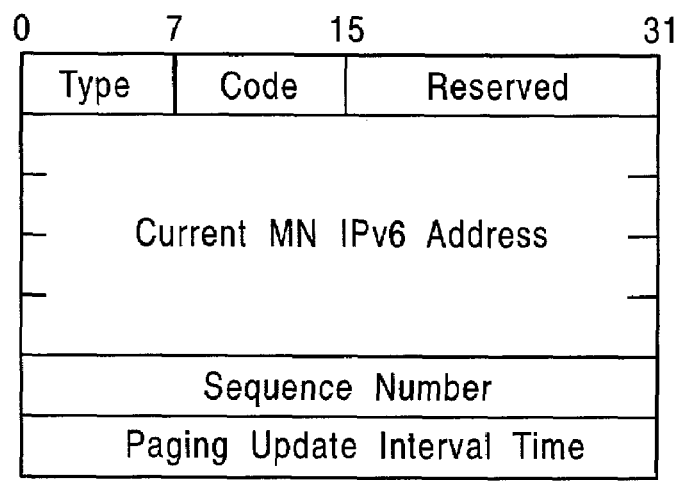
FIG. 25 is a view of an exemplary format of a paging update message (UDP) according to the present invention.

The paging update message shown in FIG. 25 is formed as a packet, e.g., a UDP packet, comprising the current MN IPv6 address, the sequence number, and the paging update interval time of the pure-micro registration request message (PMR-RM) shown in FIG. 23.

(A-8)

Upon receiving the pure-micro registration acknowledgement message (PMR-ack message) from the pure-micro gateway router (PMGR) 7-1, the access router (AR) 3-1 transfers the received pure-micro registration acknowledgement message (PMR-ack message) to the mobile node (MN) 1.

(A-9)

The mobile node (MN) 1 receives the pure-micro registration acknowledgement message (PMR-ack message) from the access router (AR) 3-1. If the mobile node (MN) 1 does not receive the pure-micro registration acknowledgement message (PMR-ack message) after waiting for a predetermined time, the mobile node (MN) 1 re-transmits the pure-micro registration request message (PMR-RM).

The mobile node (MN) 1 receives the pure-micro registration acknowledgement message (PMR-ack message) from the access router (AR) 3-1. When the IPv6 address generated by the mobile node (MN) 1 is duplicated, or when the mobile node (MN) 1 cannot receive the pure-micro registration acknowledgement message (PMR-ack message) after re-transmitting the pure-micro registration request message (PMR-RM) several times, the mobile node (MN) 1 re-generates the interface ID as the identifier of the mobile node (MN) 1 of the lower 64 bits of the IPv6 address, thereby generating a new IPv6 address. Then, the mobile node (MN) 1 returns to (A-4) and performs the registration processing again.

When the registration is not performed after repeating the above-described processing steps a plurality of times, that is to say, a predetermined maximum number of times, the mobile node (MN) 1 stops trying to set the address using the virtual network prefix (VNP) A which is set corresponding to the pure-micro mobility network (PMMN) 8-1, and starts setting the address by using the physical network prefix (PNP). Since the mobile node (MN) 1 is connected to the subnet 2-1, the mobile node (MN) 1 sets the address using the physical network prefix (PNP) A of the subnet 2-1.

When the mobile node (MN) 1 supports the LIN6 protocol disclosed in Japanese Patent Application No. 2000-005560 that was filed by the present applicant and when the registration of the virtual network prefix (VNP) fails, the mobile node (MN) 1 can instantly perform stateless auto-configuration, in accordance with RFC2462, by using the physical network prefix (PNP).

(A-10)

After the registration of the IPv6 address is completed, when support for macro mobility is needed, the mobile node (MN) 1 transmits a mapping update message or a binding update message to a mapping agent (MA) 15 or to a home agent (HA) 16 for updating the current position information of the mobile node (MN) 1.

When the mobile node (MN) 1 has a macro mobility protocol such as Mobile IPv6 installed therein, the mobile node (MN) 1 transmits the binding update message storing IPv6 address generated by the stateless auto-configuration by using the virtual network prefix as a care-of-address (CoA) (the IPv6 address based on the virtual network prefix) to the home agent (HA) 16. When the mobile node has LIN6 installed therein, the mobile node transmits the mapping update message storing the virtual network prefix as the current locator to the mapping agent (MA) acting as the agent that manages the mobile node (MN) 1.

As described above, when using mobile IPv6, the mobile node (MN) 1 has two IP addresses, that is, the home address and the care-of-address (CoA). The care-of-address (CoA) is an address that can vary according to the subnet to which the mobile node (MN) 1 is connected, corresponding to the inter-subnet movement of the mobile node (MN) 1. In this case, the address is formed as the IPv6 address based on the virtual network prefix. The home address is fixed irrespective of the movement of the mobile node (MN) 1.

When Mobile IPv6 is used, the home agent (HA) 16 is the node that controls the subnet corresponding to the home address of the mobile node. When the mobile node (MN) 1 moves, the home agent (HA) 16 receives a binding update packet including a new care-of-address, that is, the IPv6 address based on the virtual network prefix from the mobile node (MN) 1 after moving. Then, the home agent (HA) 16 updates the binding cache storing the association of the home address and the IPv6 address based on the virtual network prefix (VNP).

When LIN6 is installed therein, the mobile node (MN) 1 transmits the mapping update message storing the virtual network prefix as the current locator to the mapping agent (MA) 15. The mapping agent (MA) 15 updates the binding cache storing the association of the home address and the IPv6 address based on the virtual network prefix (VNP) on the basis of the received mapping update message.

When the mobile node (MN) 1 does not have the macro mobility protocol such as Mobile IPv6 or LIN6 installed therein, or when the mobile node (MN) 1 does not need support for macro mobility, the mobile node terminates the processing without transmitting the binding update packet.

Thereafter, for transmitting and receiving the packet, the mobile node (MN) 1 uses the IPv6 address based on the virtual network prefix (VNP), or the IPv6 address based on the physical network prefix (PNP).

(A-11)

When in the reception-standby mode, the mobile node (MN) 1 periodically transmits the paging update message shown in FIG. 25 to the access router (AR) 3-1 for maintaining the paging cache held in the pure-micro gateway router (PMGR) 7-1. The access router (AR) 3-1 transfers the received paging update message as it is to the pure-micro gateway router (PMGR) 7-1. Upon receiving the paging update message, the pure-micro gateway router (PMGR) 7-1 initializes the lifetime (4 bytes) of the paging cache for the mobile node (MN) 1. UDP, for example, is used for forming the paging update message.

(A-12)

Figure 26:
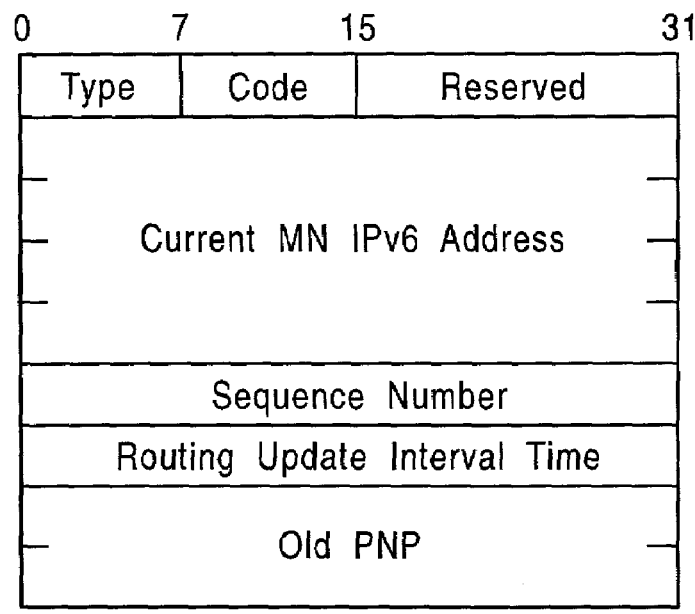
FIG. 26 is a view of an exemplary format of a routing update message (UDP) according to the present invention.

When shifting from the standby mode to the communication mode, the mobile node (MN) 1 forms a routing cache for the mobile node (MN) 1 in the router 5-xx in the pure-micro mobility network (PMMN) 8-1 by instantly transmitting the routing update message shown in FIG. 26 to the access router (AR) 3-1, before transmitting or receiving the data packet. UDP, for example, is used for forming the paging update message.

The routing update message is the packet which is transmitted from the mobile node (MN) 1 to the access router (AR) for generating and updating the routing cache for the mobile node (MN) 1, that is, the routing cache in the router in the pure-micro mobility network (PMMN). As shown in FIG. 26, the routing update message is formed as a packet, e.g., a UDP packet, which stores the current MN IPv6 address and the old physical network prefix (old PNP) that was set for the mobile node (MN) 1 before moving between the subnets. However, when power is applied to the mobile node (MN) 1, the old physical network prefix (old PNP) does not exist. Therefore, in such a case, the packet does not contain the old physical network prefix (old PNP) therein.

(A-13)

When the topology of the router 5-xx in the pure-micro mobility network (PMMN) 8-1 is configured as the tree router topology, as shown in FIG. 18, and when the access router (AR) 3-1 receives the routing update message transmitted from the mobile node (MN) 1, the access router (AR) 3-1 forms a routing cache for the mobile node (MN) 1 and transfers a routing update message to the upper-level router (parent router). The same operation is performed in the router 5-xx on the route from the access router (AR) 3-1 to the pure-micro gateway router (PMGR) 7-1. The routing cache for the mobile node (MN) 1, which is held by the router 5-xx, is controlled in soft state as in the case of the paging cache. That is to say, unless the access router (AR) 3-1 receives the routing update message transmitted from the mobile node (MN) 1, the access router (AR) 3-1 deletes the routing cache after a predetermined time (lifetime).

(A-14)

Upon receiving the routing update message, the pure-micro gateway router (PMGR) 7-1 forms a routing cache for the mobile node (MN) 1 and deletes the paging cache for the mobile node (MN) 1, as the router 5-xx in the pure-micro mobility network (PMMN) 8-1 does. The routing update message is not transferred to a router higher than the pure-micro gateway router (PMGR) 7-1. That is to say, the routing update message is not transferred to the quasi-micro mobility network (QMMN) 11.

In the above-described configuration, UDP is used for forming the routing update message. However, an IPv6 hop-by-hop option header may also be used, like the cache update message shown in FIG. 29. The details of the cache update message will be described later.

(B) Paging

The processing steps performed by the correspondent node (CN) 14 for transmitting a data packet to the mobile node (MN) 1 in the micro mobility network (MMN) 9 shown in FIG. 16 will now be described. The mobile node (MN) 1 is connected to a subnet lower than the pure-micro mobile network (PMMN) 8-1, and has the IPv6 address containing the virtual network prefix (VNP) A therein. The processing steps of the communication between the correspondent node (CN) 14 and the mobile node (MN) 1 are performed in accordance with the macro mobility protocol such as Mobile IPv6 or LIN6.

(B-1)

When the correspondent node (CN) 14 uses the LIN6 macro mobility protocol, the correspondent node (CN) 14 makes an inquiry to the mapping agent (MA) 15 to obtain the virtual network prefix (VNP) A that is used in the pure-micro mobility network (PMMN) 8-1 as the current network prefix of the mobile node (MN) 1. The obtained virtual network prefix (VNP) A is used as the upper 64 bits of the destination address in the IPv6 address, and the lower 64 bits are determined as the LIN-ID that is the global unique identifier of the mobile node (MN) 1. Thus, the correspondent node (CN) 14 transmits the data packet to the mobile node (MN) 1.

When using the Mobile IPv6 macro mobility protocol, the correspondent node (CN) 14 transmits the data packet to the home address of the mobile node (MN) 1. Upon receiving the data packet, the home agent (HA) 16 further transfers the data packet to the care-of-address (CoA) of the mobile node (MN) 1 which is registered therewith. The upper 64 bits of the care-of-address (CoA) of the mobile node (MN) 1 which is registered with the home agent (HA) 16 are the virtual network prefix (VNP) A.

When the correspondent node (CN) 14 uses either the LIN6 macro mobility protocol or the Mobile IPv6 macro mobility protocol, the data packet is transferred to the pure-micro gateway router (PMGR) 7-1.

On the Internet 13, routing (prefix-based routing) is performed based on the network prefix which is the upper 64 bits of the IPv6 address written in the destination address field in the IPv6 header of the data packet that is transmitted to the mobile node (MN) 1. In this case, the virtual network prefix (VNP) A used in the pure-micro mobility network (PMMN) 8-1 is used as the network prefix. Further, in the quasi-micro mobility network (QMMN) 11 in the micro mobility network (MMN) 9, routing (prefix-based routing) is performed based on the network prefix which is the upper 64 bits of the IPv6 address, that is, the virtual network prefix (VNP) A used in the pure-micro mobility network (PMMN) 8-1.

(B-2)

When the route leading to the destination address of the received data packet exists in the routing cache in the pure-micro mobility network (PMMN) 8-1, which stores the information for performing host routing for the mobile node (MN) 1 in the active mode, or exists in the usual routing table, the pure-micro gateway router (PMGR) 7-1 transfers the data packet along the route.

When the route leading to the mobile node (MN) 1 does not exist in the routing cache or in the routing table, the correspondent node (CN) 14 confirms whether the route exists in the paging cache for the destination address of the data packet. The paging cache exists in the pure-micro mobility network (PMMN) 8-1 and stores the information of the IPv6 address of the mobile node (MN) 1 in the idle mode. If the route exists in the paging cache, the correspondent node (CN) 14 determines that the mobile node (MN) 1 is in the reception-standby mode, saves the received data packet, and immediately broadcasts the paging request message shown in FIG. 27 to the lower-level router.

Figure 27:
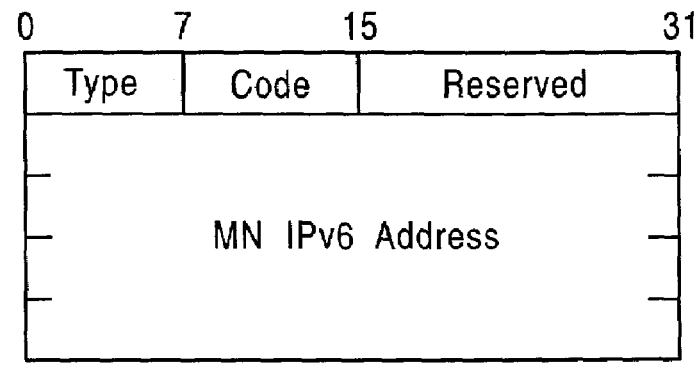
FIG. 27 is a view of an exemplary format of a paging request message (UDP) according to the present invention.

As shown in FIG. 27, the paging request message is formed as a packet storing the IPv6 address of the mobile node (MN) 1.

Upon receiving the paging request message, the router 5-xx in the pure-micro mobility network (PMMN) 8-1 further broadcasts the paging request message to the lower-level router.

Finally, the paging request message is transferred to the mobile node (MN) 1. Upon receiving the paging request message, the mobile node (MN) 1 immediately transmits the routing update message shown in FIG. 26, and forms a routing cache for the mobile node (MN) 1 in the router in the pure-micro mobility network (PMMN) 8-1.

When the routing cache for the mobile node (MN) 1 is formed in the pure-micro gateway router (PMGR) 7-1 that is the highest node of the pure-micro mobility network (PMMN) 8-1, the pure-micro gateway router (PMGR) 7-1 transfers the data packet held therein according to the routing cache, and deletes the paging cache.

According to the above-described method, the data packet is transmitted from the correspondent node (CN) 14 connected to the Internet to the mobile node (MN) 1 in the domain shown in FIG. 16.

According to the description shown in (B-2), the paging request message is transmitted for paging the mobile node (MN) 1. However, when the destination address of the received data packet exists in the paging cache, the paging may not be performed, but the data packet itself may be broadcasted for paging the mobile terminal (MN) 1. Accordingly, the transmission of the data packet is completed at one time.

(C) Movement in a Single Pure-micro Mobility Network (PMMN)

The processing steps performed when the mobile terminal (MN) 1 moves between the subnets in the pure-micro mobility network (PMMN) 8-1 shown in FIG. 16 will now be described. There are two different types of processing steps, one for the mobile terminal (MN) 1 in the reception-standby mode and another for the mobile terminal (MN) 1 in the communication mode.

(C1) Reception-standby Mode

The processing steps performed when the mobile node (MN) 1 in the reception-standby mode moves between the subnets in the pure-micro mobility network (PMMN) 8-1 shown in FIG. 16 will now be described.

(C1-1)

When the mobile node (MN) 1 in the standby mode moves from the access router (AR) 3-1 of the subnet 2-1 to the access router (AR) 3-2 of the subnet 2-2 in the same pure-micro mobility network (PMMN) 8-1, the radio link in the lower layer (the physical layer/the MAC layer) is changed according to the movement of the mobile node (MN) 1. In this case, the mobile node (MN) 1 immediately transmits a router solicitation message to the access router (AR) 3-2, or receives the router advertisement (RA) message periodically transmitted from the access router (AR) 3-2.

The router advertisement (RA) received from the access router (AR) 3-2 includes not only the physical network prefix of the subnet to which the mobile node (MN) 1 is connected but also the virtual network prefix that is the network prefix for micro mobility. In this case, the physical network prefix of the subnet to which the mobile node (MN) 1 is connected is the physical network prefix (PNP) B of the subnet 2-2. Further, the virtual network prefix (VNP) that is the network prefix for micro mobility is the virtual network prefix (VNP) A that is set corresponding to the pure-micro mobility network (PMMN) 8-1.

The value of the virtual network prefix stored in the router advertisement (RA) is the same as the value of the network prefix of the IPv6 address of the mobile node (MN) 1 before moving, the network prefix stored in the router advertisement (RA) received from the router of the subnet to which the mobile node (MN) 1 was connected before moving. Therefore, the same IPv6 address based on the virtual network prefix (VNP) A that was set corresponding to the pure-micro mobility network (PMMN) 8-1 can be used. At this time, since the mobile node (MN) 1 is in the standby mode, the routing update message is not transmitted.

(C2) Communication Mode

Figure 30:
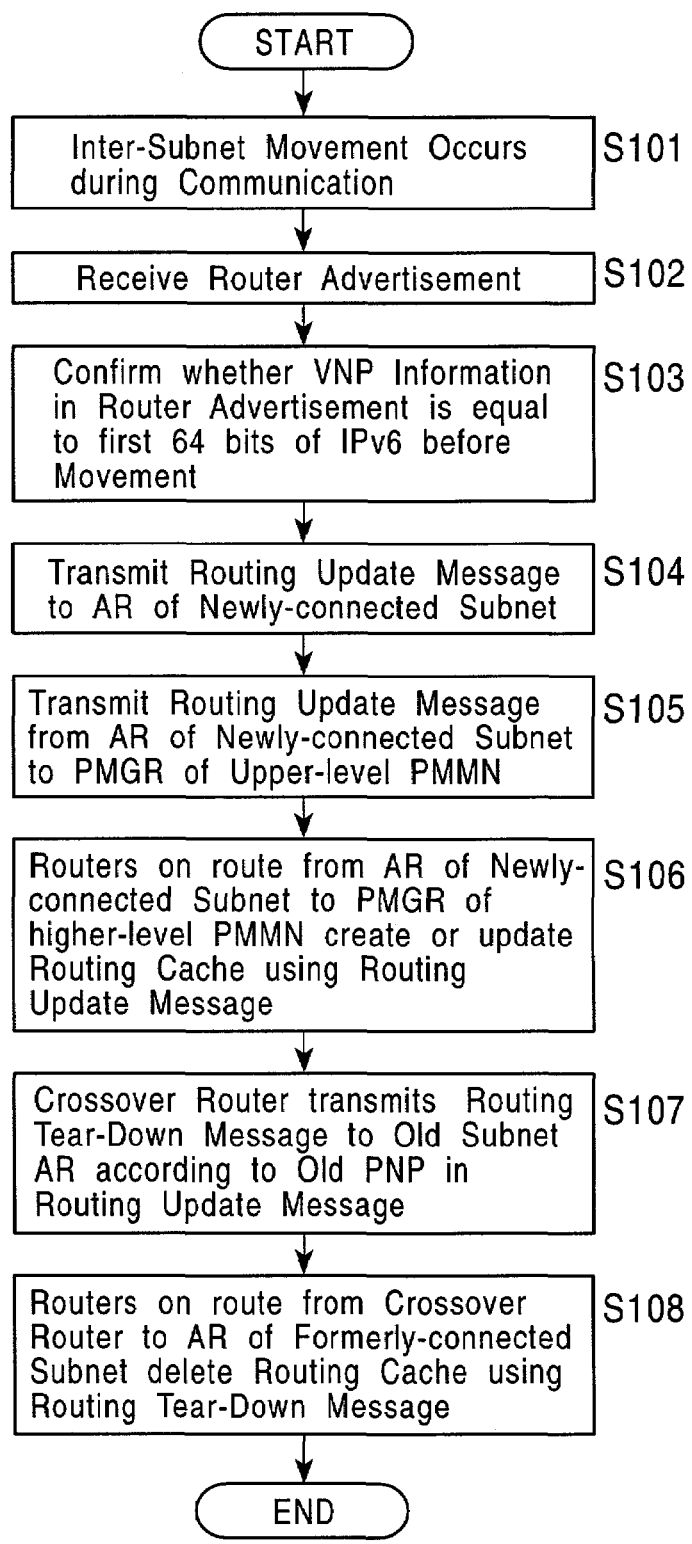
FIG. 30 is a flow chart illustrating processing when a mobile node move within a single pure-micro mobility network (PMMN) according to the present invention.

The processing steps performed when the mobile node (MN) 1 is in the communication mode and moves between the subnets within the same pure-micro mobility network (PMMN) shown in FIG. 16 will now be described with reference to FIG. 30, which is the flowchart of the processing steps.

(C2-1)

When the mobile node (MN) 1 moves from the access router (AR) 3-1 to the access router (AR) 3-2 (S101), while communicating with the correspondent node (CN) 14, the radio link in the lower layer (the physical layer/the MAC layer) is changed according to the movement. In this case, the mobile node (MN) 1 immediately transmits the router solicitation message to the access router (AR) 3-2, or receives the router advertisement (RA) message which is periodically transmitted from the access router (AR) 3-2.

The router advertisement (RA) message received from the access router (AR) 3-2 includes not only the physical network prefix of the subnet to which the mobile node (MN) 1 is connected but also the virtual network prefix that is the network prefix for micro mobility. In this case, the physical network prefix of the subnet to which the mobile node (MN) 1 is connected is the physical network prefix (PNP) B of the subnet 2-2, and the virtual network prefix (VNP) that is the network prefix for micro mobility is the virtual network prefix (VNP) A that is set corresponding to the pure-micro mobility network (PMMN) 8-1.

It is confirmed whether the virtual network prefix stored in the router advertisement is the same as the network prefix of the IPv6 address of the mobile node (MN) 1 before moving (S103). The network prefix is stored in the router advertisement (RA) received from the router of the subnet to which the mobile node (MN) 1 was connected before moving. Therefore, the same IPv6 address based on the virtual network prefix (VNP) A that is set corresponding to the pure-micro mobility network (PMMN) 8-1 can be used.

The mobile node (MN) 1 immediately transmits the routing update message to the access router (AR) 3-2 (S104), and creates or updates the routing cache for the mobile node (MN) 1 in the router 5-xx in the pure-micro mobility network (PMMN) 8-1. The routing cache stores the information in the pure-micro mobility network (PMMN) 8-1 in an associative manner, for performing the host routing to the mobile node (MN) 1, which is in an active mode.

(C2-2)

In this embodiment, the pure-micro mobility network (PMMN) 8-1 is configured as the tree router topology shown in FIG. 18. After receiving the routing update message transmitted from the mobile node (MN) 1, the access router (AR) 3-2 creates or updates the routing cache for the mobile node (MN) 1, and transfers the routing update message to the upper-level router (the parent router). The same processing steps are also performed in the router 5-xx on the route from the access router (AR) 3-2 to the pure-micro gateway router (PMGR) 7-1 (S105 and S106).

The crossover router 4-1 splits the two routes, one from the pure-micro gateway router (PMGR) 7-1 to the access router (AR) 3-1 and another from the pure-micro gateway router (PMGR) 7-1 to the access router (AR) 3-2. The crossover router 4-1 transmits the routing tear-down message shown in FIG. 28 to the access router (AR) 3-1 (S107), by using the old physical network prefix (old PNP) A included in the routing update message. The old physical network prefix (PNP) A is the prefix of the subnet 2-1 to which the mobile node (MN) 1 was connected before moving. Accordingly, the crossover router 4-1 deletes the old routing cache for the mobile node (MN) 1 (S108), the old routing cache existing in the router 5-xx on the same route on which the crossover router 4-1 exists.

More specifically, after deleting the old routing cache for the mobile node (MN) 1, the crossover router 4-1 obtains a next-hop router from the routing table, for transferring to the old physical network prefix (PNP) A that is the physical network prefix of the subnet 2-1 to which the mobile node (MN) 1 was connected before moving. Then, the crossover router 4-1 transfers the routing tear-down message to the next-hop router. The same processing steps are repeated in the router 5-xx on the route on which the crossover router 4-1 and the access router (AR) 3-1 exist.

Figure 28:
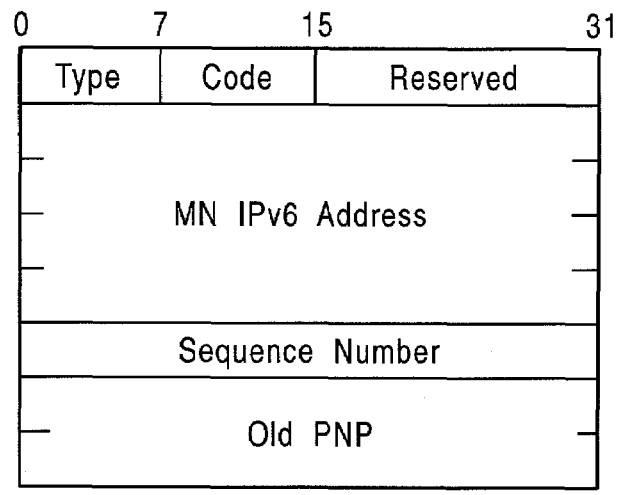
FIG. 28 is a view of an exemplary format of a routing tear-down message (UDP) according to the present invention.

The routing tear-down message is a packet which is transmitted from the crossover router to the access router (AR) for deleting the routing cache in the router in the pure-micro mobility network (PMMN), the routing cache storing the routing information about the mobile node (MN) 1 before moving. As shown in FIG. 28, the routing tear-down message is formed as a packet, e.g., a UDP packet, which stores the MN IPv6 address that is set for the mobile node (MN) 1 and the old physical network prefix (old PNP) that was set for the mobile node (MN) 1 before moving between the subnets. Incidentally, UDP may be used for forming the routing tear-down message.

(C2-3)

Upon receiving the routing tear-down message, the access router (AR) 3-1 deletes the old routing cache for the mobile node (MN) 1 before moving (S108). The routing tear-down message is not transmitted beyond the access router (AR) 3-1.

(C2-4)

Upon receiving the routing update message, the pure-micro gateway router (PMGR) 7-1 creates or updates the routing cache for the mobile node (MN) 1 in the same way as the router 5-xx in the pure-micro mobility network 8-1. The routing update message is not further transmitted after the routing cache is created or updated.

When the mobile node (MN) moves between the subnets to which the same virtual network prefix (VNP) is applied as described above, the routing cache of the router in the pure-micro mobility network (PMMN) is created or updated by using the routing update message. Further, by using the routing tear-down message, the old routing cache which exists in either the crossover router in the pure-micro mobility network (PMMN) or in the access router of the subnet to which the mobile node (MN) was connected before moving is deleted. Subsequently, in the pure-micro mobility network (PMMN), routing to the mobile node (MN) 1 is performed by the host-based routing on the basis of the routing cache.

(D) Movement Between Different Pure-micro Mobility Networks (PMMN) in the Domain (MMN)

Here, the processing steps performed when the mobile node (MN) moves between the subnets of the different pure-micro mobility networks (PMMN) within the micro mobility network (MMN) shown in FIG. 16 will now be described.

(D-1)

When the mobile node (MN) 1 moves from the access router (AR) 3-2 to the access router (AR) 3-3, the radio link in the lower layer (the physical layer/the MAC layer) is changed. Then, the mobile node (MN) 1 immediately transmits a router solicitation message to the access router 3-3, or receives a router advertisement (RA) message periodically transmitted from the access router 3-3.

The router advertisement (RA) message transmitted from the access router (AR) 3-3 includes not only the physical network prefix of the subnet to which the mobile node (MN) 1 is connected but also the virtual network prefix that is the network prefix for micro mobility. In this case, the physical network prefix of the subnet to which the mobile node (MN) 1 is connected is the physical network prefix (PNP) C of the subnet 2-3, and the virtual network prefix (VNP) that is the network prefix for micro mobility is the virtual network prefix (VNP) B that is set corresponding to the pure-micro mobility network (PMMN) 8-2.

When the mobile node (MN) 1 receives the router advertisement (RA) message transmitted from the access router (AR) 3-3, and finds that the virtual network prefix (VNP) A included in the virtual network prefix information option shown in FIG. 22 in the router advertisement (RA) is changed to the virtual network prefix (VNP) B, the mobile node (MN) 1 determines that it moved between different pure-micro mobility networks (PMMN).

(D-2)

Further, the mobile node (MN) 1 generates a new IPv6 address by stateless auto-configuration by combining the virtual network prefix (VNP) B and the global unique identifier (ID) of the mobile node (MN) 1 or the interface ID, which are included in the router advertisement (RA) message received from the access router (AR) 3-3.

(D-3)

The mobile node (MN) 1 transmits the pure-micro registration request message shown in FIG. 23 to the access router (AR) 3-3 for performing the registration of the generated IPv6 address. Upon receiving the pure-micro registration request message from the mobile node (MN) 1, the access router (AR) 3-3 transfers the pure-micro registration request message to the pure-micro gateway router (PMGR) 7-2.

The pure-micro registration request message (PMR-RM) is formed as a packet, e.g., a UDP packet, as shown in FIG. 23. The packet may comprise the current MN IPv6 address, the old MN IPv6 address including the old physical network prefix (old PNP), which was set for the mobile node (MN) 1 before moving between the subnets.

(D-4)

Upon receiving the pure-micro registration request message (PMR-RM), the pure-micro gateway router (PMGR) 7-2 checks whether the IPv6 address of the mobile node (MN) 1, which is stored in the pure-micro registration request message (PMR-RM), exists in the paging cache and in the routing cache which are held by the pure-micro gateway router (PMGR) 7-2 or not. That is, the address duplication test is performed.

(D-5)

When it is found that the IPv6 address of the mobile node (MN) 1 which is stored in the pure-micro registration request message (PMR-RM) does not exist in the paging cache and in the routing cache, that is to say, when it is found that the IPv6 address is not duplicated according to the result of the duplication test, the pure-micro gateway router (PMGR) 7-2 creates a paging cache for the IPv6 address of the mobile node (MN) 1. Then, the pure-micro gateway router (PMGR) 7-2 transmits a cache update message to the pure-micro gateway router (PMGR) 7-1 in the pure-micro mobility network (PMMN) 8-1. The pure-micro gateway router (PMGR) 7-1 corresponds to the old virtual network prefix (old VNP) A (the upper 64 bits of the old IPv6 address of the mobile node (MN) 1) included in the pure-micro registration request message (PMR-RM). The transmission processing for the cache update message will be described later.

After transmitting the cache update message to the pure-micro gateway router (PMGR) 7-1, the pure-micro gateway router (PMGR) 7-2 transmits a pure-micro registration acknowledgement message (PMR-ack message) shown in FIG. 24 to the access router (AR) 3-3. Incidentally, the pure-micro gateway router (PMGR) 7-2 may perform authentication, authorization, and accounting (AAA) as the identification processing before forming the paging cache for the mobile node (MN) 1.

As shown in FIG. 24, the pure-micro registration acknowledgement message (PMR-ack message) is formed as a packet, such as a UDP packet. The packet comprises the current MN IPv6 address, the sequence number, and the code for showing whether the address is duplicated or not, which are included in the pure-micro registration request message (PMR-RM) shown in FIG. 23.

(D-6)

When it is found that the IPv6 address of the mobile node (MN) 1 which is stored in the pure-micro registration request message (PMR-RM) exists in the paging cache and in the routing cache, that is to say, when it is found that the IPv6 address is duplicated according to the result of the duplication test, the pure-micro gateway router (PMGR) 7-2 transmits the pure-micro registration acknowledgement message (PMR-ack message) to the access router (AR) 3-3 for advertising that the registration of the address is not permitted because of the address duplication.

(D-7)

Upon receiving the pure-micro registration acknowledgement message (PMR-ack message) transmitted from the pure-micro gateway router (PMGR) 7-2, the access router (AR) 3-3 transfers the pure-micro registration acknowledgement message (PMR-ack message) to the mobile node (MN) 1.

(D-8)

When it is found that the IPv6 address generated by the mobile node (MN) 1 overlaps, or when the mobile node (MN) 1 cannot receive the pure-micro registration acknowledgement message (PMR-ack message) although the access router (AR) 3 transmits the pure-micro registration acknowledgement message (PMR-ack message) several times, the mobile node (MN) 1 regenerates the interface ID acting as the identifier of the mobile node (MN) 1 of the lower 64 bits of the IPv6 address. Thus, a new IPv6 address is formed. Then, the mobile node (MN) 1 goes back to (D-3) and performs the registration again.

When the registration is not completed after a plurality of attempts (for a predetermined maximum number of times), the mobile node (MN) 1 deletes the address using the virtual network prefix (VNP) B corresponding to the pure-micro mobility network (PMMN) 8-2, and starts setting a new address using the physical network prefix (PNP). In this case, the mobile node (MN) 1 is connected to the subnet 2-3. Therefore, the mobile node (MN) 1 sets the new address by using the physical network prefix (PNP) C of the subnet 2-3.

When the mobile node (MN) 1 supporting the LIN6 protocol disclosed in Japanese Patent Application No. 2000-005560 that was filed by the present applicant and when the registration of the virtual network prefix (VNP) fails, the mobile node (MN) 1 can instantly perform the stateless autoconfiguration, in accordance with RFC2462, by using the physical network prefix (PNP).

(D-9)

When the registration of the IPv6 address is completed and when support for macro mobility is needed, the mobile node (MN) 1 transmits a mapping update message or a binding update message to the mapping agent (MA) 15 or to the home agent (HA) 16 for updating the information about the current position of the mobile node (MN) 1.

When the mobility node (MN) 1 has the macro mobility protocol such as Mobile IPv6 installed therein, the mobile node (MN) 1 transmits the binding update message to the home agent (HA) 16. The message stores the IPv6 address based on the virtual network prefix as the care-of-address (CoA). When the mobility node (MN) 1 has a macro mobility protocol such as LIN6 installed therein, the mobile node (MN) 1 transmits the mapping update message to the mapping agent (MA) 15. The message stores the virtual network prefix as the current locator.

(D-10)

When the mobile node (MN) 1 moves while communicating with another node, it transmits the routing update message to the access router (AR) 3-3 and generates the routing cache for the mobile node (MN) 1 in the router 6-xx in the pure-micro mobility network (PMMN) 8-2, for resuming the communication immediately. However, when the mobile node (MN) 1 is in the reception-standby mode, these processing steps are not performed.

The routing update message is a packet transmitted from the mobile node to the access router (AR) for generating or updating the routing cache for the mobile node (MN) 1, which is in the router in the pure-micro mobility network (PMMN). The packet is formed as, e.g., a UDP packet, storing the current MN IPv6 address and the old physical network prefix (old PNP) that was set for the mobile node (MN) 1 before moving between the subnets as shown in FIG. 26.

Figure 1:
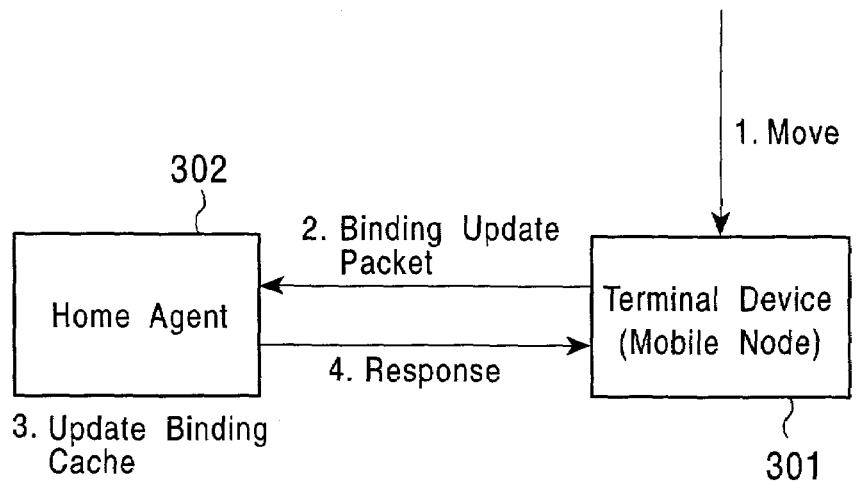
FIG. 1 is a view illustrating a procedure for registering a care-of-address.
Figure 2:
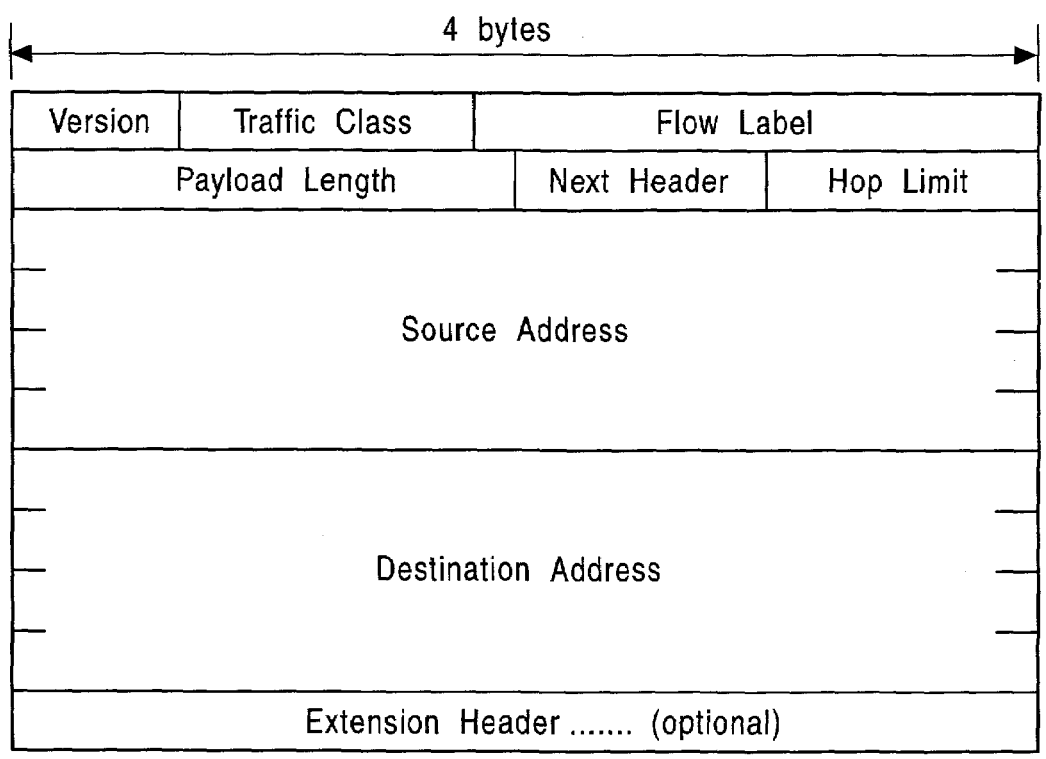
FIG. 2 is a view illustrating the format of the IPv6 header of an IPv6 packet.
Figure 3:
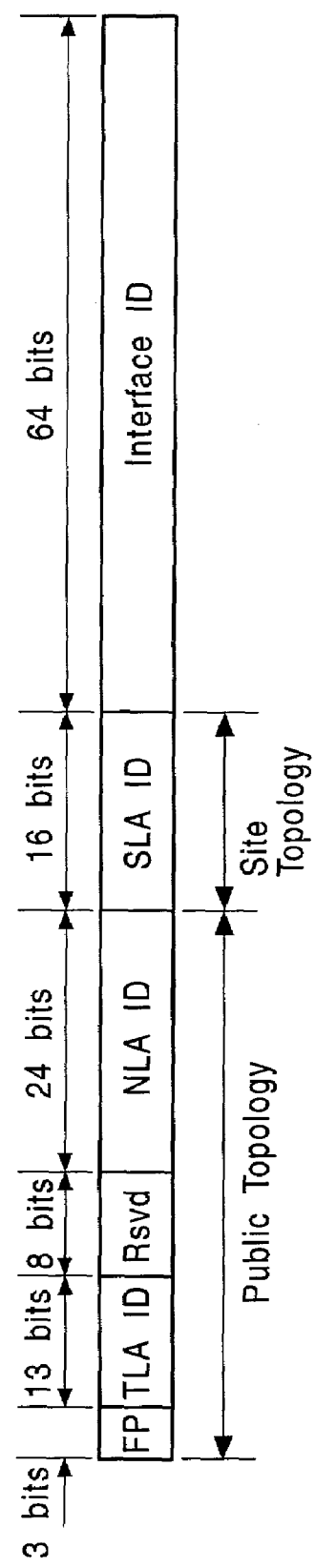
FIG. 3 is a view illustrating the format of an IPv6 address.
Figure 4:
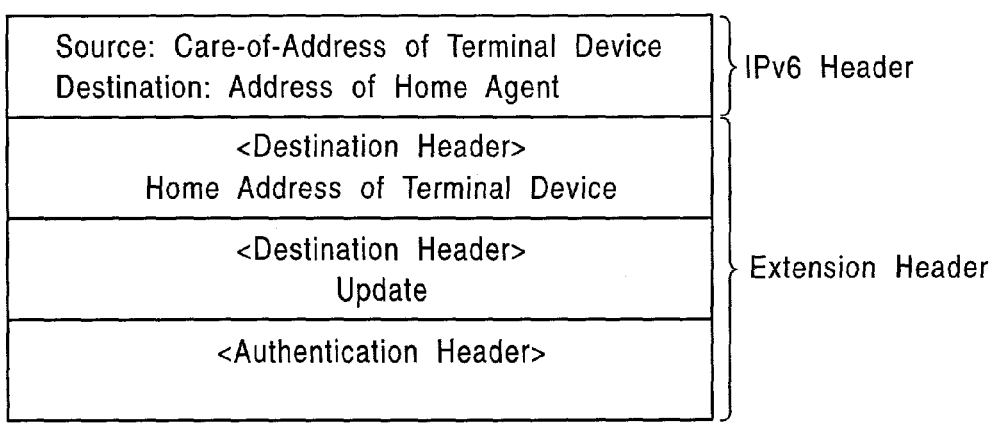
FIG. 4 is a view illustrating a binding update packet of the related art.
Figure 5:
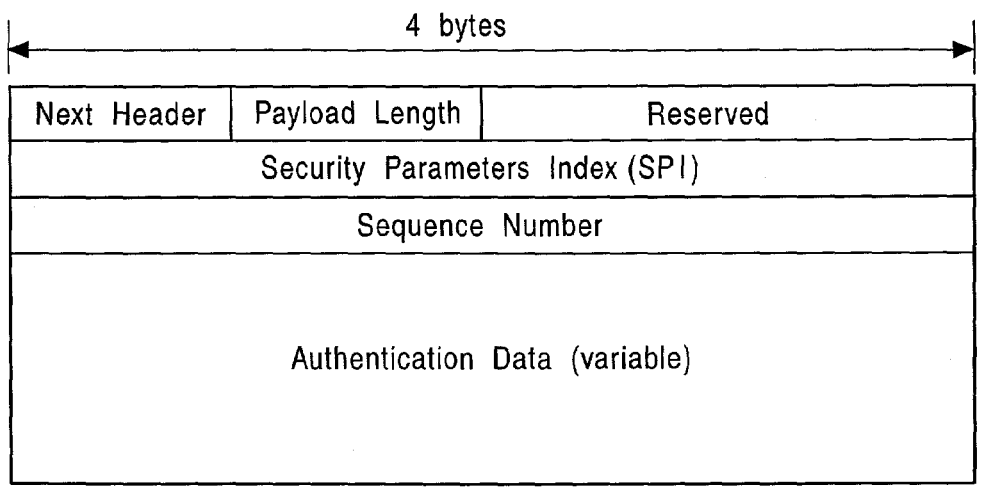
FIG. 5 is a view illustrating an authentication header.
Figure 6:
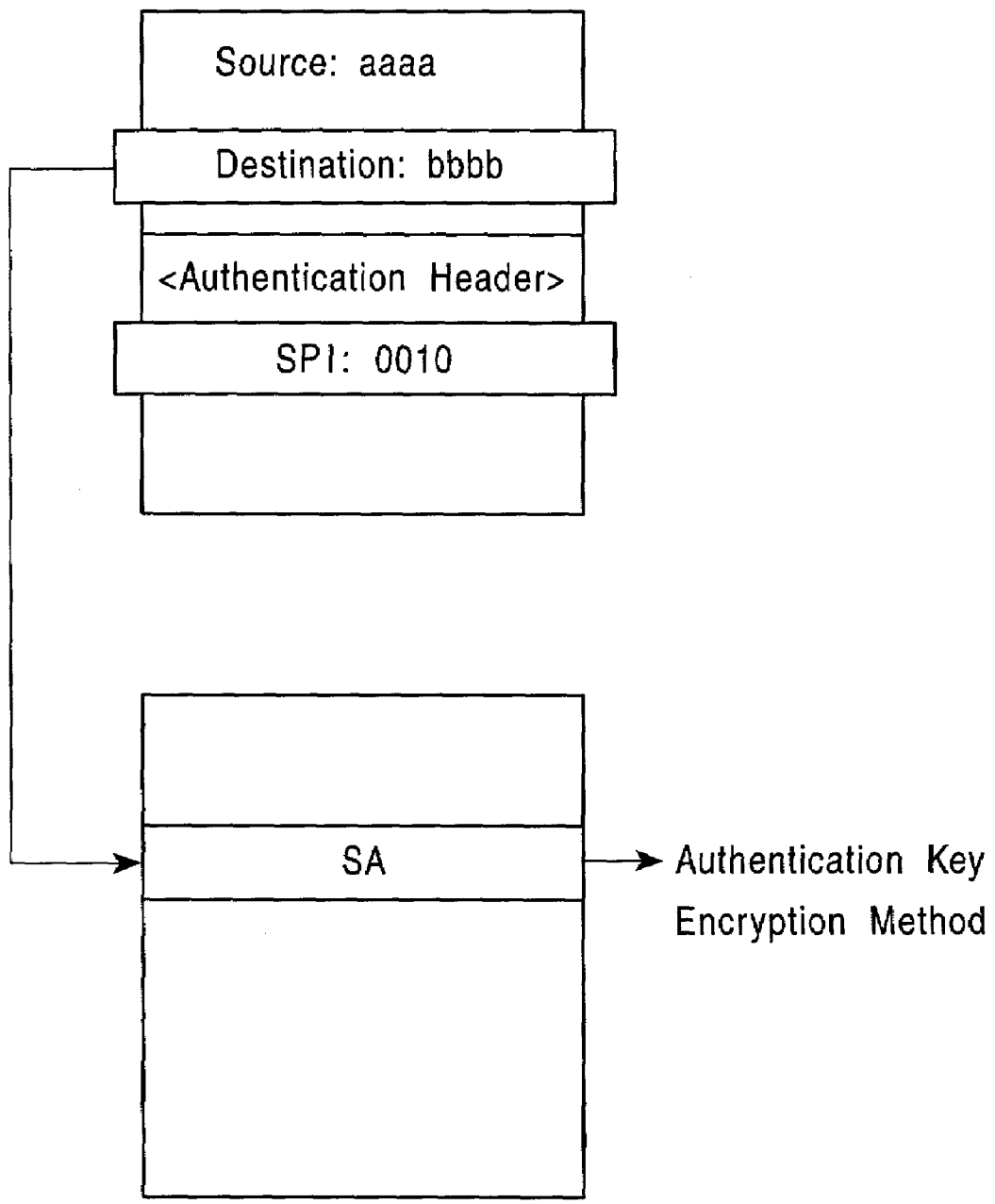
FIG. 6 is a view illustrating the overview of an authentication processing.
Figures 7, 8:
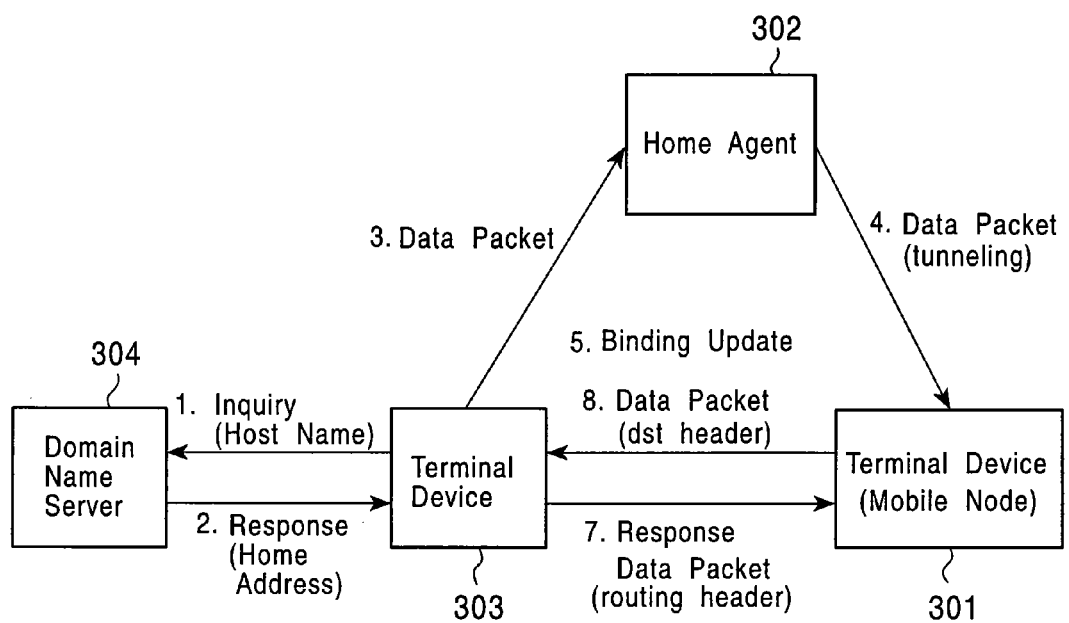
FIG. 7 is a procedure for transmitting a packet from a terminal device of the related art to a mobile terminal device.
FIG. 8 is a view illustrating the association, stored in a domain name server, of a host name and a home address.
Figure 9:
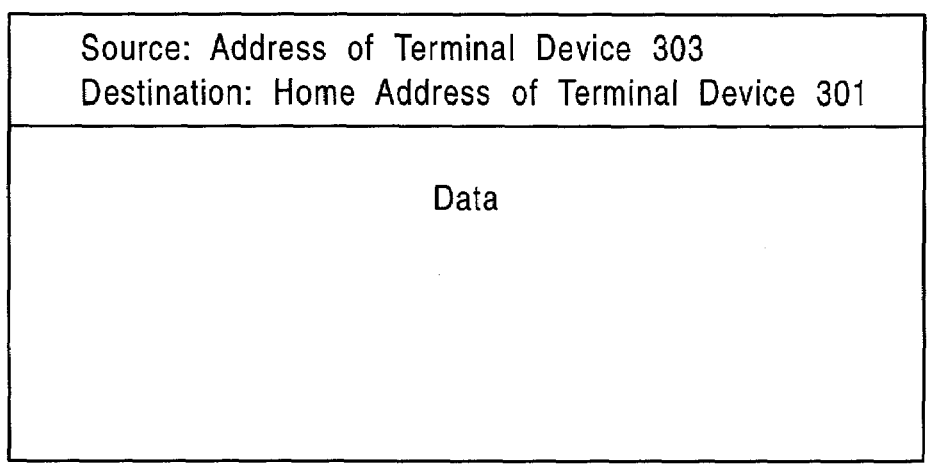
FIG. 9 is a view illustrating the configuration of a packet transmitted by the terminal device.
Figure 10:
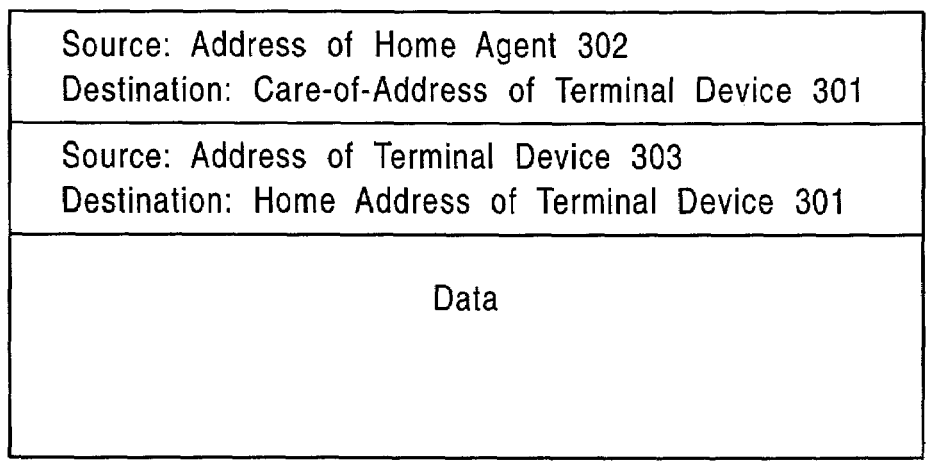
FIG. 10 is a view illustrating a packet transmitted by a home agent.
Figure 11:
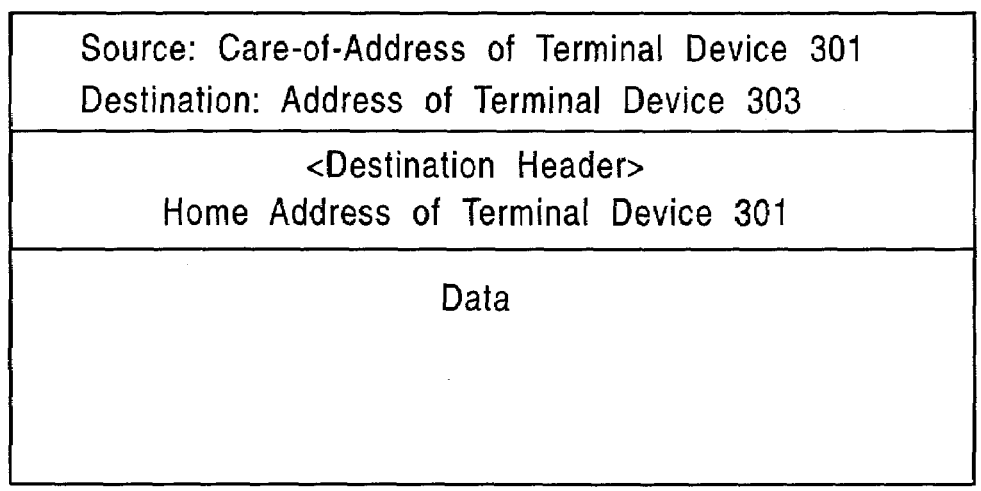
FIG. 11 is a view illustrating the configuration of a packet transmitted by the terminal device.
Figure 12:
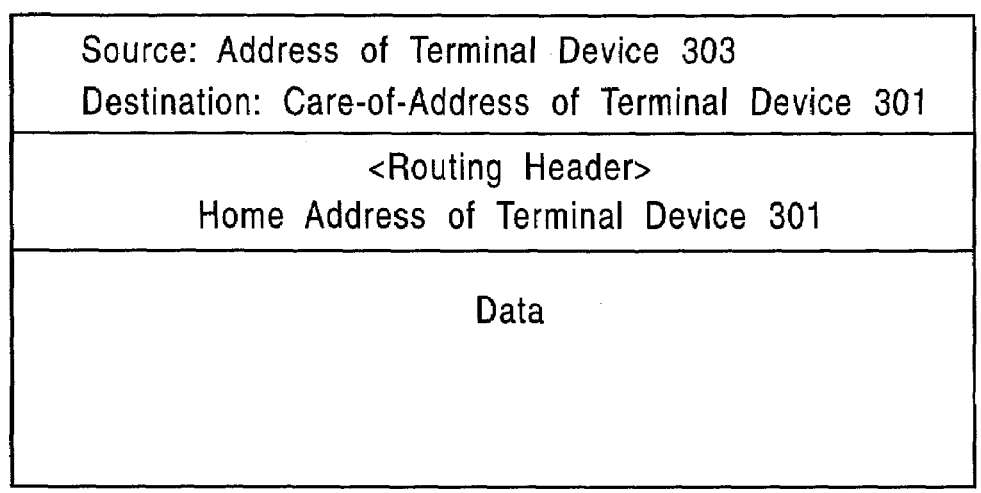
FIG. 12 is a view illustrating a routing header added to the packet transmitted by the terminal device.
Figure 13:
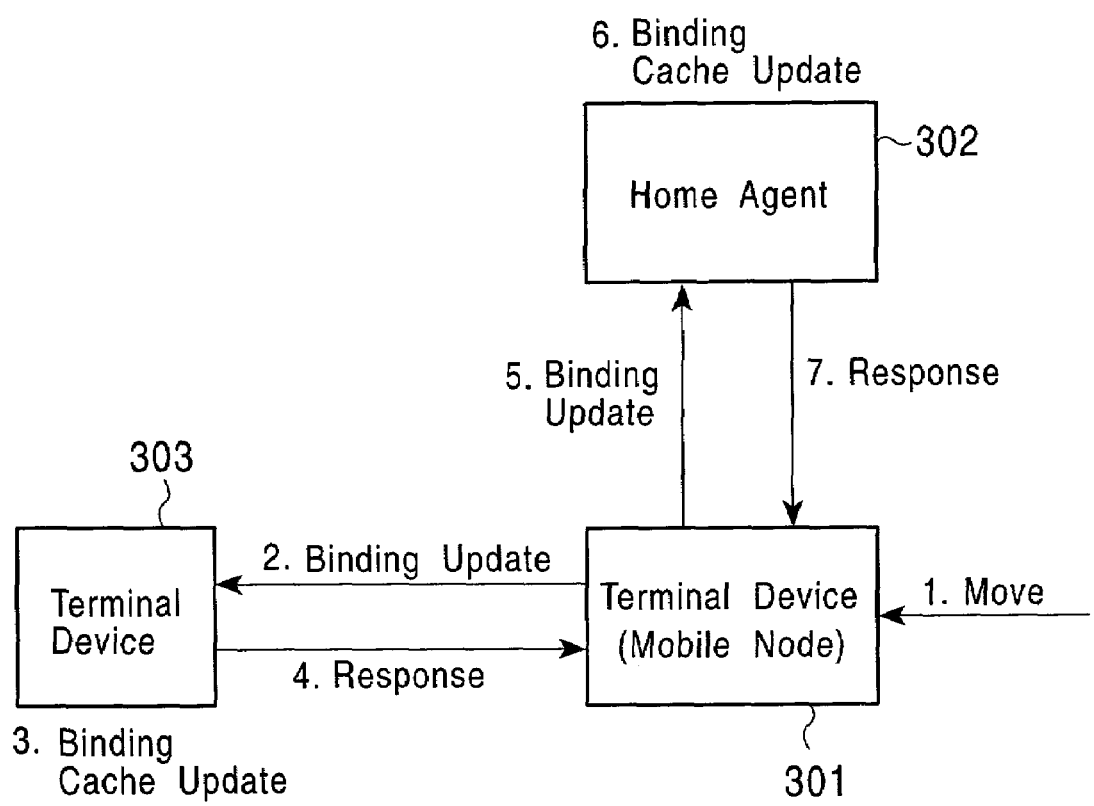
FIG. 13 is a view illustrating an operation when the terminal device has moved.
Figure 14:
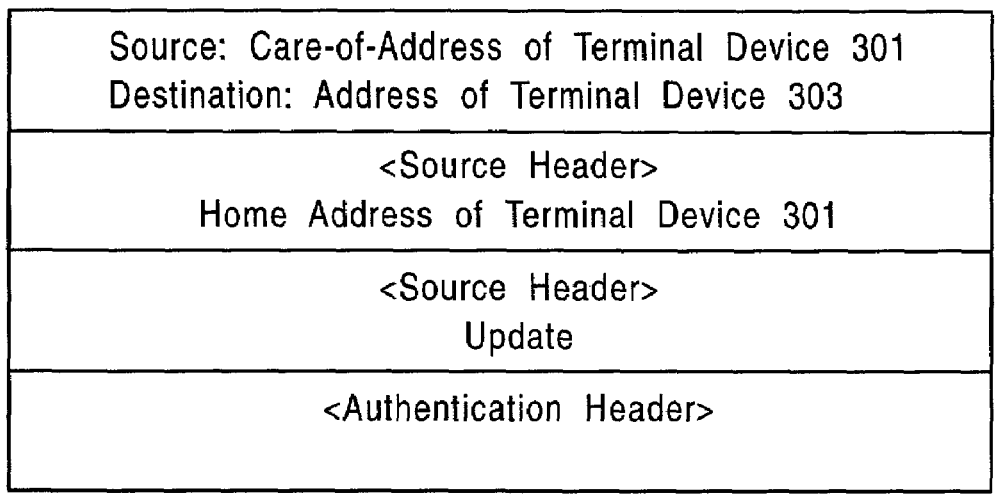
FIG. 14 is a view illustrating the configuration of a binding update packet.
Figure 15:
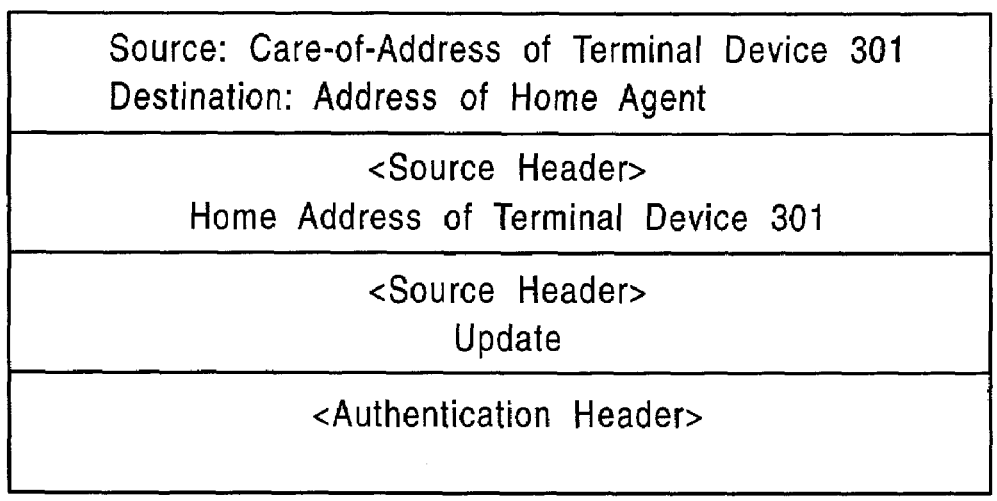
FIG. 15 is a view of the configuration of a binding update packet.

When the pure-micro mobility network (PMMN) 8-2 is configured as the tree router topology shown in FIG. 4, and when the access router (AR) 3-3 receives the routing update message transmitted from the mobile node (MN) 1, the access router (AR) 3-3 forms the routing cache for the mobile node (MN) 1 and transfers the routing update message to the upper-level router (parent router). The same operation is performed in the router 6-xx on the route from the access router (AR) 3-3 to the pure-micro gateway router (PMGR) 7-2. Upon receiving the routing update message, the pure-micro gateway router (PMGR) 7-2 forms the routing cache for the mobile node (MN) 1 as the router 6-xx in the pure-micro mobility network (PMMN) 8-2 does, and deletes the paging cache for the mobile node (MN) 1. The routing update message is not further transmitted to an upper-level router beyond the pure-micro gateway router (PMGR) 7-2. That is, the routing update message is not transmitted to the quasi-micro mobility network (QMMN) 11.

Thus, the mobile node (MN) can move between the subnets of the different pure-micro mobility networks in the micro mobility network (MMN) 9 shown in FIG. 16.

(E) Flow of Cache Update Message

Figure 29:
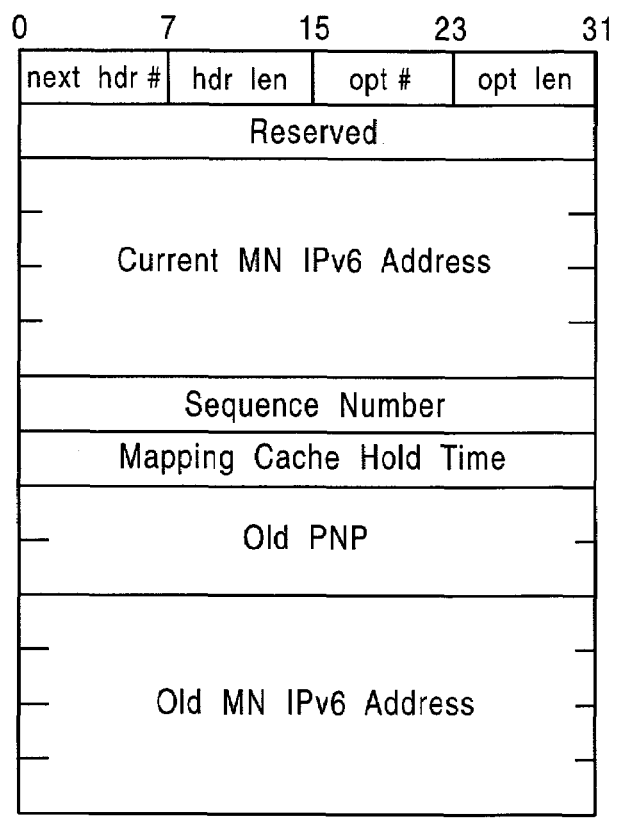
FIG. 29 is a view of an exemplary format of a cache update message (hop-by-hop option) according to the present invention.

When the mobile node (MN) 1 moves between the subnets of the different pure-micro mobility networks (PMMN) in the micro mobility network (MMN) 9, the cache update message shown in FIG. 29 is transferred between the top nodes of the different pure-micro mobility networks (PMMN) via the router 10-xx of the quasi-micro mobility network (QMMN) 11. The flow of the cache update message will now be described with reference to the flowchart shown in FIG. 31.

The cache update message is a message which is transferred between the pure-micro gateway routers (PMGR) via the router of the quasi-micro mobility network (QMMN) 21 when the mobile node moves between the different pure-micro mobility networks (PMMN) in one domain or the micro mobility network (MMN) 9. As shown in FIG. 29, the cache update message stores the current MN IPv6 address, the old MN IPv6 address that was set for the mobile node (MN) before moving between the subnets, and the old physical network prefix (old PNP).

(E-1)

Before transmitting the cache update message, the pure-micro gateway router (PMGR) 7-2 compares the values of the upper bits, e.g., 48 bits, which denote the micro mobility network (MMN) 9 (including the quasi-micro mobility network (QMMN) 11 and the pure-micro mobility networks (PMMN) 8-1 and 8-2) to which the pure-micro gateway router (PMGR) 7-2 belongs, with the values of the upper bits, e.g., 48 bits, of the old virtual network prefix (old VNP) A of the mobile node (MN) 1 before moving (the upper 64 bits of the old MN IPv6 address). The old virtual network prefix (old VNP) A is included in the pure-micro registration request message (PMR-RM) received from the mobile node (MN) 1 via the access router (AR) 3-3 according to the processing steps in (D-3) and (D-4).

When the result of the above-described comparison shows that these values are different from each other, it means that the old network prefix (old VNP) of the mobile node (MN) 1 before moving, which is included in the pure-micro registration request message (PMR-RM) (the upper 64 bits of the old IPv6 address of the mobile node), belongs to a different micro mobility network (MMN). That is, it is determined that the mobile node (MN) 1 moved between micro mobility networks (MMN) of different domains. Accordingly, the cache update message is not transmitted.

(E-2)

When the values of the upper bits, e.g., 48 bits, denoting the domain or the micro mobility network (MMN) 9 to which the pure-micro gateway router (PMGR) 7-2 is connected is equal to the values of the upper bits, e.g., 48 bits, of the old virtual network prefix (old VNP) A of the mobile node (MN) 1 before moving (the upper 64 bits of the old IPv6 address of the mobile node (MN)), the virtual network prefix (old PNP) A being included in the pure-micro registration request message (PMR-RM) received from the mobile node (MN) 1 via the access router (AR) 3-3 according to the processing steps in (D-3) and (D-4), it is determined that the mobile node (MN) 1 moved in the same micro mobility network (MMN) 9. That is to say, it is determined that the mobile node (MN) 1 moved between the pure-micro mobility networks (PMMN) in the same domain as shown in FIG. 31 (S201 to S203).

The pure-micro gateway router (PMGR) 7-2 of the pure-micro mobility network (PMMN) 8-2 to which the mobile node (MN) 1 is newly connected transmits a cache update message to the pure-micro gateway router (PMGR) 7-1 of the pure-micro mobility network (PMMN) 8-1 corresponding to the old virtual network prefix (old VNP) A (the upper 64 bits of the old IPv6 address of the mobile node 1) of the mobile node 1 before moving via the quasi-micro mobility network (QMMN) 11 (S204). The old virtual network prefix (old VNP) A is included in the received pure-micro registration request message. More specifically, the pure-micro gateway router (PMGR) 7-2 uses the IPv6 hop-by-hop option header, assigns the old virtual network prefix (old VNP) A to the upper 64 bits as the destination address, and assigns any cast address to the lower 64 bits to make them all zero.

(E-3)

The router among the router 10-xx in the quasi-micro mobility network (QMMN) 11 that can recognize the cache update message, and the pure-micro gateway router (PMGR) corresponding to the mobile node (MN) 1 after moving extract the old IPv6 address and the new IPv6 address of the mobile node (MN) 1 from the cache update message and register them as the mapping cache (S205).

That is to say, upon receiving the data packet whose destination address is the old IPv6 address of the mobile node (MN) 1, the router creates or updates the mapping cache on the basis of the cache update message so that the router can change the destination address to the new IPv6 address for transferring the data packet thereto.

The mapping cache stores the information for transferring the data packet that is transmitted to the old address of the mobile node (MN) 1 before moving between the different pure-micro mobility networks (PMMN) in one domain to the new address of the mobile node (MN) 1 after moving. The mapping cache is temporarily held and controlled in the router in the quasi-micro mobility network (QMMN) which can receive and recognize the cache update message, and in the pure-micro gateway router corresponding to the mobility network (MN) 1 before moving. The mapping cache stores the following information in an associative manner.

Old IPv6 address of mobile node (MN) (Old MN IPv6 address) (16 bytes)
New IPv6 address of the mobile node (MN) (New MN IPv6 address) (16 bytes)
Lifetime (4 bytes)
Sequence number (4 bytes)

The mapping cache is controlled in soft state and is deleted after a predetermined time. After creating or updating the mapping cache, the router in the quasi-micro mobility network (QMMN) transfers the cache update message to the next-hop router. On the other hand, the router in the quasi-micro mobility network (QMMN), which cannot recognize the cache update message, transfers the cache update message to the next-hop router without creating or updating the mapping cache.

(E-4)

Upon receiving the cache update message, the pure-micro gateway router (PMGR) 7-1 creates or updates the mapping cache for the mobile node (MN) 1 (S206) in the same way as the router 10-xx in the quasi-micro mobility network (QMMN) 11. After that, the pure-micro gateway router (PMGR) 7-1 transmits the routing tear-down message to the access router (AR) 3-2 which is connected to the old subnet 2-2 corresponding to the old physical network prefix (old PNP) B included in the cache update message (S207). After transmitting the routing tear-down message, the pure-micro gateway router (PMGR) 7-1 deletes the cache update message. If there are a routing cache and a paging cache, they are both deleted.

The routing tear-down message is the packet which is transmitted from the pre-micro gateway router (PMGR) of the mobile node (MN) before moving to the access router (AR) of the old subnet to which the mobile node (MN) was connected before moving. The packet is transmitted for deleting the routing cache in the router in the pure-micro mobility network (PMMN). The routing cache stores the routing information about the mobile node (MN) before moving. As shown in FIG. 28, the routing tear-down message is formed as a packet, e.g., a UDP packet, storing the MN IPv6 address of the mobile node (MN) 1 and the old physical network prefix (old PNP) that was set for the mobile node (MN) 1 before moving between the subnets. Incidentally, UDP may be used for forming the routing tear-down message for example.

Upon receiving the routing tear-down message, the router 5-xx in the pure-micro mobility network (PMMN) 8-1 deletes the host entry for the mobile node (MN) 1 in the routing cache (S208), and transfers the routing tear-down message to the lower-level router (the next router). More specifically, the router 5-xx deletes the old host entry about the mobile node (MN) 1 and obtains the next-hop router from the routing table for transferring the routing tear-down message to the old physical network prefix (old PNP) B. Then, the router 5-xx transfers the routing tear-down message to the next-hop router. The same operation is repeated in the router 5-xx on the route from the pure-micro gateway router (PMGR) 7-1 to the access router (AR) 3-2.

(E-5)

Upon receiving the routing tear-down message, the access router (AR) 3-2 deletes the old host entry for the mobile node (MN) 1 in the routing cache, and deletes the routing tear-down message.

Thus, the processing steps for the cache update message shown in FIG. 29, which is transmitted when the mobile node (MN) 1 moves between the subnets of the different pure-micro mobility networks in the domain shown in FIG. 16, are performed.

II. Devices in the System of the Present Invention

Subsequently, the processes executed in each device in the system of the present invention will be described in detail. The description is given in the following order.
(a) Mobile node
(b) Access router (AR)
(c) Router in the pure-micro mobility network (PMMN)
(d) Pure-micro gateway router (PMGR)
(e) Router in the quasi-micro mobility network (QMMN)
  (a) Mobile Node
  First, the mobile node 1 shown in FIG. 16 is described.
  (a1) Data Held in the Mobile Node
  The mobile node has the following registers for holding the individual values in parentheses in order to perform the corresponding process in accordance with the above-described inter-subnet movement.
Current_IPv6_Address register (IPv6 address which is currently set)
Old_IPv6_Address register (IPv6 address which is set before movement)
Old_PNP register (physical network prefix (PNP) of the subnet connected before movement)
Routing_Update_Interval_time register (transmission interval of the routing update message)
Paging_Update_Interval_time register (transmission interval of the paging update message)
Mapping_Cache_Hold_time register (value (desired value) of the lifetime of the mapping cache)
PMR_Interval_time register (waiting time for retransmission of the pure-micro registration request message (PMR-RM))

Also, the mobile node has a sequence-generating (Sequence_Gen) device. The sequence-generating device is a device for generating a sequence number. The initial value is 1 and the return value is increased by 1 every call. The value is returned to 1 when it reaches the maximum.

Next, the processes performed by the mobile node will be described.

(a2. 1)

<Operation When the Mobile Node Receives a Link up Completion Message from a Data Link Layer>

When the mobile node is connected to any of the subnets, a link between the subnet and the mobile node is achieved. Then, the mobile node performs the following processes.

(a2. 1-1)

The mobile node transmits a router solicitation (RS) message to the linked up subnet.

(a2. 1-2)

The mobile node receives a router advertisement (RA) message.

(a2. 1-3)

The mobile node determines whether the router advertisement (RA) message includes a virtual network prefix (VNP) information option (see FIG. 22).

[When the Router Advertisement (RA) Does not Include the Virtual Network Prefix (VNP) Information Option]

(a2. 1-4(1))

The mobile node generates an IPv6 address by stateless auto-configuration using the physical network prefix (PNP) of the connected subnet.

(a.2 1-4(2))

When the mobile node supports macro mobility, the mobile node transmits a mapping update (MU) message or a binding update (BU) message to the mapping agent (MA) or the home agent (HA).

[When the Router Advertisement (RA) Includes the Virtual Network Prefix (VNP) Information Option]

(a.2 1-5(1))

The mobile node generates an IPv6 address by coupling the virtual network prefix (VNP) in a virtual network prefix field in the virtual network prefix (VNP) information option of the router advertisement (RA) with the global unique identifier (ID) or the interface ID of the mobile node. The generated IPv6 address is stored in the Current_IPv6_Address register (recording medium) in the mobile node.

(a2. 1-5(2))

The mobile node obtains routing update interval time (min. and max.) fields, paging routing update interval time (min. and max.) fields, and mapping cache hold time (min. and max.) fields of the virtual network prefix (VNP) information option of the router advertisement (see FIG. 22). Then each value, that is, the values of the routing update interval time, the paging update interval time, and the mapping cache hold time, are determined within the individual min. and max. ranges. After the values are determined, each value is stored in the Routing_Update_Interval_Time register, the Paging_Update_Interval_Time register, and the Mapping_Cache_Hold_Time register, respectively.

(a2. 1-5(3))

The value of the Current_IPv6_Address register, the value of the Old_IPv6_Address register, the value of the Paging_Update Interval_time register, the value of the Mapping_Cache_Hold_time register, the value of the Old_PNP register, and the sequence number generated in the Sequence_Gen device are stored in the current mobile node IPv6 address field, the old mobile node IPv6 address field, the paging update interval time field, the mapping cache hold time field, the old PNP field, and the sequence number field of the pure-micro registration request message (PMR-RM), respectively. After the storing process, the pure-micro registration request message (PMR-RM) is transmitted to an access router (default router). At this time, the source address is an unspecified address and the destination address is a default router's link-local address.

(a.2 1-5(4))

After the pure-micro registration request message is transmitted, a pure-micro registration request message timer is started. The initial value is the value which is set in a PMR_interval_time register.

(a2. 2)

Next, the process when the mobile node receives a pure-micro registration acknowledgement (PMR-Ack) message (FIG. 24) from the access router (AR) of the connected subnet will be described.

(a2. 2-1)

When the mobile node receives the pure-micro registration acknowledgement (PMR-Ack) message, the pure-micro registration request message (PMR-RM) timer, which is set in the mobile node, is stopped.

(a2. 2-2)

If the value in the mobile node IPv6 address field of the received pure-micro registration acknowledgement (PMR-Ack) message is equal to the value of the Current_IPv6_Address register, the code field of the received pure-micro registration acknowledgement (PMR-Ack) message is referred to (nothing is performed when the values are different).

When the addresses are duplicated, and if the mobile node supports the macro-mobility protocol LIN6, the process proceeds to the process which is performed during the operation of receiving the link-up completion message from the above-described data link layer (in case where the router advertisement does not include the virtual network prefix (VNP)). If the mobile node supports the macro-mobility protocol "Mobile IPv6", a new value is regenerated as the interface ID and the process proceeds to the process which is performed during the operation of receiving the link-up completion message from the above-described data link layer (in case where the router advertisement includes the virtual network prefix (VNP)). When the addresses are not duplicated, the value of the Current_IPv6_Address register held in the mobile node is stored in the Old_IPv6_Address register. Also, the value of the physical network prefix (PNP) of the connected subnet which is obtained from the router advertisement (RA) is stored in the Old_PNP register.

(a2. 2-3)

If the mobile node is in a standby mode, a paging update timer is started. The initial value is the value of the Paging_Update_Interval_time register. If the mobile node is communicating, the value of the Curent_IPv6_Address register, the value of the Routing_Update_Interval_time register, the value of the Old_PNP register, and the sequence number generated in the Sequence_Gen device are stored in the current mobile node IPv6 address field, the routing update interval time field, the old PNP field, and the sequence number field of the routing update message (see FIG. 26), respectively. After the storing, the routing update message is transmitted to the access router of the connected subnet. At this time, the source address is a mobile node's link-local address and the destination address is the default router's link-local address. After the routing update message is transmitted, a routing update timer is started. The initial value is the value of the Routing Update Interval_time register.

(a2. 3)

Next, the process when the mobile node receives a paging request message (see FIG. 27) is described.

(a2. 3-1)

When the value in the mobile node IPv6 address field of the received paging request message is equal to the value of the Current_IPv6_Address register held in the mobile node, the value of the Current_IPv6_Address register, the value of the Routing_Update_Interval_time register, the value of the Old_PNP register, and the sequence number generated in the Sequence_Gen device are stored in the current mobile node IPv6 address field, the routing update interval time field, the old PNP field, and the sequence number field of the routing update message, respectively. If the values are different, nothing is performed. After the storing, the routing update message is transmitted to the access router of the connected subnet. At this time, the source address is the mobile node's link-local address and the destination address is the default router's link-local address.

(a2. 3-2)

After the routing update message is transmitted to the access router of the connected subnet, the routing update timer is restarted. The initial value is the value of the Routing_Update Interval_time register. Further, the paging update timer is stopped.

(a2. 4)

Next, the process when the mobile node receives an interrupt request from a pure-micro registration request timer is described.

(a2. 4-1)

When the number of retransmissions of the pure-micro registration request message (PMR-RM) from the mobile node exceeds a predetermined number, the process proceeds to the process which is performed during the operation of receiving the link-up completion message from the above-described (a2. 1) data link layer (in the case where the router advertisement does not include the virtual network prefix (VNP)).

(a2. 4-2)

When the number of retransmissions of the pure-micro registration request message from the mobile node does not yet exceed the predetermined number, the value of the Current_IPv_Address register, the value of the Old_IPv6_Address register, the value of the Paging_Update_Interval_time register, the value of the Mapping Cache_Hold_time register, the value of the old_PNP register, and the sequence number generated in the Sequence_Gen device are stored in the current mobile node IPv6 address field, the old mobile node IPv6 address field, the paging update interval time field, the mapping cache hold time field, the old PNP field, and the sequence number field of the pure-micro registration request message, respectively. After the storing, the pure-micro registration request message (PMR-RM) is retransmitted to the access router (default router). At this time, the source address is an unspecified address and the destination address is the default router's link-local address.

(a2. 4-3)

After the mobile node transmits the pure-micro registration request message, the pure-micro registration timer is restarted.

(a2. 5)

Next, the process when the mobile node receives an interrupt request from the paging update timer is described.

(a2. 5-1)

The value of the Current_IPv6_address register and the value of the Paging_Update_Interval_time register held in the mobile node, and the sequence number generated in the Sequence_Gen device are stored in the current mobile node IPv6 address field, the paging update interval time field, and the sequence number field of the paging update message (see FIG. 25), respectively. After the storing, the paging update message is transmitted to the access router (AR) of the connected subnet. At this time, the source address is the mobile node's link-local address and the destination address is the default router's link-local address.

(a2. 5-2)

After the mobile node transmits the paging update message to the access router of the connected subnet, the paging update timer is restarted.

(a2. 6)

Next, the process when the mobile node receives an interrupt request from the routing update timer is described.

(a2. 6-1)

The value of the Current_IPv6_address register, the value of the Routing_Update_Interval_time register, and the value of the Old_PNP register held in the mobile node, and the sequence number generated in the Sequence_Gen device are stored in the current mobile node IPv6 address field, the routing update interval time field, the old PNP field, and the sequence number field of the routing update message, respectively. After the storing, the routing update message is transmitted to the access router of the connected subnet. At this time, the source address is the mobile node's link-local address and the destination address is the default router's link-local address.

(a2. 6-2)

After the mobile node transmits the routing update message to the access router of the connected subnet, the routing update timer is restarted.

(a2. 7)

Next, the process performed at the time when the mobile node moves from a standby mode to a communication mode, that is, the process at call time is described.

(a2. 7-1)

First, the mobile node stops the paging update timer.

(a2. 7-2)

The value of the Current_IPv6_address register, the value of the Routing_Update_Interval_time register, and the value of the old physical network prefix (Old_PNP) register held in the mobile node, and the sequence number generated in the Sequence_Gen device are stored in the current mobile node (MN) IPv6 address field, the routing update interval time field, the old physical network prefix (old_PNP) field, and the sequence number field of the routing update message, respectively. After the storing, the routing update message is transmitted to the access router of the connected subnet. At this time, the source address is the mobile node's link-local address and the destination address is the default router's link-local address. After the routing update message is transmitted, the routing update timer is started. The initial value is the value of the Routing_Update_Interval_time register.

(a2. 8)

Next, the process performed at the time when the mobile node moves from the communication mode to the standby mode, that is, the process at termination is described.

(a2. 8-1)

First, the mobile node stops the routing update timer.

(a2. 8-2)

Next, the value of the Current_IPv6_Address register and the value of the Paging_Update_Interval_time register held in the mobile node, and the sequence number generated in the Sequence_Gen device are stored in the current mobile node (MN) IPv6 address field, the paging update interval time field, and the sequence number field of the paging update message, respectively. After the storing, the paging update message is transmitted to the access router of the connected subnet. At this time, the source address is the mobile node's link-local address and the destination address is the default router's link-local address. After the paging update message is transmitted, the paging update timer is started. The initial value is the value of the Paging_Update_Interval_time register.

(a2. 9)

Next, the process when the mobile node transmits a data packet is described.

(a2. 9-1)

The mobile node transmits the data packet by setting the value of the Current_IPv6_Address register held in the mobile node as the source address of the data packet.

(b) Access Router (AR)

Next, the access router (AR) which is set corresponding to each subnet will be described.

(b1) Data Held in the Access Router

The access router has the following data in order to perform each process according to the above-described inter-subnet movement of the mobile node.

<Cache which is Held by the Access Router>

Routing Cache

The routing cache is held and administrated by each router in the pure-micro mobility network (PMMN), and stores the following information in an associative manner in order to perform host routing to the mobile node in an active mode in the pure-micro mobility network (PMMN).

Mobile node (MN) IPv6 address (16 bytes)

Next-hop router's IPv6 address (16 bytes)

Lifetime (4 bytes)

Sequence number (4 bytes)

<Registers which are Held by the Access Router>

Announced_Routing_Update_Interval_time_(min. and max.) register (the range of the transmission interval (lower limit and upper limit) of the routing update message to be stored in the router advertisement (RA))

Announced_Paging_Update_Interval_time_(min. and max.) register (the range of the transmission interval (lower limit and upper limit) of the paging update message to be stored in the router advertisement (RA))

Announced_Mappinng_Cache_Hold_time_(min. and max.) register (the range of the value of the lifetime (lower limit and upper limit) of the mapping cache to be stored in the router advertisement (RA))

RC_Life_Time_Plus register (the value to be added to the value of the routing update interval time field of the routing update message at creation/update of the routing cache)

PMGR_Address register (the value of the global IPv6 address of the pure-micro gateway router (PMGR) of the pure-micro mobility network (PMMN) to which the access router belongs)

(b2. 1)

Hereinafter, the process when the access router transmits the router advertisement (RA) message will be described. The router advertisement (RA) includes the virtual network prefix information option shown in FIG. 22.

(b2. 1-1)

The value of the Announced_Routing Update_Interval_time_(min. and max.) register, the value of the Announced_Paging_Update_Interval_time_(min. and max.) register, the value of the Announced_Mapping_Cache_Hold_ time_(min. and max.) register, and the value of the Announced_Virtual_Network_Prefix register are stored in the routing update interval time (min. and max) fields, the paging update interval time (min. and max.) fields, the mapping cache hold time (min. and max.) fields, and the virtual network prefix field of the virtual network prefix information option of the router advertisement (RA), respectively. After the storing, the router advertisement (RA) including the virtual network prefix information option is periodically transmitted to the node in the subnet.

(b2. 2)

Next, the process when the access router receives the router solicitation (RS) message is described.

(b2. 2-1)

When the access router receives the router solicitation (RS) message, the above-described router advertisement (RA) message transmitting process is performed. The router advertisement (RA) at this time includes the virtual network prefix information option shown in FIG. 22.

(b2. 3)

Next, the process when the access router receives the pure-micro registration request message (PMR-RM) (FIG. 23) is described.

(b2. 3-1)

When the access router receives the pure-micro registration request message (PMR-RM) (FIG. 23), the received pure-micro registration request message (PMR-RM) is transferred as is to the pure-micro gateway router (PMGR). At this time, the source address is the access router's global address and the destination address is the pure-micro gateway router's global address stored in the PMGR_Address register.

(b2. 4)

Next, the process when the access router receives the pure-micro registration acknowledgement message (PMR-Ack message) (FIG. 24) is described.

(b2. 4-1)

When the access router receives the pure-micro registration acknowledgement message (PMR-Ack message), the received pure-micro registration acknowledgement message (PMR-Ack message) is broadcasted to the downstream subnet. At this time, the source address is the access router's link-local address and the destination address is the all-node multicast address.

(b2. 5)

Next, the process when the access router receives the paging update message (FIG. 27) is described.

(b2. 5-1)

When the access router receives the paging update message, the received paging update message is transferred as is to the pure-micro gateway router (PMGR). At this time, the source address is the access router's global address and the destination address is the pure-micro gateway router's global address stored in the PMGR_Address register.

(b2. 6)

Next, the process when the access router receives the routing update message (FIG. 26) is described.

(b2. 6-1)

When the access router receives the routing update message, and if the routing cache relating to the value in the current mobile node IPv6 address field of the received routing update message does not exist, a new routing cache is created in which the value of the current mobile node IPv6 address field of the routing update message, the total value of the routing update interval time field and the RC_Life_Time_Plus register, the value of the sequence field, and the value of the source address of the IPv6 header are stored in the mobile IPv6 Address field, the lifetime field, the sequence number field, and the next-hop router's IPv6 address field, respectively. The access router responds to the value of the routing update interval time included in the routing update message in accordance with the receipt of the routing update message in which the current mobile node address generated by the mobile node is stored. Accordingly, a lifetime of the routing cache, which differs in each mobile node, can be set.

When the access router already has the routing cache and if the value in the sequence number field of the received routing update message is bigger than the value in the sequence number field of the routing cache (otherwise, the routing update message is deleted), the total value of the routing update interval time field of the received routing update message and the RC_Life_Time_Plus register, the value of the sequence number field, and the value of the source address of the IPv6 header are stored in the lifetime field, the sequence number field, and the next-hop router's IPv6 address field of the routing cache, respectively.

(b2. 6-2)

After the creation/update of the routing cache, the received routing update message is transferred to the upper-level router.

(b2. 7)

Next, the process when the access router receives a routing tear-down message (FIG. 28) is described.

(b2. 7-1)

When the access router receives the routing tear-down message, the corresponding routing cache is deleted if the routing cache relating to the value of the mobile node IPv6 address field in the received routing tear-down message exists (otherwise, nothing is performed), and if the value of the sequence number field of the routing tear-down message is bigger than the value of the sequence number field of the routing cache (otherwise, nothing is performed).

(b2. 8)

Next, the process when the access router receives the paging request message (FIG. 27) is described.

(b2. 8-1)

When the access router receives the paging request message (FIG. 27), the received paging request message is broadcasted to the downstream subnet as is. At this time, the source address is the access router's link-local address and the destination address is the all-node multicast address.

(b2. 9)

Next, the process when the access router receives an interrupt request from its timer is described.

(b2. 9-1)

The access router reduces the value of the lifetime field of each existing routing cache by X (X is the interrupt interval of the timer). When the value is reduced to 0 or less, the routing cache is deleted.

(c) Router in the Pure-micro Mobility Network (PMMN)

Next, one of the routers in the pure-micro mobility network (PMMN) is described.

(c1) Data Held in the Router in the Pure-micro Mobility Network (PMMN)

The router in the pure-micro mobility network (PMMN) has the following data in order to perform each process according to the above-described inter-subnet movement of the mobile node.

<Cache which is Held by the Router>

Routing Cache

The routing cache is held and administrated by each router in the pure-micro mobility network (PMMN), and stores the following information in an associative manner in order to perform host routing to the mobile node in an active mode in the pure-micro mobility network (PMMN).

Mobile node (MN) IPv6 address (16 bytes)

Next-hop router's IPv6 address (16 bytes)

Lifetime (4 bytes)

Sequence number (4 bytes)

<Register which is Held by the Router>

RC_Life_Time_Plus register (the value for adding to the value of the routing update interval time field in the routing update message at creation/update of the routing cache)

(c2. 1)

Next, the process when the router in the pure-micro mobility network (PMMN) receives the routing update message (FIG. 26) is described.

(c2. 1-1)

When the router in the pure-micro mobility network (PMMN) receives the routing update message, and if the routing cache relating to the value in the current mobile node IPv6 address field of the received routing update message does not exist, a new routing cache is created in which the value of the current mobile node IPv6 address field of the routing update message, the total value of the routing update interval time field and the RC_Life_Time_Plus register, the value of the sequence number field, and the value of the source address of the IPv6 header are stored in the mobile node IPv6 address field, the lifetime field, the sequence number field, and the next-hop router's IPv6 address field, respectively. The router in the pure-micro mobility network (PMMN) responds to the value of the routing update interval time included in the routing update message in accordance with the receipt of the routing update message storing the current mobile node address generated by the mobile node. Accordingly, the lifetime of the routing cache, which differs in each mobile node, can be set.

When the router in the pure-micro mobility network (PMMN) already has the routing cache and if the value in the sequence number field of the received routing update message is bigger than the value in the sequence number field of the routing cache (otherwise, the routing update message is deleted), the total value of the routing update interval time field of the received routing update message and the RC_Life_Time_Plus register, the value of the sequence number field, and the value of the source address of the IPv6 header are stored in the lifetime field, the sequence number field, and the next-hop router's IPv6 address field of the routing cache, respectively.

(c2. 1-2)

The next-hop router for transmitting to the subnet indicated by the value of the old physical network prefix (old-PNP) field of the routing update message is obtained from the routing table. When the address of the obtained next-hop router is different from the value of the source address field of the IPv6 header in the routing update message, the routing tear-down message is transmitted to the next-hop router (nothing is performed when the values are the same). The source address of the IPv6 header is the link-local address of the router and the destination address of the IPv6 header is the address of the next-hop router. The value of the mobile node (MN) IPv6 address field, the value of the sequence time field, and the value of the old physical network prefix (old-PNP) field of the routing update message are stored in the mobile node (MN) IPv6 address field, the sequence number field, and the old physical network prefix (old-PNP) field of the routing tear-down message, respectively.

(c2. 1-3)

The router in the pure-micro mobility network (PMMN) transfers the received routing update message to the upper-level router.

(c2. 2)

Next, the process when the router in the pure-micro mobility network (PMMN) receives the routing tear-down message (FIG. 28) is described.

(c2. 2-1)

When the router in the pure-micro mobility network (PMMN) receives the routing tear-down message, the corresponding routing cache is deleted if the routing cache relating to the value of the mobile node IPv6 address field of the received routing tear-down message exists (otherwise, nothing is performed) and if the value of the sequence number field in the routing tear-down message is bigger than the value of the sequence number field of the routing cache (otherwise, nothing is performed).

(c2. 2-2)

In both cases, whether the routing cache is deleted or not deleted, the next-hop router for transmitting to the subnet indicated by the value of the old physical network prefix (old-PNP) field of the routing update message is obtained from the routing table and the received routing tear-down message is transferred to the address of the obtained next-hop router.

(c2. 3)

Next, the process when the router in the pure-micro mobility network (PMMN) receives the paging request message (FIG. 27) is described.

(c2. 3-1)

When the router in the pure-micro mobility network (PMMN) receives the paging request message (FIG. 27), the received paging request message is broadcasted to the downstream subnet as is. At this time, the source address is the access router's link-local address and the destination address is the all-node multicast address.

(c2. 4)

Next, the process when the router in the pure-micro mobility network (PMMN) receives an interrupt request from its timer is described.

(c2. 4-1)

The router in the pure-micro mobility network (PMMN) reduces the value of the lifetime field of each existing routing cache by X (X is the interrupt interval of the timer). When the value is reduced to 0 or less, the routing cache is deleted.

(d) Pure-micro Gateway Router (PMGR)

Next, the pure-micro gateway router (PMGR) is described.

(d1) Data Held in the Pure-micro Gateway Router (PMGR)

The pure-micro gateway router (PMGR) has the following data in order to perform each process according to the above-described inter-subnet movement of the mobile node.

<Caches which are Held by the Pure-micro Gateway Router>

Routing Cache

The routing cache is held and administrated by each router in the pure-micro mobility network (PMMN), and stores the following information in an associative manner in order to perform host routing to the mobile node in an active mode in the pure-micro mobility network (PMMN).

Mobile node (MN) IPv6 address (16 bytes)
Next-hop router's IPv6 address (16 bytes)
Lifetime (4 bytes)
Sequence number (4 bytes)

Paging Cache

The paging cache is held and administrated by the pure-micro gateway router (PMGR) and stores the following information in an associative manner with the information regarding the mobile node IPv6 address in an idle mode which exists in the pure-micro mobility network (PMMN) managed by the pure-micro gateway router (PMGR).

Mobile node (MN) IPv6 address (16 bytes)
Lifetime (4 bytes)
Sequence number (4 bytes)

Mapping Cache

The mapping cache stores the information used for transferring the data packet which is transmitted to the old address before the movement of the mobile node, which has moved to a different pure-micro mobility network (PMMN) in the same domain, to the new address after the movement. The mapping cache is temporarily held and administrated by the router which can receive and recognize the cache update message of the quasi-micro mobility network (QMMN). Also, the mapping cache stores the following information in an associative manner.

Old mobile node IPv6 address (16 bytes)
New mobile node IPv6 address (16 bytes)
Lifetime (4 bytes)
Sequence number (4 bytes)

<Registers which are Held by the Pure-micro Gateway Router>
RC_Life_Time_Plus register (the value for adding to the value of the routing update interval time field of the routing update message at creation/update of the routing cache)
PC_Life_Time_Plus register (the value for adding to the value of the paging update interval time field of the PRM message or the paging update message at creation/update of the paging cache)
MMN_Prefix_Len register (the number of bits of the network prefix indicating the micro mobility network (MMN) to which the pure-micro gateway router belongs)

<Queue which is Held by the Pure-micro Gateway Router>
Send_Wait queue (the wait queue for temporarily storing the standby data packet addressed to the mobile node)

(d2. 1)
Next, the process when the pure-micro gateway router (PMGR) receives the pure-micro registration request message (PMR-RM) (FIG. 23) is described.

(d2. 1-1)
When the pure-micro gateway router (PMGR) receives the pure-micro registration request message (PMR-RM) (FIG. 23), and if the paging cache, routing cache, and mapping cache relating to the value of the current mobile node IPv6 address in the received pure-micro registration request message (PMR-RM) exist, the pure-micro gateway router (PMGR) transmits the pure-micro registration acknowledgement message (PMR-Ack Message) in which the notification of registration refusal due to address duplication is written in the code field is transmitted to the access router.

At this time, the source address is the global IPv6 address of the pure-micro gateway router and the destination address is the value of the source address field of the pure-micro registration request message (PMR-RM), that is, the global IPv6 address of the access router. The value of the current mobile node IPv6 address field and the value of the sequence number field of the pure-micro registration request message (PMR-RM) are written in the mobile node IPv6 address field and the sequence number field of the pure-micro registration acknowledgement message (PMR-Ack Message).

(d2. 1-2)
If the paging cache, routing cache, and mapping cache relating to the value of the current mobile node IPv6 address of the pure-micro registration request message (PMR-RM) received by the pure-micro gateway router (PMGR) do not exist, the pure-micro registration acknowledgement message (PMR-Ack Message) in which the notification of address registration completion is written in the code field is transmitted to the access router.

At this time, the source address is the global IPv6 address of the pure-micro gateway router (PMGR) and the destination address is the value of the source address field of the pure-micro registration request message, that is, the global IPv6 address of the access router. The value of the current mobile node IPv6 address field and the value of the sequence number field of the pure-micro registration request message are written in the mobile node IPv6 address field and the sequence number field of the pure-micro registration acknowledgement message (PMR-Ack Message). Furthermore, a new paging cache is created in which the value of the current mobile node IPv6 address field of the pure-micro registration request message, the total value of the paging update interval time field and the PC_Life_Time_Plus register, and the value of the sequence number field are stored in the mobile node IPv6 address field, the lifetime field, and the sequence number field, respectively. The pure-micro gateway router (PMGR) can set the lifetime of the paging cache, which differs in each mobile node, in accordance with the value of the paging update interval time included in the pure-micro registration request message (PMR-RM).

(d2. 1-3)
Further, the value of the upper X bits (X is the value of the MMN_Prefix_Len register) of the old mobile node IPv6 address field of the pure-micro registration request message is compared to the value of the upper X bits (X is the value of the MMN_Prefix_Len register) of the global IPv6 address of the pure-micro gateway router (PMGR). If the values are the same, it is determined that the mobile node has moved to a different pure-micro mobility network (PMMN) in the same micro mobility network (MMN), and the cache update message (see FIG. 29) is transmitted. If the values are different, nothing is performed.

In the cache update message, the source address is the global IPv6 address of the pure-micro gateway router (PMGR) itself and the destination address is the anycast address in which the upper 64 bits have the same values as the upper 64 bits of the old mobile node IPv6 address field of the pure-micro registration request message and the lower 64 bits are all zero. The value of the current mobile node IPv6 address field, the value of the old mobile node IPv6 address field, the value of the old physical network prefix field, the value of the mapping cache hold time field, and the value of the sequence number field of the pure-micro registration request message (PMR-RM) are stored in the current mobile node IPv6 address field, the old mobile node IPv6 address field, the old physical network prefix field, the mapping cache hold time field, and the sequence number field of the cache update message, respectively.

(d2. 2)
Next, the process when the pure-micro gateway router (PMGR) receives the paging update message (FIG. 25) is described.

(d2. 2-1)
When the paging cache relating to the value in the current mobile node IPv6 address field of the received paging update message does not exist, the pure-micro gateway router (PMGR) creates a new paging cache in which the value of the current mobile node IPv6 address field of the pure-micro registration request message, the total value of the paging update interval time field and the PC_Life_Time_Plus register, and the value of the sequence number field are stored in the mobile node IPv6 address field, the lifetime field, and the sequence number field, respectively.

When the paging cache already exists and if the value in the sequence number field of the paging update message is bigger than the value of the sequence number field of the paging cache (otherwise, the paging update message is deleted), the total value of the paging update interval time field of the paging update message and the PC_Life_Time_Plus register and the value of the sequence number field are stored in the lifetime field and the sequence number field of the paging cache, respectively.

(d2. 2-2)

If the routing cache relating to the value of the current mobile node IPv6 address field of the received paging update message exists, the pure-micro gateway router (PMGR) deletes the routing cache.

(d2. 3)

Next, the process when the pure-micro gateway router (PMGR) receives the routing update message (FIG. 26) is described.

(d2. 3-1)

When the routing cache relating to the value in the current mobile node IPv6 address field of the received routing update message does not exist, the pure-micro gateway router (PMGR) creates a new routing cache in which the value of the current mobile node IPv6 address field of the routing update message, the total value of the routing update interval time field and the RC_Life_Time_Plus register, the value of the sequence number field, and the value of the source address of the IPv6 header are stored in the mobile node IPv6 address field, the lifetime field, the sequence number field, and the next-hop router's IPv6 address field, respectively. The pure-micro gateway router (PMGR) responds to the value of the routing update interval time included in the routing update message in accordance with the receipt of the routing update message in which the current mobile node address generated by the mobile node is stored. Accordingly, a lifetime of the routing cache which differs in each mobile node can be set.

After the routing cache is created, the pure-micro gateway router (PMGR) determines whether the data packet whose destination address is the value of the mobile node IPv6 address field of the routing cache exists in the Send_Wait queue. When the data packet exists in the queue, the data packet is taken from the Send_Wait queue and is transferred in accordance with the registration information in the routing cache. If the data packet does not exist in the queue, nothing is performed.

(d2. 3-2)

When the pure-micro gateway router (PMGR) already has the routing cache, and if the value in the sequence number field of the routing update message is bigger than the value in the sequence number field of the routing cache (otherwise, the routing update message is deleted), the total value of the routing update interval time field of the routing update message and the RC_Life_Time_Plus register, the value of the sequence number field, and the value of the source address of the IPv6 header are stored in the lifetime field, the sequence number field, and the next-hop router's IPv6 address field of the routing cache, respectively.

(d2. 3-3)

The next-hop router for transmitting to the subnet indicated by the value of the old physical network prefix field of the routing update message is obtained from the routing table. When the address of the obtained next-hop router is different from the value of the source address field of the IPv6 header of the routing update message, the routing tear-down message is transmitted to the next-hop router (if the address is the same as the value, nothing is performed). At this time, the source address of the IPv6 header of the routing tear-down message is the link-local address of the router and the destination address of the IPv6 header is the address of the next-hop router. The value of the mobile node IPv6 address field, the value of the sequence number field, and the value of the old physical network prefix field of the routing update message are stored in the mobile node IPv6 address field, the sequence number field, and the old PNP field of the routing tear-down message, respectively.

(d2. 3-4)

If the paging cache relating to the value of the field of the current mobile node IPv6 address field of the received routing update message exists, the pure-micro gateway router (PMGR) deletes the paging cache.

(d2. 4)

Next, the process when the pure-micro gateway router (PMGR) receives the cache update message (FIG. 29) is described.

(d2. 4-1)

The pure-micro gateway router (PMGR) examines the existing mapping caches to determine whether there is a mapping cache in which the value of the new mobile node IPv6 address field is equal to the value of the old mobile node IPv6 address field of the received cache update message. If the mapping cache exists, and if the value of the sequence number field of the cache update message is bigger than the value of the sequence number field of the mapping cache, the following process is performed (if the mapping cache does not exist, the process proceeds to (d2. 4-2)). If the value is smaller, no further process is performed and the cache update message is deleted.

When the value of the sequence number field of the cache update message is bigger, the value of the new mobile node IPv6 address field of the mapping cache is overwritten to the value of the current mobile node IPv6 address field of the cache update message. Further, the value of the sequence number field and the value of the mapping cache hold time field of the cache update message are stored in the sequence number field and the lifetime field of the mapping cache, respectively.

(d2. 4-2)

Further, a new mapping cache is created in which the value of the current mobile node IPv6 address field, the value of the old mobile node IPv6 address field, the value of the mapping cache hold time field, and the value of the sequence number field of the cache update message are stored in the new mobile node IPv6 address field, the old mobile node IPv6 address field, the lifetime field, and the sequence number field, respectively.

Each router in the quasi-micro mobility network (QMMN) can set a lifetime of the mapping cache which differs in each mobile node, in accordance with the value of the of the mapping cache hold time included in the cache update message.

(d2. 4-3)

If the routing cache and the paging cache relating to the value of the mobile node IPv6 address field of the received cache update message, the pure-micro gateway router (PMGR) deletes the corresponding routing cache and paging cache.

(d2. 4-4)

In both cases, whether the routing cache and the paging cache are deleted or not, the pure-micro gateway router (PMGR) obtains the next-hop router for transmitting to the subnet indicated by the value of the old physical network prefix field of the cache update message from the routing table and transmits the routing tear-down message to the address of the obtained next-hop router. The source address of the IPv6 header of the routing tear-down message is the link-local address of the pure-micro gateway router (PMGR) and the destination address of the IPv6 header is the address of the next-hop router. The value of the mobile node IPv6 address field, the value of the sequence time field, and the value of the old physical network prefix field of the cache update message are stored in the mobile node IPv6 address field, the sequence number field, and the old physical network prefix field of the routing tear-down message, respectively.

(d2. 5)

Next, the process when the pure-micro gateway router (PMGR) receives the data packet is described.

(d2. 5-1)

When the pure-micro gateway router (PMGR) receives the data packet, and if the routing table or the routing cache included in the pure-micro gateway router (PMGR) has routing information regarding the destination address of the data packet, the data packet is transferred based on the routing information. If the routing information does not exist in the routing table or the routing cache, and if the paging cache regarding the destination address of the data packet exists, the paging request message is broadcasted to the downstream subnet. At this time, the source address is the link local address of the pure-micro gateway router (PMGR) and the destination address is the all-node multicast address. The value of the destination address of the destination address of the data packet is stored in the mobile node IPv6 address field of the paging request message. After the storing, the data packet is stored in the Send_Wait queue.

(d2. 5-2)

When the paging cache corresponding to the pure-micro gateway router (PMGR) does not exist, it is examined whether the mapping cache having the old mobile node IPv6 address field which is the same as the value of the destination address of the data packet exists. If the mapping cache exists, the destination address field of the data packet is overwritten to the value of the new mobile node IPv6 address field of the mapping cache. After the overwrite, the data packet is transferred based on the overwritten destination address. If the mapping cache does not exist, the data packet is deleted.

(d2. 6)

Next, the process when the pure-micro gateway router (PMGR) receives an interrupt request from its timer is described.

(d2. 6-1)

When the pure-micro gateway router (PMGR) receives an interrupt request from its timer, the value of the lifetime field of the routing cache, the paging cache, and the mapping cache in the pure-micro gateway router (PMGR) is reduced to X (X is the interrupt interval of the timer). When the value is reduced to 0 or less, the routing cache, the paging cache, and the mapping cache are deleted.

(e) Router in the Quasi-micro Mobility Network (QMMN)

Next, one of the routers in the quasi-micro mobility network (QMMN) is described.

(e1) Data Held in the Quasi-micro Mobility Network (QMMN)

The router in the quasi-micro mobility network (QMMN) has the following data in order to perform each process in accordance with the above-described inter-subnet movement of the mobile node.

<Cache which is Held by the Quasi-micro Mobility Network>

Mapping Cache

Mapping cache stores the information used for transferring the data packet which is transmitted to the old address before the movement of the mobile node, which has moved to a different pure-micro mobility network (PMMN) in the same domain, to the new address after the movement. The mapping cache is temporarily held and administered by the router which can receive and recognize the cache update message of the quasi-micro mobility network (QMMN). Also, the mapping cache stores the following information in an associative manner.

Old mobile node (MN) IPv6 address (16 bytes)
New mobile node (MN) IPv6 address (16 bytes)
Lifetime (4 bytes)
Sequence number (4 bytes)

(e2. 1)

Next, the operation at the time when the router in the quasi-micro mobility network (QMMN) receives the cache update message is described.

In the quasi-micro mobility network, there are routers which are capable of recognizing the cache update message and routers which are not capable of recognizing the cache update message. The following processes are performed in each of these routers.

(e2. 1-1)

[When the Router Cannot Recognize the Cache Update Message]

When the router receives the cache update message, the router ignores the message and performs only the process for relaying the cache update message.

[When the Router can Recognize the Cache Update Message]

The router examines the existing mapping caches to determine whether there is a mapping cache in which the value of the new mobile node IPv6 address field is equal the value of the old mobile node IPv6 address field of the received cache update message. If there is no such mapping cache, the process proceeds to (e2. 1-2). If there is such a mapping cache and if the value of the sequence number field of the cache update message is bigger than the value of the sequence number field of the mapping cache (otherwise, the cache update message is delete), the value of the new mobile node IPv6 address field of the mapping cache is overwritten to the value of the current mobile node IPv6 address field of the cache update message. Further, the value of the sequence number field and the value of the mapping cache hold time field of the cache update message are stored in the sequence number field and the lifetime field of the mapping cache, respectively.

(e2. 1-2)

Further, a new mapping cache is created in which the value of the current mobile node IPv6 address field, the value of the old mobile node IPv6 address field, the value of the mapping cache hold time field, and the value of the sequence number field of the cache update message are stored in the new mobile node IPv6 address field, the old mobile node IPv6 address field, the lifetime field, and the sequence number field, respectively.

(e2. 1-3)

The router in the quasi-micro mobility network (QMMN) relays the cache update message to the next router.

(e2. 2)

Next, the operation at the time when the router in the quasi-micro mobility network (QMMN) receives the data packet is described.

(e2. 2-1)

When the router in the quasi-micro mobility network (QMMN) receives the data packet, it examines whether a mapping cache having the old mobile node IPv6 address field which is the same as the value of the destination address of the data packet exists. If such a mapping cache does not exist, the data packet is transferred as usual, referring to the routing table. If such a mapping cache exists, the destination address field of the data packet is overwritten to the value of the new mobile node IPv6 address field of the mapping cache. After the overwrite, the data packet is transferred referring to the routing table based on the overwritten destination address.

(e2. 3)

Next, the operation at the time when the router in the quasi-micro mobility network (QMMN) receives an interrupt request from its timer is described.

(e2. 3-1)

When the router in the quasi-micro mobility network (QMMN) receives an interrupt request from its timer, the value of the lifetime field of each mapping cache in the router is reduced by X (X is the interrupt interval of the timer). When the value is reduced to 0 or less, the mapping cache is deleted.

The present invention has been described in detail with reference to the particular embodiments. Obviously, those skilled in the art can achieve any modification or substitution of the above-described embodiments without deviating from the scope of the present invention. In other words, the present invention has been disclosed in the form of examples and is not to be considered limiting. For further understanding of the summary of the present invention, the attached claims should be referred to.

The series of processes described in the specification can be conducted by hardware, software, or the combined configuration of them. When the processes are conducted by software, a program which stores a processing sequence is installed in a memory in a computer which is incorporated in dedicated hardware. Otherwise, the program can be conducted by installing it in a general purpose computer which is capable of conducting various processes.

For example, the program can be stored in advance in a recording medium such as a hard disk or a read only memory (ROM). Also, the program may be temporarily or permanently stored in a removable recording medium such as a floppy disc, a compact disc read only memory (CD-ROM), a magneto optical (MO) disc, a digital versatile disc (DVD), a magnetic disc (MD), or a semiconductor memory. Such a removable recording medium can be provided as so-called packaged software.

The program can be transferred by wireless from a download site to a computer or transferred by wire to a computer via a network such as a local area network (LAN) or the Internet, as well as installed from the above-described removable recording medium into a computer. The computer can receive the program transferred in such a manner and install the program in its own recording medium such as a hard disc.

Each of the processes described in the specification may be conducted sequentially in time according to the description. If necessary, each of the processes may be conducted in parallel or separately in accordance with the processing capacity of a device which conducts the processes. Further, in this specification, the system is a logical complex of a plurality of devices and the devices of each constitution are not necessarily in the same frame.

As described above, according to the configuration of the present invention, a virtual network prefix is used for a dedicated prefix for a mobile node, so that flexible support for micro mobility is achieved in a network configuration, including macro-cells such as a portable telephone network, or macro-cells such as wireless LAN.

In addition, according to the present invention, different network areas in which two different routing protocols, that is, the prefix-based routing protocol and the host-based routing protocol for an address, are used for routing are layered into a quasi-micro mobility network (QMMN) and a pure-micro mobility network (PMMN). Thus, according to how the terminal moves between subnets, it is possible to provide a configuration that can achieve minimum processing for a route change in each of the quasi-micro mobility network (QMMN) and the pure-micro mobility network (PMMN), thereby achieving scalability and high-speed processing for a route change, that is, high-speed hand-off in data-packet transfer processing.

Furthermore, according to the present invention, the quasi-micro mobility network (QMMN) area is provided at a higher level than the pure-micro mobility network (PMMN). Thus, the plurality of gateways (access gateways) 12-1, 12-2, and 12-3 leading to the upper layer of the quasi-micro mobility network (QMMN) can be provided, so that an arbitrary topology for avoiding failure at one point of the gateways can be implemented. This arrangement can be achieved without changing a conventional macro mobility protocol.

Additionally, this arrangement allows addresses for mobile nodes to be consolidated and held in the quasi-micro mobility network (QMMN) area above the pure-micro mobility network (PMMN). The arrangement also allows calling by referring to a paging cache held by the pure-micro gateway router (PMGR) at the boundary between the both networks, so that functions such as idling, sleep, and the like are provided in the terminal. The paging cache and the routing cache which are held by the pure-micro gateway router (PMGR) allow prompt determination for preventing overlapping of interface IDs, which serve as identifiers for mobile nodes.

In addition, the arrangement according to the present invention can support high-speed data transfer to a mobile node by dynamic updating based on each message of a mapping cache in the pure-micro gateway router (PMGR) and by address rewriting processing based on a cache update message in a router in the quasi-micro mobility network (QMMN). Since a mapping cache must be held only for a short, the amount of information for managing it can be reduced and the scalability can be improved. The hold time of a mapping cache is stated in a cache update message, so that movement support utilizing the mapping cache is achieved when necessary.

Since the acceptable hole time range of a routing cache, paging cache, or a mapping cache is recorded in a virtual network prefix information option message in a router advertisement, the network can respond with flexibility depending on the state of a mobile node or the state of a running application.

In addition, since the present invention provides a configuration in which unnecessary routing data is deleted using a routing tear-down message, so that execution of erroneous routing can be prevented and the amount of data held in each router can be reduced.

What is claimed is:

1. A communication processing system, comprising:
a layered network in a domain, the layered network comprising:
at least two sub-networks to which a mobile node as a mobile communication terminal is connectable;
a pure-micro mobility network for performing host-based routing of a packet addressed to the mobile node and also for performing prefix-based routing; and
a quasi-micro mobility network for performing the prefix-based routing,
wherein a virtual network prefix for the mobile node is set in the domain, the virtual network prefix serving as a network prefix which is different from a physical network prefix associated with a corresponding sub-network and serving as a prefix constituting an address of the mobile node, and the quasi-micro mobility network and the pure-micro mobility network are configured as an upper layer and a lower layer of the layered network, respectively.

2. The communication processing system according to claim 1, wherein a plurality of the pure-micro mobility networks, each for performing host-based routing for a packet addressed to the mobile node, are configured in the single domain, and each pure-micro mobility network in the single domain is associated with a different virtual network prefix.

3. The communication processing system according to claim 1, wherein
the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, and
the access router directly transfers the received pure-micro registration request message to a pure-micro gateway router located at the boundary between the quasi-micro mobility network and the pure-micro mobility network.

4. The communication processing system according to claim 1, wherein a pure-micro gateway router located at the boundary between the quasi-micro mobility network and the pure-micro mobility network creates, updates, or confirms a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network.

5. The communication processing system according to claim 1, wherein a pure-micro gateway router, located at the boundary between a quasi-micro mobility network for performing prefix-based routing and a pure-micro mobility network for performing host-based routing for a packet addressed to a mobile node and also for performing the prefix-based routing, transmits a cache update message including a current address of the mobile node, the current address being created by the mobile node, an old address thereof set in a previous sub-network, and an old physical network prefix corresponding to the previous sub-network when the pure-micro gateway router determines that the mobile node moves from one pure-micro mobility network to another in the same domain, each pure-micro mobility network having a different virtual network prefix upon receipt of a pure-micro registration request message including the current address, the old address, and the old physical network prefix.

6. The communication processing system according to claim 1, wherein a router in the quasi-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address with the new address stored in the mapping cache and transfers the data packet when the destination address in the data packet agrees with the old address in the mapping cache.

7. The communication processing system according to claim 1, wherein a router in the quasi-micro mobility network (i) has a mapping cache associating an old address of the mobile node with a new address thereof and storing information for forwarding a data packet, which was transmitted to the old address, to the new address when the mobile node moves from one pure-micro mobility network to another in the same domain, and (ii) creates or updates the mapping cache upon receipt of a cache update message including the new address of the mobile node, the old address thereof set in a previous sub-network, and an old physical network prefix corresponding to the previous sub-network.

8. The communication processing system according to claim 1, wherein a pure-micro gateway router located at the boundary between the quasi-micro mobility network and the corresponding pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address in the data packet with the new address stored in the mapping cache and transfers the data packet when the destination address agrees with the old address in the mapping cache.

9. The communication processing system according to claim 1, wherein a pure-micro gateway router located at the boundary between the quasi-micro mobility network and the pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) creates or updates the mapping cache upon receipt of a cache update message including a current address of the mobile node, the old address set in a previous sub-network, and an old physical network prefix corresponding to the previous sub-network.

10. The communication processing system according to claim 1, wherein
a pure-micro gateway router located at the boundary between the quasi-micro mobility network and the pure-micro mobility network (i) deletes a routing cache of the mobile node held by the pure-micro gateway router and (ii) transmits a routing tear-down message to a next-hop router given in accordance with on old physical network prefix upon receipt of a cache update message including a current address of the mobile node, an old address thereof set in a previous sub-network, and the old physical network prefix corresponding to the previous sub-network, and
a router in the pure-micro mobility network which receives the routing tear-down message (i) deletes the routing cache storing routing information of the mobile node in the previous sub-network, (ii) transmits the routing tear-down message to the next-hop router given in accordance with the old physical network prefix, and (iii) repeats transmitting the routing tear-down message and deleting the routing cache storing the routing information of the mobile node in the previous sub-network, the routing cache being in the router which receives the routing tear-down message, down to an access router connected to the previous sub-network corresponding to the old physical network prefix.

11. The communication processing system according to claim 1, wherein a pure-micro gateway router located at the boundary between the quasi-micro mobility network and the pure-micro mobility network (i) has a paging cache storing an address of the mobile node as a cache for storing an idle mobile node connected to the pure-micro mobility network, and (ii) creates or updates the paging cache upon receipt of a paging update message including a current address of the mobile node, the current address being created by the mobile node.

12. The communication processing system according to claim 1, wherein
   a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and
   a router in the pure-micro mobility network and the pure-micro gateway router in the pure-micro mobility network create or update the routing cache upon receipt of a routing update message including a current address of the mobile node, the current address being created by the mobile node.

13. The communication processing system according to claim 1, wherein a router in the pure-micro mobility network (i) has a routing cache associating an address of the mobile node with an address of a next-hop router for host-routing to an active mobile node connected to the pure-micro mobility network, (ii) deletes the routing cache upon receipt of a routing tear-down message including an address of the mobile node, which is transmitted from an upper-level router, and an old physical network prefix set in a previous sub-network, (iii) transfers the routing tear-down message to the next-hop router given in accordance with the old physical network prefix, and (ix) repeats transferring the routing tear-down message and deleting the routing cache storing routing information of the mobile node in the previous sub-network, the routing cache being in the router which receives the routing tear-down message, down to an access router connected to the previous sub-network corresponding to the old physical network prefix.

14. The communication processing system according to claim 13, wherein a crossover router, as a branch point for routing two sub-networks to two respective access routers, creates and transmits a routing tear-down message.

15. The communication processing system according to claim 1, wherein an identifier of the mobile node is unique in the pure-micro mobility network for identifying the mobile node.

16. The communication processing system according to claim 1, wherein an identifier of the mobile node is a unique interface ID in the pure-micro mobility network for identifying the mobile node.

17. The communication processing system according to claim 1, wherein an access router, connected to a current sub-network to which the mobile node is connected, in the pure-micro mobility network transmits a router advertisement which serves as an information report of the router and which includes information on the physical network prefix and another information on the virtual network prefix therein.

18. The communication processing system according to claim 1, wherein the mobile node moving from one sub-network to another in the same pure-micro mobility network or in different pure-micro mobility networks (i) compares a value of the virtual network prefix, included in a router advertisement which the mobile node receives from an access router of a new sub-network to which the mobile node is connected and which serves as an information report of the access router, to a value of the virtual or physical network prefix included in an old address of the mobile node in a previous sub-network, and (ii) creates an address thereof based on the virtual network prefix included in the received router advertisement only when the two network prefix values are different from each other.

19. The communication processing system according to claim 1, wherein the mobile node moving from one sub-network to another in the same pure-micro mobility network or in different pure-micro mobility networks creates an address of the mobile node based on the physical network prefix included in a router advertisement which the mobile node receives from an access router of a new sub-network to which the mobile node is connected and which serves as an information report of the access router when the router advertisement includes a value of the physical network prefix but does not include a value of the virtual network prefix.

20. The communication processing system according to claim 1, wherein
   an access router in the pure-micro mobility network, connected to a current sub-network to which the mobile node is connected, stores data of acceptable hold time ranges of a paging cache, a routing cache, and a mapping cache, for routing to the mobile node, in a router advertisement serving as an information report of the access router, and
   the mobile node sets lifetimes of the respective caches based on the data of the hold time ranges in the received router advertisement.

21. The communication processing system according to claim 1, wherein
   the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected,
   the access router transfers the received pure-micro registration request message to a pure-micro gateway router located at the boundary between the quasi-micro mobility network and the pure-micro mobility network,
   the pure-micro gateway router performs a duplication check for the current address of the mobile node and transmits a pure-micro registration acknowledgement message including the check result to the mobile node through the access router, and
   the mobile node which receives the pure-micro registration acknowledgement message creates a pure-micro registration request message for setting a new address of the mobile node based on a new interface ID again and retransmits the pure-micro registration request message to the access router when the duplication check result for a current address of the mobile node is affirmative.

22. The communication processing system according to claim 1, wherein an access router connected to a current sub-network to which the mobile node is connected in the pure-micro mobility network creates a router advertisement which serves as an information report of the router and which stores data of acceptable hold time ranges of a paging cache, a routing cache, and a mapping cache for performing the routing, and transmits the created router advertisement to the mobile node.

23. The communication processing system according to claim 1, wherein
   a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and
   a router in the pure-micro mobility network and the pure-micro gateway router set a lifetime of the routing cache for each mobile node in accordance with a routing update interval time included in a routing update message upon receipt of the routing update message including a current address of the mobile node, the current address being created by the mobile node.

24. The communication processing system according to claim 1, wherein
- a pure-micro gateway router located at the boundary between the quasi-micro mobility network and the pure-micro mobility network (i) refers to a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network, (ii) determines if a current address of the mobile node, the current address being created by the mobile node, in the pure-micro registration request message are registered in the pure-micro mobility network or not, and (iii) transmits a pure-micro registration acknowledgement message including the determination result to an access router of a current sub-network to which the mobile node is connected, and
- the access router transmits the received pure-micro registration acknowledgement message to the mobile node connected to the access router.

25. The communication processing system according to claim 1, wherein a pure-micro gateway router located at the boundary between the quasi-micro mobility network and the pure-micro mobility network (i) has a paging cache which stores an address of the mobile node and which serves as a cache for storing an idle mobile node connected to the pure-micro mobility network, and (ii) sets a lifetime of the paging cache for each mobile node based on a paging update interval time included in a pure-micro registration request message including a current address of the mobile node, the current address being created by the mobile node, an old address thereof set in a previous sub-network, and an old physical network prefix corresponding to the previous sub-network or a page update message including the current address upon receipt of the pure-micro registration request message or upon receipt of the page update message.

26. The communication processing system according to claim 1, wherein
- a pure-micro gateway router located at the boundary between the quasi-micro mobility network and the pure-micro mobility network has a mapping cache associating an old address of the mobile node with a new address thereof and storing information for transferring a data packet, which was transmitted to the old address, to the new address when the mobile node moves from one pure-micro mobility network to another in the same domain, and
- a router in the quasi-micro mobility network and the pure-micro gateway router set a lifetime of the mapping cache for each mobile node based on a mapping cache lifetime of the mapping cache included in a cache update message including an old address of the mobile node set in a previous sub-network, and an old physical network prefix corresponding to the previous sub-network upon receipt of the cache update message.

27. The communication processing system according to claim 1, wherein
- a pure-micro gateway router located at the boundary between the quasi-micro mobility network and the pure-micro mobility network broadcasts a paging request message including an address of the mobile node to a downstream sub-network, when a route of a destination address for transferring a data packet to the mobile node is not included in a routing cache for host-routing to an active mobile node connected to the pure-micro mobility network but is included in a paging cache storing an idle mobile node connected to the pure-micro mobility network,
- a router in the pure-micro mobility network receiving the paging request message broadcasts the received paging request message to the downstream sub-network,
- the mobile node receiving the paging request message creates a routing update message including a current address of the mobile node and transmits the routing update message to an access router in the pure-micro mobility network, and
- the router in the pure-micro mobility network and the pure-micro gateway router create the routing cache upon receipt of the routing update message.

28. A communication processing method, comprising the steps of:
- setting a virtual network prefix for a mobile node, as a mobile communication terminal, in a domain including at least two sub-networks to which the mobile node is connectable, the virtual network prefix serving as a network prefix which is different from a physical network prefix associated with a corresponding sub-network and serving as a prefix constituting an address; and
- performing prefix-based routing and host-based routing through a layered network configured such that, in the domain, a quasi-micro mobility network for performing the prefix-based routing is configured in an upper layer of the layered network, and at least one pure-micro mobility network for performing the host-based routing of a packet addressed to the mobile node and also for performing the prefix-based routing is configured in a lower layer of the layered network.

29. The communication processing method according to claim 28, wherein a plurality of the pure-micro mobility networks, each for performing host-based routing for a packet addressed to the mobile node, is configured in the single domain, and each pure-micro mobility network in the single domain is associated with a different virtual network prefix.

30. The communication processing method according to claim 28, wherein
- the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected, and
- the access router directly transfers the received pure-micro registration request message to a pure-micro gateway router located at the boundary between the quasi-micro mobility network and the pure-micro mobility network.

31. The communication processing method according to claim 28, wherein a pure-micro gateway router located at the boundary between the quasi-micro mobility network and the pure-micro mobility network creates, updates, or confirms a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network.

32. The communication processing method according to claim 28, wherein a pure-micro gateway router, located at the boundary between a quasi-micro mobility network for performing prefix-based routing and a pure-micro mobility network for host-based routing for performing a packet addressed to a mobile node and also for performing the prefix-based routing, transmits a cache update message including a current address of the mobile node, the current address being created by the mobile node, an old address thereof set in a previous sub-network, and an old physical network prefix corresponding to the previous sub-network when the pure-micro gateway router determines that the mobile node moves from one pure-micro mobility network to another in the same domain, each pure-micro mobility network having a different virtual network prefix upon receipt of a pure-micro registration request message including the current address, the old address, and the old physical network prefix.

33. The communication processing method according to claim 28, wherein a router in the quasi-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address with the new address stored in the mapping cache and transfers the data packet when the destination address in the data packet agrees with the old address in the mapping cache.

34. The communication processing method according to claim 28, wherein a router in the quasi-micro mobility network (i) has a mapping cache associating an old address of the mobile node with a new address thereof and storing information for forwarding a data packet, which was transmitted to the old address, to the new address when the mobile node moves from one pure-micro mobility network to another in the same domain, and (ii) creates or updates the mapping cache upon receipt of a cache update message including the new address of the mobile node, the old address thereof set in a previous sub-network, and an old physical network prefix corresponding to the previous sub-network.

35. The communication processing method according to claim 28, wherein a pure-micro gateway router located at the boundary between the quasi-micro mobility network and the corresponding pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) overwrites a destination address in the data packet with the new address stored in the mapping cache and transfers the data packet when the destination address agrees with the old address in the mapping cache.

36. The communication processing method according to claim 28, wherein a pure-micro gateway router located at the boundary between the quasi-micro mobility network and the pure-micro mobility network (i) has a mapping cache associating an old address of the mobile node with a new address thereof and storing information for transferring a data packet, which was transmitted to the old address, to the new address when the mobile node moves from one pure-micro mobility network to another in the same domain, and (ii) creates or updates the mapping cache upon receipt of a cache update message including a current address of the mobile node, the old address set in a previous sub-network, and an old physical network prefix corresponding to the previous sub-network.

37. The communication processing method according to claim 28, wherein
a pure-micro gateway router located at the boundary between the quasi-micro mobility network and the pure-micro mobility network (i) deletes a routing cache of the mobile node held by the pure-micro gateway router and (ii) transmits a routing tear-down message to a next-hop router given in accordance with on old physical network prefix upon receipt of a cache update message including a current address of the mobile node, an old address thereof set in a previous sub-network, and the old physical network prefix corresponding to the previous sub-network, and
a router in the pure-micro mobility network which receives the routing tear-down message (1) deletes the routing cache storing routing information of the mobile node in the previous sub-network, (ii) transmits the routing tear-down message to the next-hop router given in accordance with the old physical network prefix, and (iii) repeats transmitting the routing tear-down message and deleting the routing cache storing the routing information of the mobile node in the previous sub-network, the routing cache being in the router which receives the routing tear-down message, down to an access router connected to the previous sub-network corresponding to the old physical network prefix.

38. The communication processing method according to claim 28, wherein a pure-micro gateway router located at the boundary between the quasi-micro mobility network and the pure-micro mobility network (i) has a paging cache storing an address of the mobile node as a cache for storing an idle mobile node connected to the pure-micro mobility network, and (ii) creates or updates the paging cache upon receipt of a paging update message including a current address of the mobile node, the current address being created by the mobile node.

39. The communication processing method according to claim 28, wherein
a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and
a router in the pure-micro mobility network and the pure-micro gateway router in the pure-micro mobility network create or update the routing cache upon receipt of a routing update message including a current address of the mobile node, the current address being created by the mobile node.

40. The communication processing method according to claim 28, wherein a router in the pure-micro mobility network (i) has a routing cache associating an address of the mobile node with an address of a next-hop router for host-routing to an active mobile node connected to the pure-micro mobility network, (ii) deletes the routing cache upon receipt of a routing tear-down message including an address of the mobile node, which is transmitted from an upper-level router, and an old physical network prefix set in a previous sub-network, (iii) transfers the routing tear-down message to the next-hop router given in accordance with the old physical network prefix, and (ix) repeats transferring the routing tear-down message and deleting the routing cache storing routing information of the mobile node in the previous sub-network, the routing cache being in the router which receives the routing tear-down message, down to an access router connected to the previous sub-network corresponding to the old physical network prefix.

41. The communication processing method according to claim 40, wherein a crossover router, as a branch point for routing two sub-networks to two respective access routers, creates and transmits a routing tear-down message.

42. The communication processing method according to claim 28, wherein an identifier of the mobile node is unique in the pure-micro mobility network for identifying the mobile node.

43. The communication processing method according to claim 28, wherein an identifier of the mobile node is a unique interface ID in the pure-micro mobility network for identifying the mobile node.

44. The communication processing method according to claim 28, wherein an access router, connected to a current sub-network to which the mobile node is connected, in the pure-micro mobility network transmits a router advertisement which serves as an information report of the router and which includes information on the physical network prefix and another information on the virtual network prefix therein.

45. The communication processing method according to claim 28, wherein the mobile node moving from one sub-network to another in the same pure-micro mobility network or in different pure-micro mobility networks (i) compares a value of the virtual network prefix, included in a router advertisement which the mobile node receives from an access router of a new sub-network to which the mobile node is connected and which serves as an information report of the access router, to a value of the virtual or physical network prefix included in an old address of the mobile node in a previous sub-network, and (ii) creates an address thereof based on the virtual network prefix included in the received router advertisement only when the two network prefix values are different from each other.

46. The communication processing method according to claim 28, wherein the mobile node moving from one sub-network to another in the same pure-micro mobility network or in different pure-micro mobility networks creates an address of the mobile node based on the physical network prefix included in a router advertisement which the mobile node receives from an access router of a new sub-network to which the mobile node is connected and which serves as an information report of the access router when the router advertisement includes a value of the physical network prefix but does not include a value of the virtual network prefix.

47. The communication processing method according to claim 28, wherein
an access router in the pure-micro mobility network, connected to a current sub-network to which the mobile node is connected, stores data of acceptable hold time ranges of a paging cache, a routing cache, and a mapping cache, for routing to the mobile node, in a router advertisement serving as an information report of the access router, and
the mobile node sets lifetimes of the respective caches based on the data of the hold time ranges in the received router advertisement.

48. The communication processing method according to claim 28, wherein
the mobile node transmits a pure-micro registration request message including a current address thereof in a current sub-network, an old address thereof set in a previous sub-network, and an old physical network prefix corresponding to the previous sub-network to an access router of the current sub-network to which the mobile node is connected,
the access router transfers the received pure-micro registration request message to a pure-micro gateway router located at the boundary between the quasi-micro mobility network and the pure-micro mobility network,
the pure-micro gateway router performs a duplication check for the current address of the mobile node and transmits a pure-micro registration acknowledgement message including the check result to the mobile node through the access router, and
the mobile node which receives the pure-micro registration acknowledgement message creates a pure-micro registration request message for setting a new address of the mobile node based on a new interface ID again and retransmits the pure-micro registration request message to the access router when the duplication check result for a current address of the mobile node is affirmative.

49. The communication processing method according to claim 28, wherein an access router connected to a current sub-network to which the mobile node is connected in the pure-micro mobility network creates a router advertisement which serves as an information report of the router and which stores data of acceptable hold time ranges of a paging cache, a routing cache, and a mapping cache for performing the routing, and transmits the created a router advertisement to the mobile node.

50. The communication processing method according to claim 28, wherein
a pure-micro gateway router located at the boundary between the quasi-micro mobility network and the pure-micro mobility network has a routing cache associating an address of the mobile node with an address of a next-hop router for host-routing to an active mobile node connected to the pure-micro mobility network, and
a router in the pure-micro mobility network and the pure-micro gateway router set a lifetime of the routing cache for each mobile node in accordance with a routing update interval time included in a routing update message upon receipt of the routing update message including a current address of the mobile node, the current address being created by the mobile node.

51. The communication processing method according to claim 28, wherein
a pure-micro gateway router located at the boundary between the quasi-micro mobility network and the pure-micro mobility network (i) refers to a paging cache, a routing cache, and a mapping cache, for routing to the mobile node upon receipt of a pure-micro registration request message including a current address of the mobile node, the current address being created by the mobile node, an old address thereof set in a previous sub-network, and an old physical network prefix corresponding to the previous sub-network, (ii) determines if a current address of the mobile node, the current address being created by the mobile node, in the pure-micro registration request message are registered in the pure-micro mobility network or not, and (iii) transmits a pure-micro registration acknowledgement message including the determination result to an access router of a current sub-network to which the mobile node is connected, and
the access router transmits the received pure-micro registration acknowledgement message to the mobile node connected to the access router.

52. The communication processing method according to claim 28, wherein a pure-micro gateway router located at the boundary between the quasi-micro mobility network and the pure-micro mobility network (i) has a paging cache which stores an address of the mobile node and which serves as a cache for storing an idle mobile node connected to the pure-micro mobility network, and (ii) sets a lifetime of the paging cache for each mobile node based on a paging update interval time included in a pure-micro registration request message including a current address of the mobile node, the current address being created by the mobile node, an old address thereof set in a previous sub-network, and an old physical network prefix corresponding to the previous sub-network or a page update message including the current address upon receipt of the pure-micro registration request message or upon receipt of the page update message.

53. The communication processing method according to claim 28, wherein
a pure-micro gateway router located at the boundary between the quasi-micro mobility network and the pure-micro mobility network has a mapping cache associating an old address of the mobile node with a new address thereof and storing information for transferring a data packet, which was transmitted to the old address, to the new address when the mobile node moves from one pure-micro mobility network to another in the same domain, and
a router in the quasi-micro mobility network and the pure-micro gateway router set a lifetime of the mapping cache for each mobile node based on a mapping cache lifetime of the mapping cache included in a cache update message including an old address of the mobile node set in a previous sub-network, and an old physical network prefix corresponding to the previous sub-network upon receipt of the cache update message.

54. The communication processing method according to claim 28, wherein
a pure-micro gateway router located at the boundary between the quasi-micro mobility network and the pure-micro mobility network broadcasts a paging request message including an address of the mobile node to a downstream sub-network, when a route of a destination address for transferring a data packet to the mobile node is not included in a routing cache for host-routing to an active mobile node connected to the pure-micro mobility network but is included in a paging cache storing an idle mobile node connected to the pure-micro mobility network,
a router in the pure-micro mobility network receiving the paging request message broadcasts the received paging request message to the downstream sub-network,
the mobile node receiving the paging request message creates a routing update message including a current address of the mobile node and transmits the routing update message to an access router in the pure-micro mobility network, and
the router in the pure-micro mobility network and the pure-micro gateway router create the routing cache upon receipt of the routing update message.

55. A communication terminal for performing communication through a network, comprising:
first means for receiving a physical network prefix associated with a corresponding sub-network in a domain having at least two sub-networks and a router advertisement which serves as an information report from an access router and which includes a virtual network prefix for the communication terminal;
second means for setting an address of the communication terminal based on the virtual network prefix obtained from the received router advertisement and also based on an identifier of the communication terminal; and
third means for creating a pure-micro registration request message including a current address of the communication terminal, an old address thereof set in a previous sub-network, and an old physical network prefix corresponding to the previous sub-network, and for transmitting the pure-micro registration request message to the access router of a current sub-network to which the communication terminal is connected.

56. The communication terminal according to claim 55, further comprising:
fourth means for comparing a value of the virtual network prefix included in the router advertisement received from the access router to a value of the virtual network prefix or physical network prefix used in the previous sub-network included in the old address of the mobile node when the mobile node moves from one sub-network to another in the same domain or in different domains; and
fifth means for creating an address of the mobile node based on the virtual network prefix included in the received router advertisement only when the two network prefix values are different from each other.

57. The communication terminal according to claim 55, further comprising:
fourth means for determining if the router advertisement includes a value of the physical network prefix and does not include a value of the virtual network prefix or not; and
fifth means for creating an address of the mobile node based on the physical network prefix included in the received router advertisement when the determination is affirmative.

58. The communication terminal according to claim 55, further comprising:
fourth means for receiving a pure-micro registration acknowledgement message including a check result of address duplication with respect to the current address of the communication terminal; and
fifth means for creating the pure-micro registration request message which sets a new address, based on a new interface ID, as the current address of the communication terminal, and for transmitting the pure-micro registration request message to the access router when the pure-micro registration acknowledgement message includes an affirmative check result.

59. The communication terminal according to claim 55, further comprising:
fourth means for receiving the router advertisement which serves as an information report of the router and which stores data of acceptable hold time ranges of a paging cache, a routing cache, and a mapping cache for routing to the communication terminal; and
fifth means for setting lifetimes of the respective caches based on the data of the acceptable hold time ranges of the respective caches in the received router advertisement, and for storing the set lifetimes (i) in a routing update message, (ii) in the pure-micro registration request message, and (iii) in a paging update message including an address, a sequence number, and a paging update interval time of the communication terminal in a current sub-network corresponding to the routing cache, the mapping cache, and the paging cache, respectively.

60. The communication terminal according to claim 55, further comprising:
fourth means for receiving a paging request message for an idle a communication terminal; and
fifth means for creating a routing update message including a current address of the communication terminal, and for transmitting the routing update message to the access router of the sub-network when the received paging request message includes an address of the communication terminal.

61. The communication terminal according to claim 55, further comprising:
fourth means for creating a paging update message including an address, a sequence number, and a paging update interval time of the mobile node in a current sub-network, and for transmitting the paging update message to the access router of the sub-network to which the mobile node is connected, during a transition period from a communication mode to a stand-by mode.

62. A computer readable medium containing a program of instructions executed by one or more computer processors for executing communication processing through a network on a computer system, the program comprising the steps of:
receiving a physical network prefix associated with a corresponding sub-network in a domain having at least two sub-networks and a router advertisement which serves as an information report from an access router and which includes a virtual network prefix for a mobile node;
setting an address of the mobile node based on the virtual network prefix obtained from the received router advertisement and also based on an identifier of the communication terminal; and
creating a pure-micro registration request message including a current address of the mobile node, an old address thereof set in a previous sub-network, and an old physical network prefix corresponding to the previous sub-network, and transmitting the pure-micro registration request message to an access router of a current sub-network to which the mobile node is connected.

63. A computer readable medium containing a program of instructions executed by one or more computer processors for executing communication processing through a network on a computer system, the program comprising the steps of:
comparing a value of a virtual network prefix, as data constituting an address of a mobile node, included in a router advertisement received from a router to a value of the virtual network prefix included in an old address of the mobile node used in a previous sub-network or a value of a physical network prefix as data constituting an address associated with the previous sub-network when the mobile node moves from one sub-network to another; and
creating an address of the mobile node based on the virtual network prefix included in the received router advertisement only when the compared two prefixes are different from each other.

64. A computer readable medium containing a program of instructions executed by one or more computer processors for executing communication processing through a network on a computer system, the program comprising the steps of:
determining if a router advertisement received from an access router includes a value of a virtual network prefix as data constituting an address of a mobile node when the mobile node moves from one sub-network to another; and
creating an address of the mobile node based on a physical network prefix included in the received router advertisement when the router advertisement includes a value of a physical network prefix and does not include the value of the virtual network prefix.

65. A computer readable medium containing a program of instructions executed by one or more computer processors for executing communication processing through a network on a computer system, the program comprising the steps of:
receiving a message including a determination as to whether a current address of a mobile node is duplicated; and
creating a new interface ID again, and transmitting a pure-micro registration request message, as an address setting request message which sets the current address of the mobile node based on the new interface ID, to an access router when the determination is affirmative.

66. A computer readable medium containing a program of instructions executed by one or more computer processors for executing communication processing through a network on a computer system, the program comprising the steps of:
receiving the router advertisement which serves as an information report of the router and which stores data of acceptable hold time ranges of a paging cache, a routing cache, and a mapping cache for routing to the mobile node; and
setting lifetimes of the respective caches based on the data of the acceptable hold time ranges of the respective caches in the received router advertisement, and storing the set lifetimes (i) in a routing update message, (ii) in the pure-micro registration request message including a current address of the mobile node, an old address thereof set in a previous sub-network, and (iii) in a paging update message including the current address, a sequence number, and a paging update interval time of the mobile node in a current sub-network corresponding to the routing cache, the mapping cache, and the paging cache, respectively.

67. A computer readable medium containing a program of instructions executed by one or more computer processors for executing communication processing through a network on a computer system, the program comprising the steps of:
receiving a paging request message for an idle mobile node; and
creating a routing update message including a current address of the mobile node, and for transmitting the routing update message to the access router of the sub-network when the received paging request message includes an address of the mobile node.

68. A computer readable medium containing a program of instructions executed by one or more computer processors for executing communication processing through a network on a computer system, the program comprising the step of:
creating a paging update message including an address, a sequence number, and a paging update interval time of the mobile node in a current sub-network, and transmitting the paging update message to the access router of the sub-network to which the mobile node is connected, during a transition period from a communication mode to a stand-by mode.

* * * * *